US007174093B2

(12) United States Patent
Kidd et al.

(10) Patent No.: US 7,174,093 B2
(45) Date of Patent: Feb. 6, 2007

(54) WHEEL CHAIR DRIVE APPARATUS AND METHOD

(75) Inventors: William W. Kidd, Lexington, IL (US); John P. Jenkins, Lexington, IL (US)

(73) Assignee: Midamerica Electronics Corporation, Lexington, IL (US)

( * ) Notice: Subject to any disclaimer, the term of this patent is extended or adjusted under 35 U.S.C. 154(b) by 0 days.

(21) Appl. No.: 11/027,648

(22) Filed: Dec. 30, 2004

(65) Prior Publication Data

US 2005/0238337 A1 Oct. 27, 2005

Related U.S. Application Data

(63) Continuation-in-part of application No. 10/832,939, filed on Apr. 27, 2004.

(51) Int. Cl.
*H02P 7/29* (2006.01)

(52) U.S. Cl. .................... 388/811; 388/809; 180/65.5; 180/58; 180/60; 180/65.3; 310/67 R

(58) Field of Classification Search ................ 388/800, 388/809, 811; 180/65.5, 58, 60, 65.3; 310/67 R
See application file for complete search history.

(56) References Cited

U.S. PATENT DOCUMENTS 1,686,427 A 10/1928 Wallgren
2,726,726 A 12/1955 Le Tourneau ................ 180/60
3,349,862 A 10/1967 Shirey, Jr. .................... 180/15
3,783,359 A * 1/1974 Malkiel ...................... 318/254
4,386,672 A 6/1983 Coker ......................... 180/13
4,503,925 A 3/1985 Palmer et al. ................ 180/13
4,814,674 A 3/1989 Hrassky ...................... 318/254
4,841,207 A 6/1989 Cheyne ...................... 388/811
5,016,720 A 5/1991 Coker ......................... 180/13
5,050,695 A 9/1991 Kleinwolterink, Jr. ....... 180/13
5,101,924 A 4/1992 Yamagiwa et al. ......... 180/220
5,194,794 A 3/1993 Shamoto ..................... 318/603
5,222,572 A 6/1993 Yamagiwa et al. ......... 180/220
5,376,868 A 12/1994 Toyoda et al. .............. 318/587
5,427,193 A * 6/1995 Avakian .................... 180/65.5
5,440,915 A * 8/1995 Storar ............................ 73/9
5,471,384 A 11/1995 Nakashima et al. ... 364/424.01
5,494,126 A 2/1996 Meeker ....................... 180/13
5,691,584 A 11/1997 Toida et al. ............. 310/67 R
5,721,473 A 2/1998 DeVries ...................... 318/139
5,735,361 A 4/1998 Forrest ...................... 180/6.24
5,796,192 A * 8/1998 Riepl ....................... 310/67 R
5,901,268 A 5/1999 Ando et al. ................. 388/811
6,060,859 A 5/2000 Jonokuchi ................... 318/801
6,247,548 B1 6/2001 Hayashi et al. ............. 180/206
6,278,216 B1 8/2001 Li ............................. 310/254
6,302,826 B1 10/2001 Lee ............................ 482/54
6,388,405 B2 * 5/2002 Laurent ...................... 318/254
6,552,460 B2 4/2003 Bales .................... 310/156.35
6,556,458 B2 * 4/2003 Ohmura et al. ............... 363/37
6,577,085 B2 6/2003 Maurice et al. ............. 318/254
6,630,764 B1 10/2003 Dubé et al. ................. 310/177
6,647,325 B2 * 11/2003 Shimazaki et al. ........... 701/22
6,690,127 B2 2/2004 Birkestrand et al. ........ 318/139
6,727,668 B1 4/2004 Maslov et al. .............. 318/138
6,766,871 B2 7/2004 Sawyer ........................ 180/13
6,888,280 B2 * 5/2005 Dube et al. ................. 310/177
6,892,841 B2 * 5/2005 Makuta et al. ............. 180/65.5

* cited by examiner

*Primary Examiner*—Rita Leykin
(74) *Attorney, Agent, or Firm*—Husch & Eppenberger, LLC

(57) ABSTRACT

A control system for a powered wheel chair drive modulates a pulse power delivery signal such that power is delivered gradually at throttle positions corresponding to a low speed, and power is delivered more rapidly at throttle positions corresponding to a higher speed.

36 Claims, 46 Drawing Sheets

THROTTLE TEST LOOP 1000

RUN LOOP – PART 2

1200

SUBROUTINES – PART 5

WHEEL CHAIR DRIVE APPARATUS AND METHOD

CROSS-REFERENCE TO RELATED APPLICATIONS

This application is a continuation-in-part of U.S. application Ser. No. 10/832,939, filed Apr. 27, 2004.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention is in the field of motorized wheel chairs, particularly, electric motor drivers attachable to standard wheel chairs to provide power to drive them.

2. Related Art

Substantial obstacles to mobility and everyday tasks of living continue for those who are disabled and bound to wheel chairs. There is a continuing need to make mobility for the wheel chair bound more reliable and convenient.

Motor drives for standard wheel chairs exist in the prior art. U.S. Pat. No. 5,494,126 to Meeker and U.S. Pat. No. 5,050,695 to Kleinwolterink Jr. describe motor drive units that may be attached to standard push wheel chairs.

U.S. Pat. No. 5,050,695 describes a geared brush type DC motor that is coupled to a very small drive wheel by a chain. It makes use of a fixed steering column. Only the height of the column can be adjusted to fit individual needs, by loosening a setscrew. The drive wheel is coupled to a frame though a bearing journal. The frame forms a well into which two large batteries are supported. Power is applied to the motor through a cable and is controlled with the control box at the top of the steering column. The speed and direction of the motor is controlled through wings attached to the control box. The wings are attached to simple switches inside the control box.

U.S. Pat. No. 5,494,126 describes an apparatus and method for attaching a motorized wheel to a wheel chair. This unit is attached to the front of the wheel chair through the use of two brackets bolted to the front tubes of the wheel chair. The steering column is telescopically connected to the drive wheel and held in place with a collar and a setscrew.

These devices are cumbersome in their operation, installation and transportation. The units are heavy and do not disassemble or collapse into a compact package. This creates difficulty in packing, as for example in the trunk of an automobile. Weight represents a substantial hardship, particularly for the elderly person, whose caregiver is commonly an elderly spouse. Prior art devices are also bulky and do not collapse into a small enough package for convenient transportation, again as in the trunk of a car.

The prior art units do not have batteries that are easily removable. Moreover, the batteries are not encased in a separate housing. Accordingly, separate packaging of the batteries is required to transport prior art batteries on public transportation such as commercial airlines. There is no provision for re-charging the batteries.

The prior art devices have in common a vertical shaft for holding a control module where the wheel chair occupant may reach it. This shaft is not movable, and accordingly obstructs ingress and egress from the wheel chair. The unadjustable vertical control shaft makes simple tasks difficult, such as pulling the chair up to the table, as for reading or a meal. These units are also difficult to install for a caregiver. They are prohibitively difficult for the disabled individual themselves to install.

The prior art devices have inefficient drive trains that use drive chains and further necessitate inefficient gearing and small drive wheels. Their systems are only 35% efficient. This inefficiency leads to a choice between either large, heavy batteries or smaller batteries that use an inordinate amount of power with an appreciably shorter charge life. Operational time between charges must be sacrificed. There is a need in the art for a more efficient drive motor and drive wheel operation.

In operation, the prior art units use small drive wheels that too readily transfer shock from minor impediments, such as a brick floor. Even slightly larger objects, such as a cobble stone street, become virtually impossible to traverse.

Further shortcomings of prior art devices include a lack of control precision when operating the wheel chair driver, particularly in tight spaces. Although it is known that wheel chairs are often used in enclosed or crowded spaces such as dining rooms, elevators, work places and the like, prior art drive units are only capable of travel at walking speed, without offering slower speeds for precise handling. The high torque and control sensitivity desirable for maneuvering in a crowded space at slow speeds is currently unavailable. There is a need in the art for a high torque, precise control system for operating wheel chairs at low speeds.

It is in view of the above referenced shortcomings that the present invention was developed.

SUMMARY OF THE INVENTION

The invention is an improved drive device for attachment to the standard wheel chair. The device is separable into two separate components for transportation. One component is a battery, contained in a separate, sealed housing. The battery and housing have a separate handle and are dimensioned to be of a convenient size and weight. The remaining second component includes a frame, high torque electric motor, drive wheel, and collapsible control shaft.

This invention consists of a motorized wheel chair drive unit providing steerable motive power, which can be easily attached to or detached from a standard manual wheel chair and makes use of a direct drive system. This drive requires no gear reducers and no coupling mechanisms such as chains or belts. This drive system is much more efficient than those used in prior art. The efficiency is approximately 80%. This allows a choice between using a smaller battery which travels the same time and distance as prior art, and using a full-size battery which travels a much greater distance without recharging. It is preferred to use a smaller battery, which in this design is enclosed in a steel case.

The drive motor is inside the drive wheel in one embodiment. In another, the wheel is the motor. It is an inverted rotor design with a stationary stator at the center of the motor and the rotor on the outside. The tire is molded directly on the outside of the rotor.

The motor wheel has a relatively large diameter of nine inches. This permits easy passage over fairly large obstructions such as doorsills. The motor incorporates two large permanently lubricated sealed ball bearings. The wiring passes out through the center of one of the bearings, up under a protective cover to the electronic control box located above the motor.

The unit overcomes the restrictions of prior art devices in tasks such as approaching a desk, a table, a bathroom sink, or a water fountain in two ways. First, the steering column can be released and rotated back in the operator's lap. From the locked upright position, the steering column can also be folded forward down against the floor and then turned to the side, providing complete open access for entering and leaving the wheel chair. There is a release knob, located near the front edge of the wheel chair seat, which provides easy access for moving the steering column. When the release knob is pulled, the motor control is automatically turned off. In order to allow this feature to be effective the motor control head at the top of the steering column must be very slim and small. Secondly, precise control around such things as desks and sinks is made possible by the high torque, low speed precision control system of the present invention described more fully below.

The process of connecting and disconnecting the unit with the wheel chair is quick and easy, requiring no tools, allowing a handicapped person to fix the drive apparatus in place under the wheel chair for use. With the unit disconnected from the wheel chair and the battery pack removed, the steering column can then be folded down over the top of the frame where it locks in a centered position. This minimizes the space required for storing the unit and also provides a handle for moving the folded unit.

There are two lightweight brackets bolted to the inside rear of the wheel chair frame with outward slanted guides. There are engagement seats for the driver apparatus formed on the inner surface of these brackets. A swing assembly or caster lever is hinged at the rear of the drive apparatus' frame. It rotates out approximately 45°. The swing assembly rotates over center and is held in the out position by the weight of the battery, and supported by two roller casters. The swing assembly supports a horizontal rectangular bar, which is transverse to the wheel chair and extends almost the full width of the inside of the wheel chair frame. The casters are mounted near the outer end of this horizontal bar. Mounted to the top of the battery handle is an inverted V delrin slide. To connect the unit, the swing assembly must be in the out position, and the steering column turned at 90° (to act as a brake). The wheel chair is moved over the drive unit, and as the horizontal bar comes in contact with the slanted guides on the wheel chair brackets the roller casters allow the unit to be guided laterally until the rectangular bar is captured by the engagement seats on the wheel chair brackets. As the wheel chair moves further forward, the swing assembly is driven to an upright vertical position. It is held in this vertical position by a releasable latch mechanism. As the swing assembly is driven to the upright vertical position, the rear of the frame is lifted which pushes the inverted V delrin slide against the bottom of the X-frame of the wheel chair. This lifts the front of the wheel chair and at the same time the roller casters are lifted off the ground. With the front of the wheel chair lifted, needed weight is added to the motor wheel providing better traction.

A second means of connecting the unit can be accomplished by applying the brakes on the wheel chair. The drive apparatus can then be backed under the wheel chair using the power of the drive unit. This design results in a three-wheeled device with a very short wheelbase. Since the front casters of the wheel chair are only slightly lifted off the ground, they serve as outriggers and prevent the unit from tipping.

The system includes a high torque brushless permanent magnet motor whose outer housing comprises the drive wheel itself. The invention further comprises the control system for precise maneuverability of the drive unit at low speeds.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 23 is the base schematic;

DETAILED DESCRIPTION OF THE PREFERRED EMBODIMENTS

Figure 15:
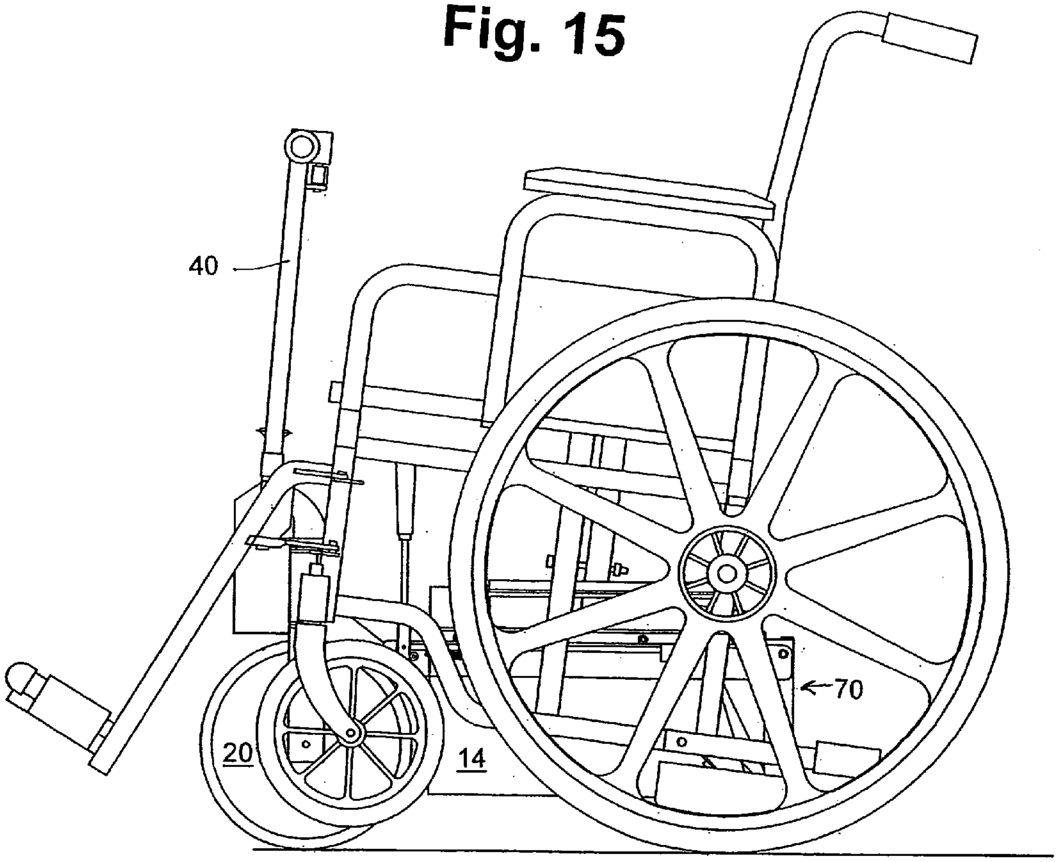
FIG. 15 is a side view of the unit installed for operation in the standard wheel chair.

Referring to the accompanying drawings in which like reference numbers indicate like elements, FIGS. 1, 2, 3, 4 and 5 are side, front, side and top views, respectively, of the wheel chair motor drive of the present invention. FIG. 15 shows the motor drive apparatus 10 engaged with a wheel chair.

The wheel chair motor drive apparatus 10 is comprised of a frame 12 and, when assembled, a battery housing 14.

Drive wheel 20 comprises the housing for a high torque electric motor (not shown) within the wheel in the depicted embodiment. The wheel 20 is also the rotor of the electric motor, as well as the casing for the stator housed within it. The motor and wheel 20 are coaxial in the depicted embodiment. The wheel 20 also has a friction surface or tread 22 disposed circumferentially thereon.

The drive wheel axle 24 supports drive wheel forks 26. The forks 26 are fixedly attached to a fork bearing journal 28 which is substantially vertical in the depicted embodiment.

The frame 12 is essentially comprised of a front frame component 30, arm 32 and battery mount 34.

A control shaft 40 is fixedly attached to control shaft bracket 42. The control shaft bracket 42 is attached at pivot 44 to the front frame component 30.

Figure 13:
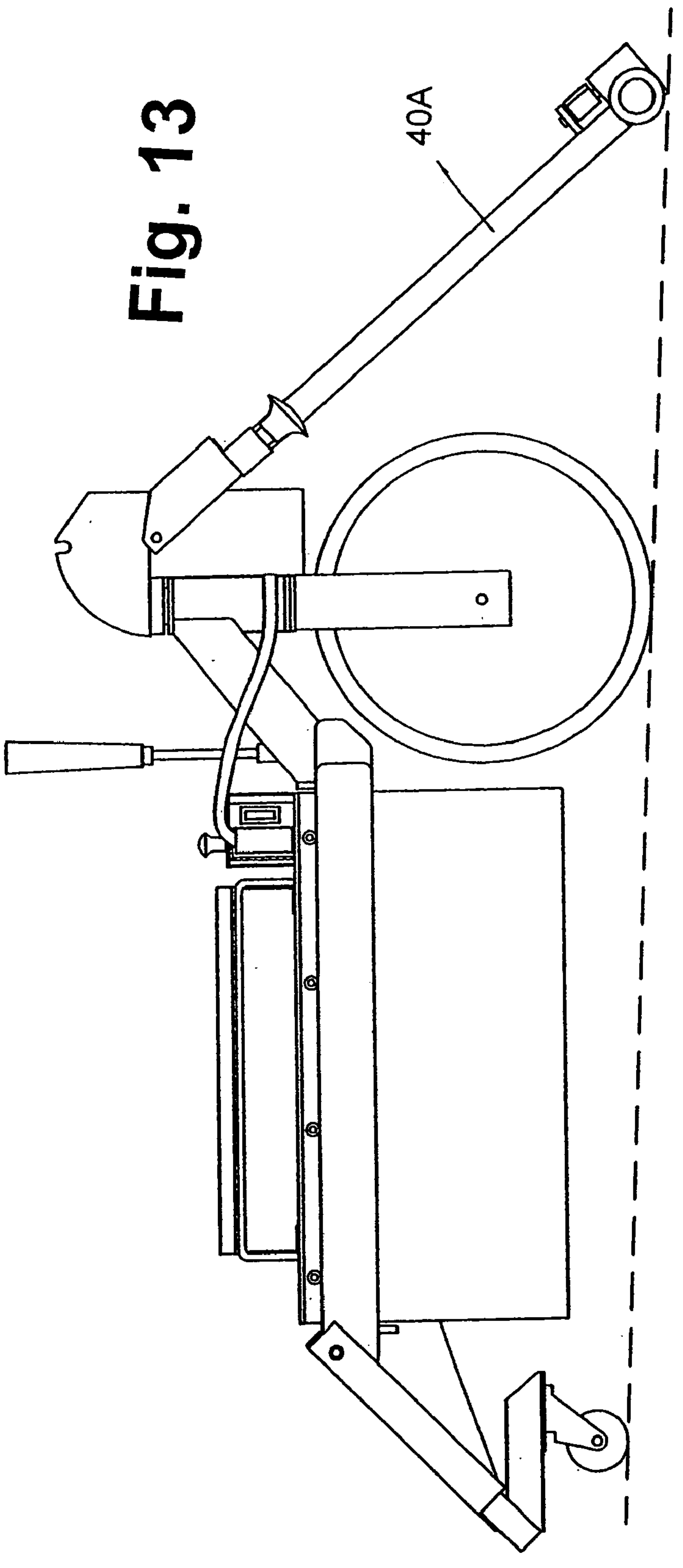
FIG. 13 is a right sided view with the controls shaft in a user access position.
Figure 14:
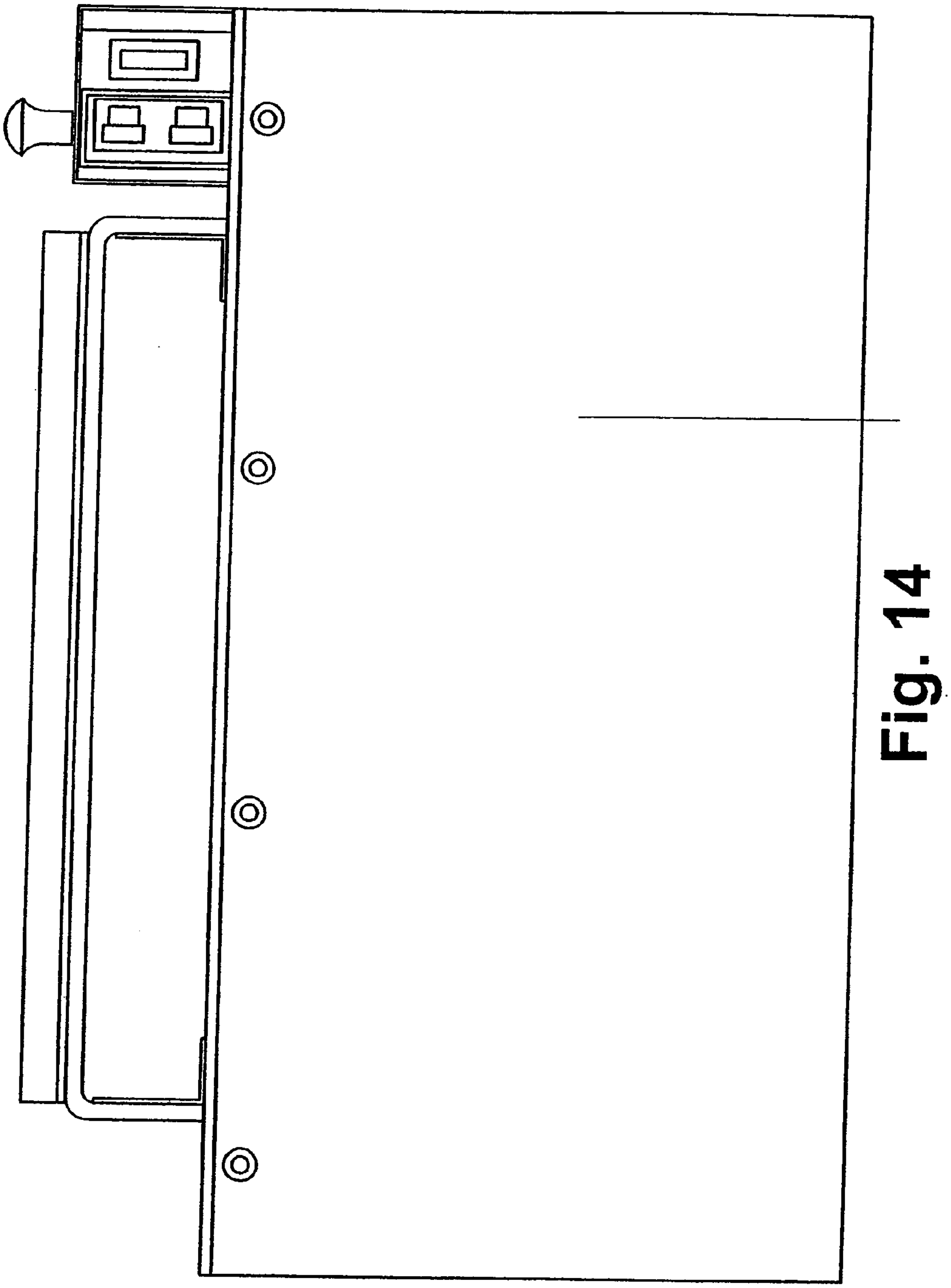
FIG. 14 is a close up view of the battery housing.

Control shaft bracket 42 straddles a control shaft positioning disk 38. Control shaft 40 can pivot around pivot 44 through an arc that is forward and back, when drive wheel 20 is pointed frontwards. The position of the control shaft 40 may be selectively maintained at different positions along its arc of travel. In the depicted embodiment, bosses and detents (not shown) engaging between control shaft bracket 42 and an engaging edge of the control shaft position disk 38 are actuated by control shaft locking pin 46, which spring biases a pin (not shown) in any of the series of detents (not shown) along a circumferential surface of control shaft positioning disk 38. An alternative within the scope of the present invention is a friction engagement between a control shaft locking member and the control shaft position disk, allowing a continuous range of selectable positions from control shaft 40. In any case, control shaft 40 may be positioned in a fully forward location, 40A (FIG. 13). This position, which in the depicted embodiment would place the top end of the control shaft 40 on or near the floor, allows for greatly simplified egress and ingress of the wheel chair occupant in and out of the wheel chair with the wheel chair drive unit 10 positioned under the wheel chair and either engaged with the wheel chair or ready for engagement with it.

Figure 9:
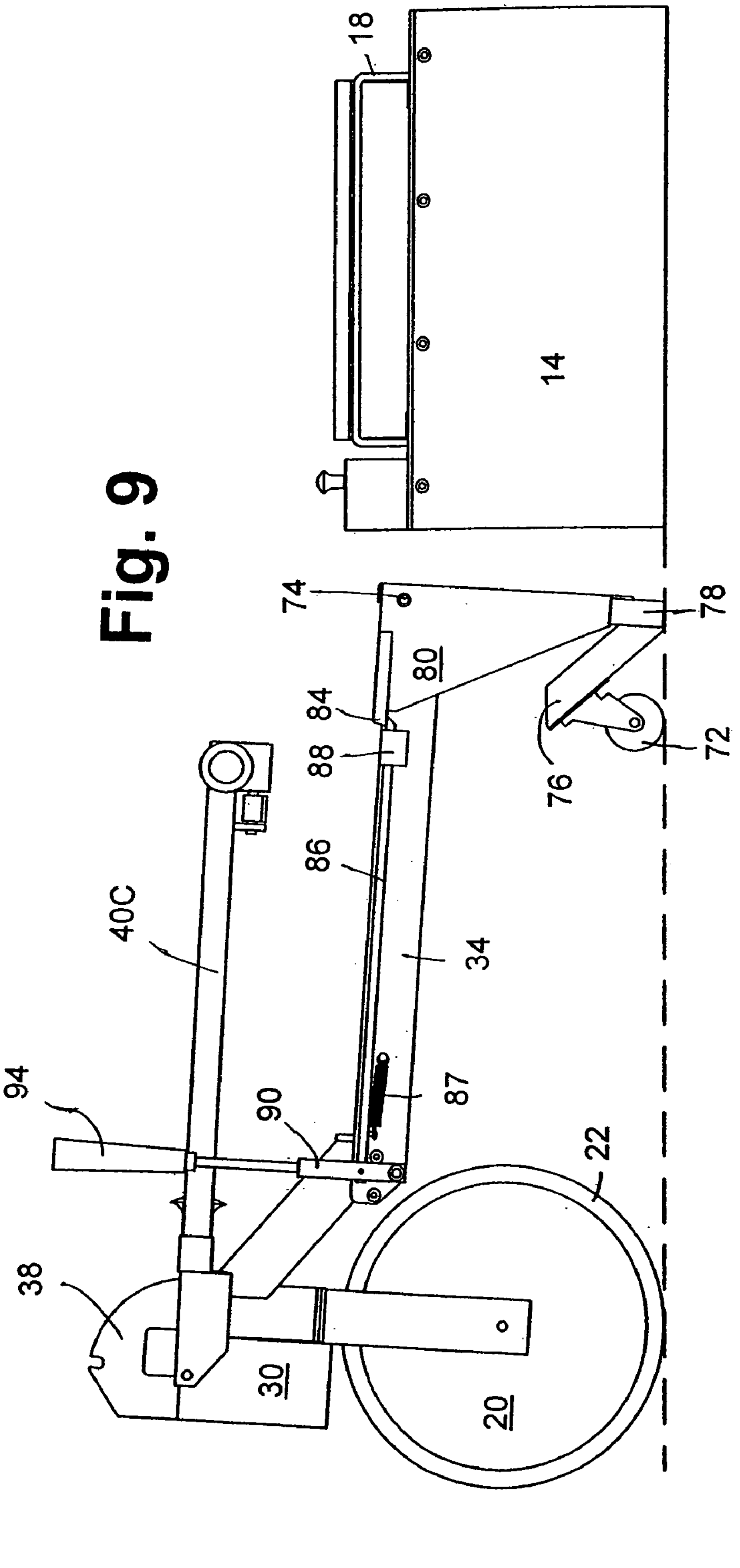
FIG. 9 is a side view of the drive apparatus with the battery removed and the control shaft collapsed for storage.
Figure 10:
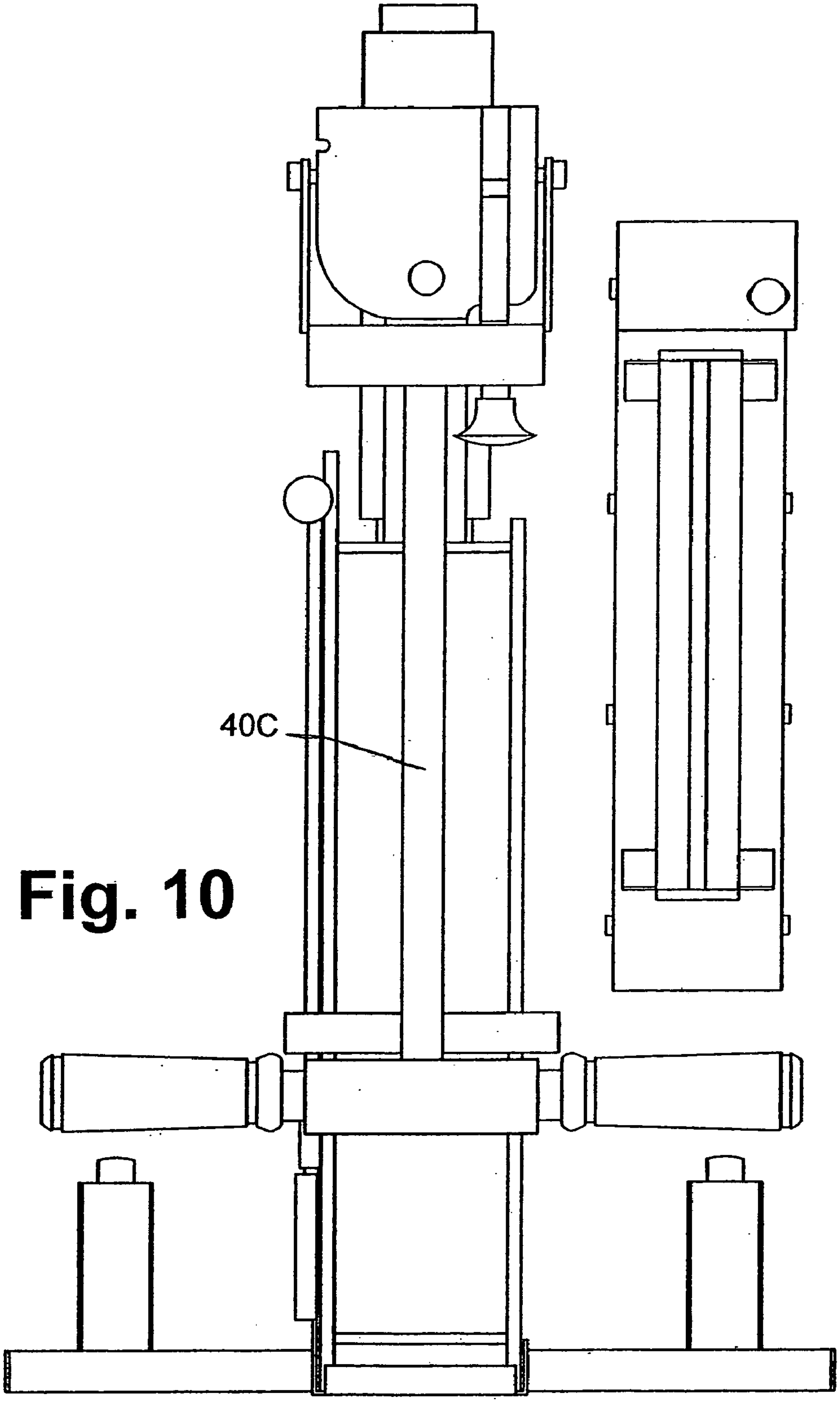
FIG. 10 is a top view of the drive apparatus with the battery removed and the control shaft collapsed for storage.
Figure 11:
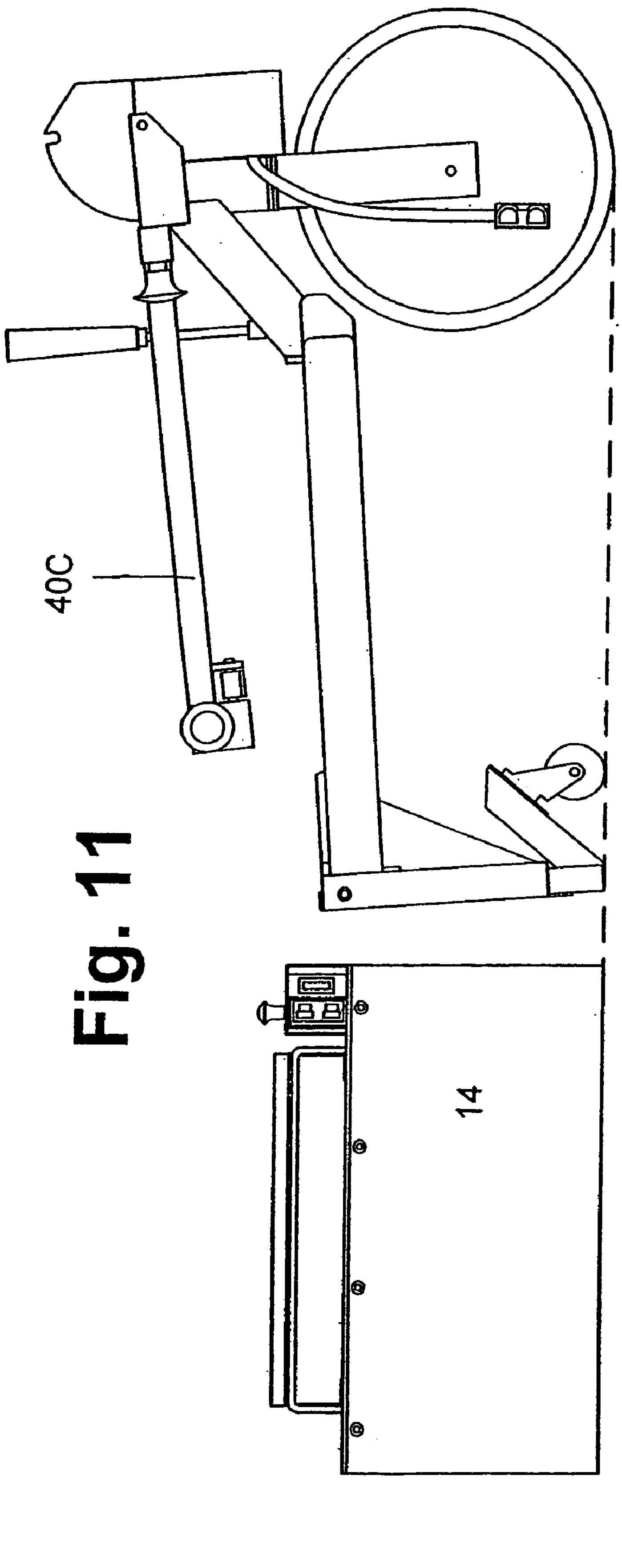
FIG. 11 is a right side view of the drive apparatus with the battery removed and the control shaft collapsed for storage.

A fully retracted or backwards position of shaft 40, position 40C (FIGS. 9, 10 and 11), is for stowing the wheel chair drive apparatus 10. Position 40C provides a compact dimension and smaller overall package size, which facilitates storing the wheel chair drive apparatus in the trunk of a car, or in provided storage on public transportation or elsewhere in a home or office.

Figure 1:
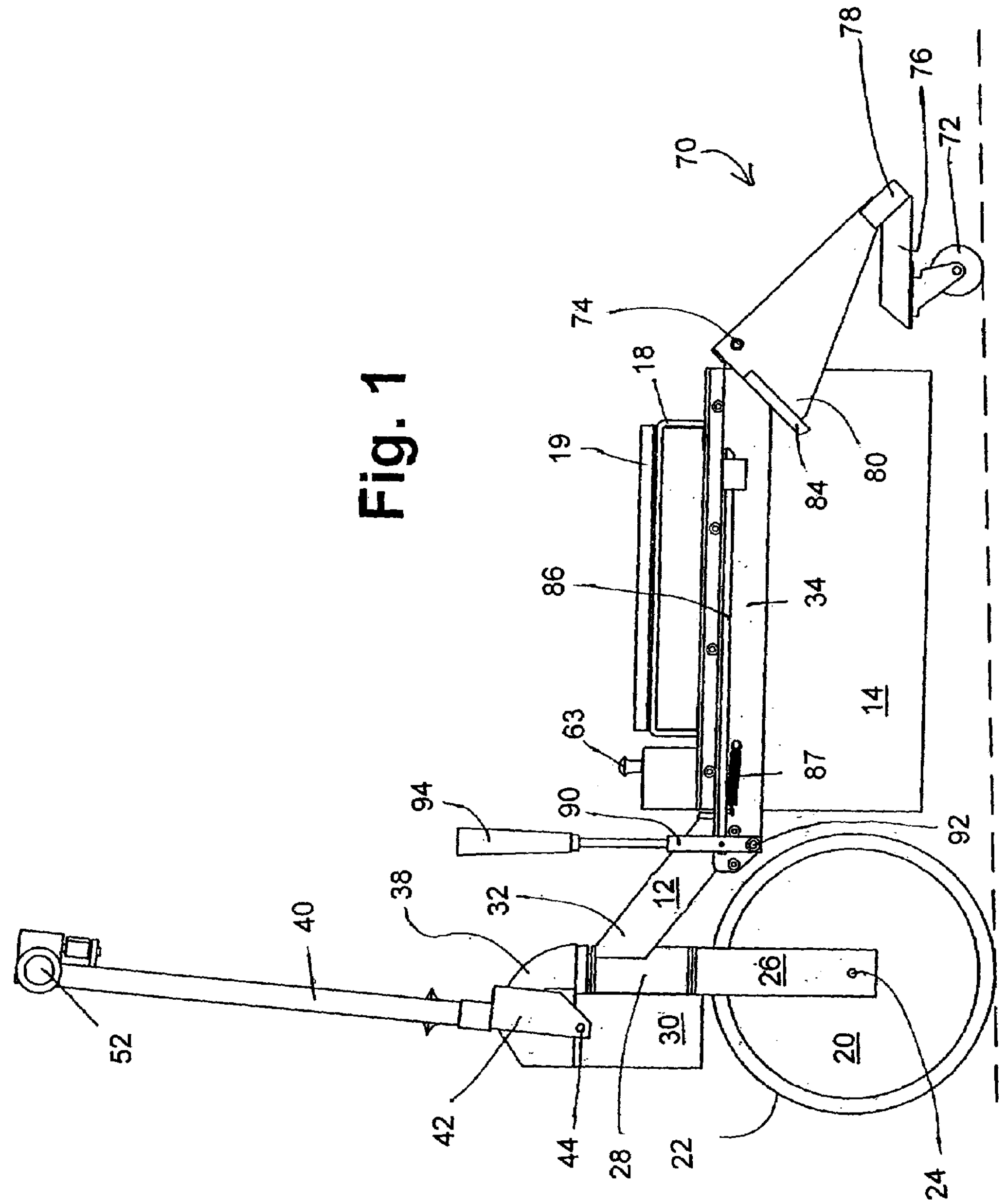
FIG. 1 is a left side view of the drive apparatus for a wheel chair.
Figure 2:
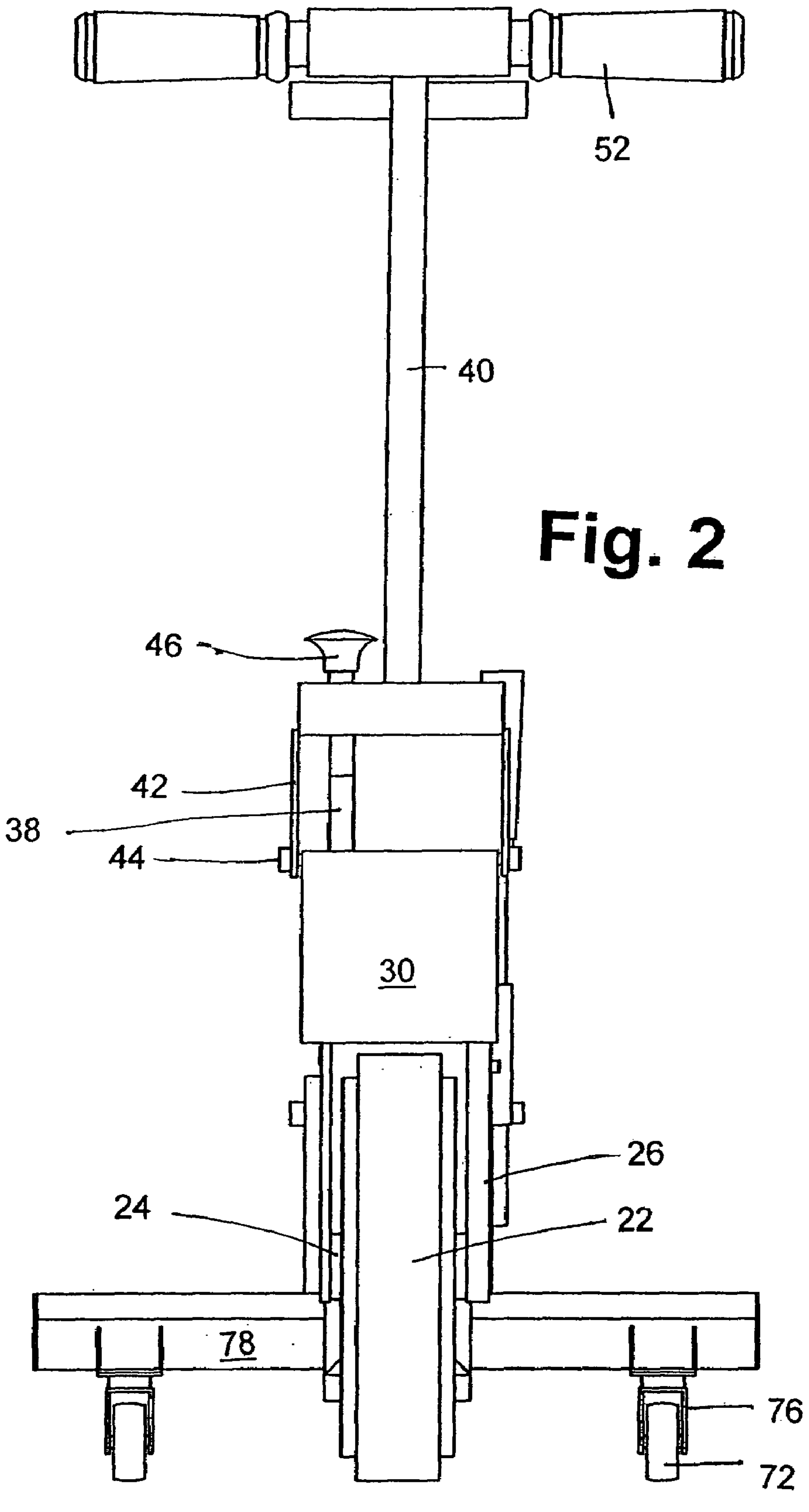
FIG. 2 is a front view of the drive apparatus for a wheel chair
Figure 3:
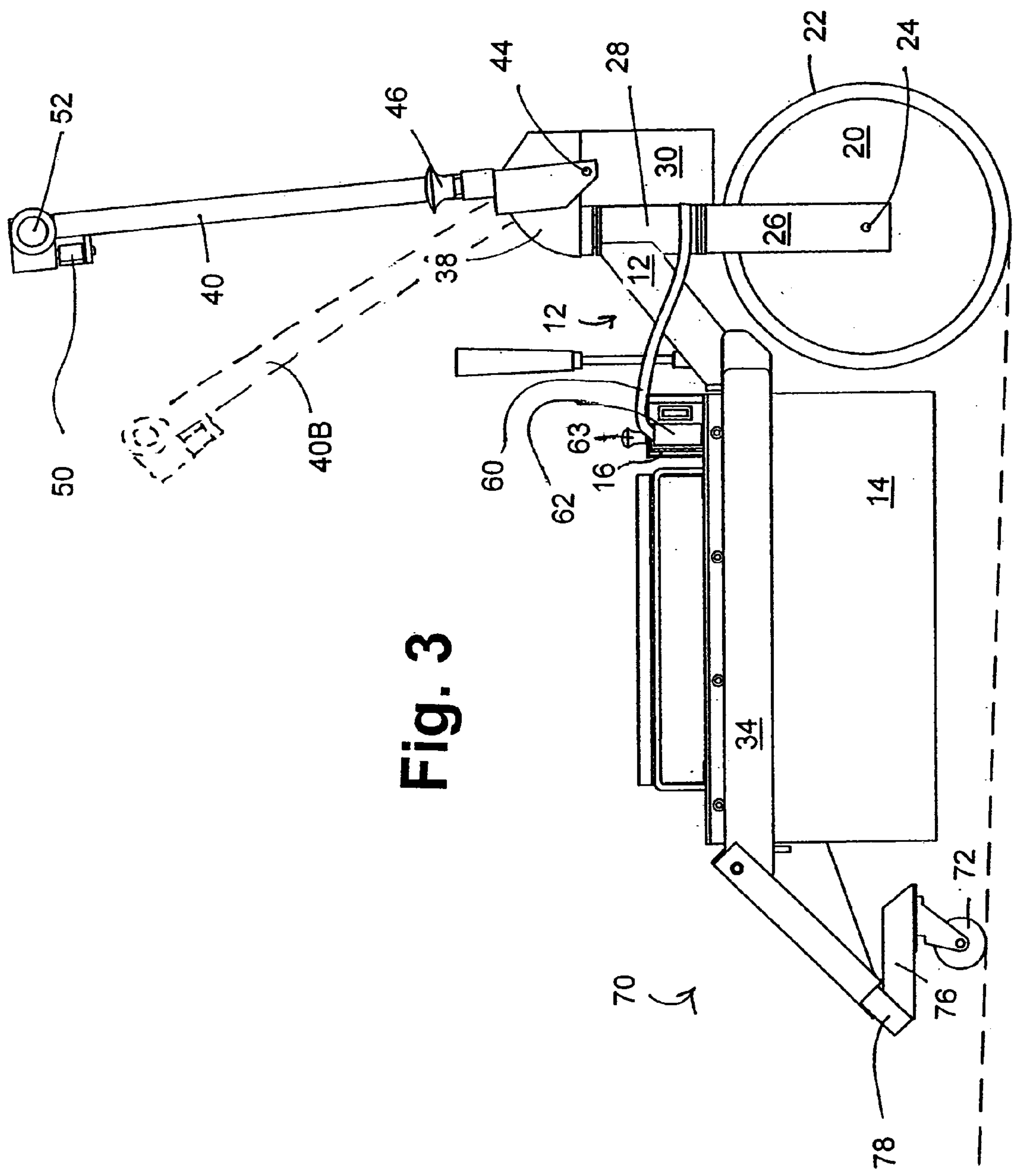
FIG. 3 is a right side view of the drive apparatus for a wheel chair.
Figure 4:
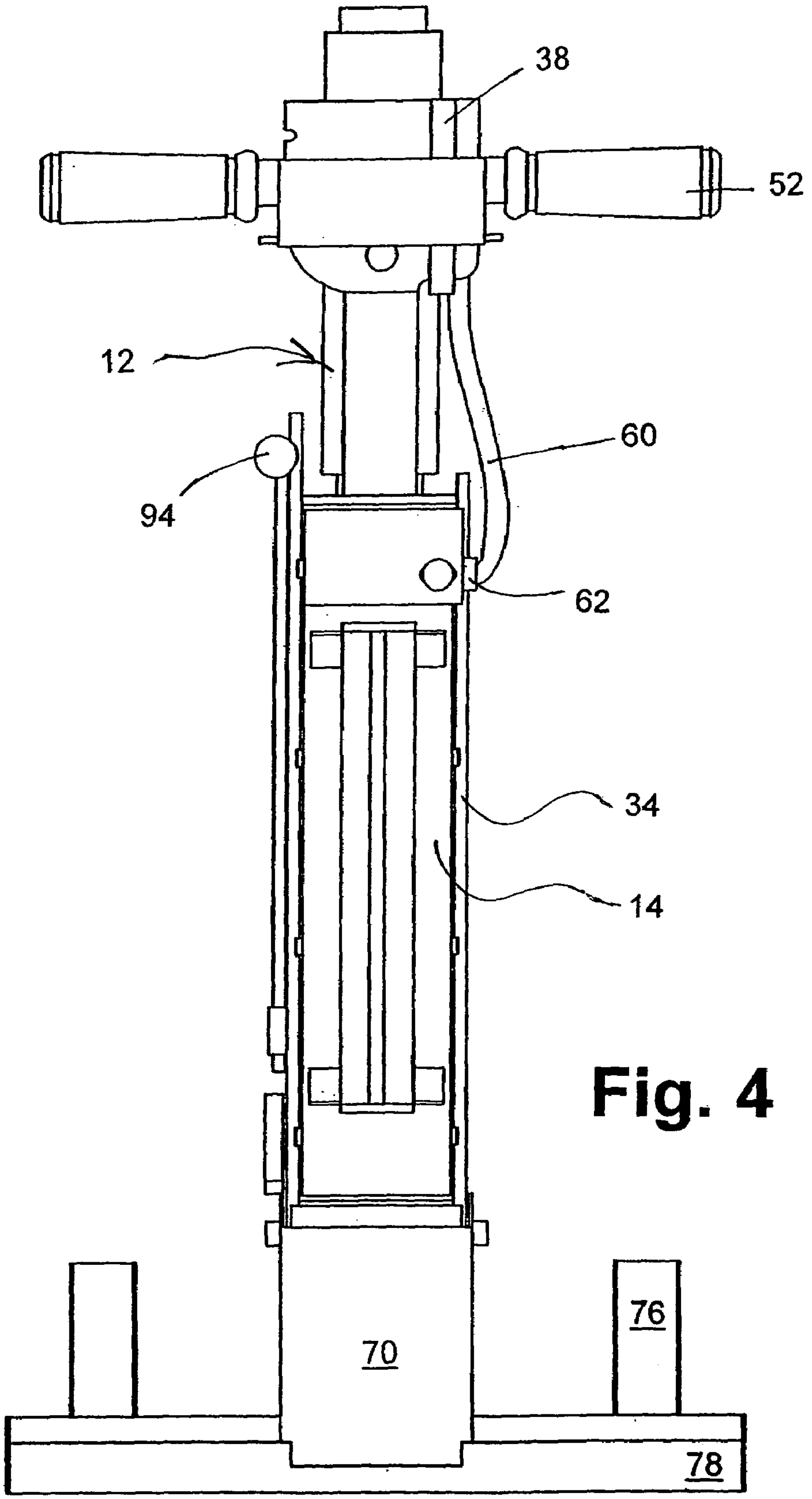
FIG. 4 is a top view.
Figure 5:
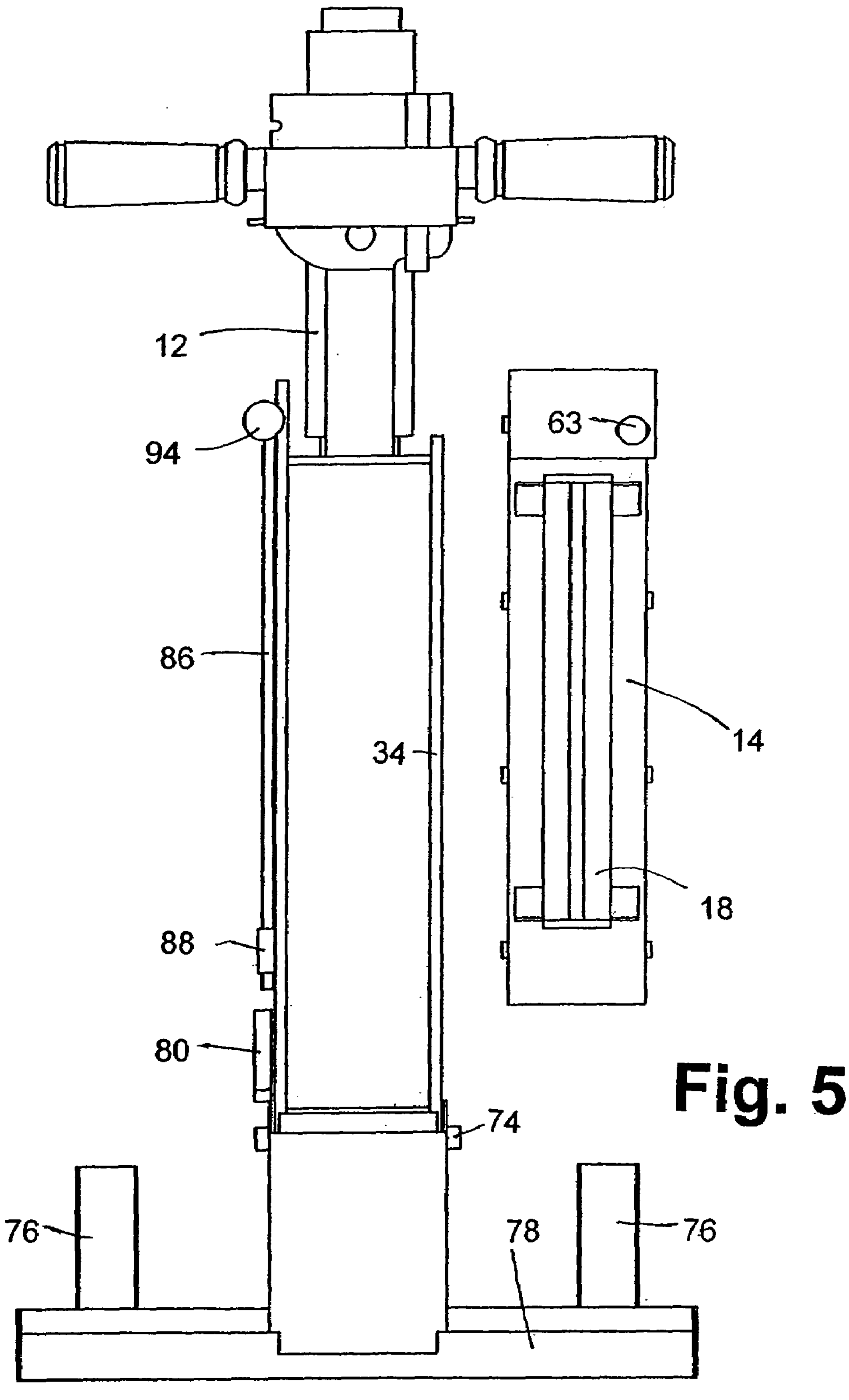
FIG. 5 is a top view with the battery removed.

Control shaft 40 may also be positioned at table position 40B (in phantom, FIG. 3). The prior art mounted adjustable control shafts restricted the proximity the wheel chair occupant could achieve to a table or sink for activities of daily living such as eating a meal, reading or washing. Position 40B allows a control shaft 40 to move backwards towards the wheel chair occupants lap and allow the wheel chair occupant to move forward with his or her knees under a table, desk or sink which in turn facilitates a comfortable distance for eating, reading, washing or other activities.

On top of control shaft 40 are located controls, such as throttle 50, displays (FIG. 12) and handle bars 52.

Power for the wheel chair drive apparatus of the present invention is DC. The DC battery is retained within a battery housing 14. This sealed housing is acceptable for public transportation such as commercial airlines, further easing travel for the disabled, who would otherwise need to make special arrangements for packaging an open battery for transportation.

The battery housing 14 includes a handle 18 and a power jack receptacle 16. The battery housing 14 is assembled with the wheel chair drive apparatus 10 by lowering it into the battery mount 34 of frame 12. In the depicted embodiment, the battery mount is simply two parallel steel rails dimensioned to receive the battery housing 14 and support its weight with the four bolts on each side of the top of the battery housing 14.

Figure 28:
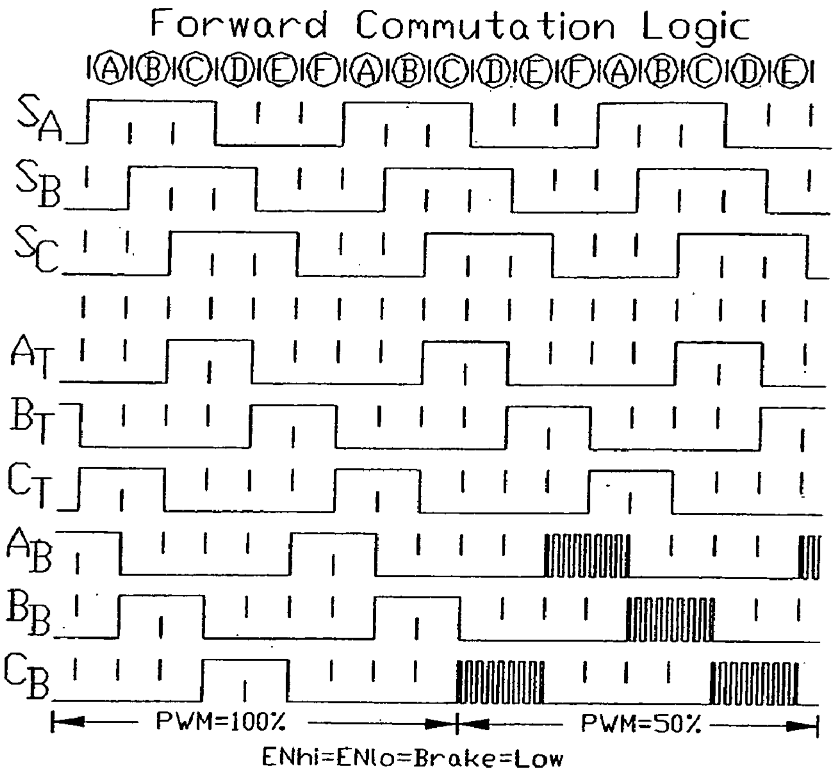
FIG. 28 is a schematic of the forward Commutation Logic.

A power cord 60 has a jack 62 that may be engaged with the corresponding jack 16 during assembly in order that the battery within housing 14 can be electronically engaged with the electric motor within drive wheel 20. In the depicted embodiment, the power cord 60 passes through the front frame and connects to the control printed circuit board at plugs P1 and P2 in FIG. 28. The control printed circuit board plugs, P3, P5, and P5 and jack J3 connect the motor windings and position sense wires through the front frame and down one arm of 26 and enters the drive wheel casing 20 via a through hole in axle 24.

This battery pack is much lighter, approximately 30 lbs., and is internally fused with an enclosed protected connector. If needed, the system provides use of a second battery pack, which can be charging while the first is in use. The battery pack drops into the rectangular opening of the frame and is held in place by gravity. Four bolts located on either side of the battery pack, which holds the cover of the battery pack in place, prevents the battery pack from dropping through the rectangular opening in the frame. The connector is polarity keyed and rated at 50 amps with 10,000 insertions. To charge the battery, the connector providing power to the drive unit is removed from the battery and the battery charger connector is inserted into the battery pack. It is not necessary to remove the battery pack from the drive unit while charging. A connector of this quality requires high contact pressure and therefore an ejector mechanism 63 is preferred.

At the rear of the wheel chair drive apparatus 10 is the swing assembly 70. In the depicted embodiment, the swing assembly is a lever for casters 72. Swing assembly 70 has at least two positions. A first position is substantially upright, at right angles with the battery mount rails 34 (see FIGS. 8, 9, 10, 11 and 15). In this position, the swing assembly may be engaged with swing assembly brackets fixedly mounted to the wheel chair further explained below. In the first position, casters 72 are raised from and disengaged with the ground or floor. The first position is used for engagement with the wheel chair and use of the wheel chair drive assembly for powered driving of the wheel chair. The first position is also used for storage of the wheel chair drive assembly 10 when being transported or otherwise not in use (see, FIGS. 9, 10 and 11). With regards to storage, the first position provides a more compact package size, and maintains the casters 72 in a position disengaged with the ground.

Swing assembly 70 is engaged with the battery mounting rails 34 of frame 12 at pivot 74. Movement of pivot 74 allows for a swing assembly 70 to move into at least one other position. This other position is depicted in FIGS. 1, 3, 6 and 13. An intermediate position is show in FIG. 7. There it can be seen that casters 72 are rotated into a position engaging them with the ground for rolling. Caster mounts 76 are angled such that the castors roll in the second position and do not touch the ground in the first position. The caster mounts 76 are fixedly attached to the swing assembly horizontal bar 78. The swing assembly bar 78 engages with swing assembly mounting brackets, as is more fully described below. This second position of the swing arm assembly 70 is maintained in position and prevented from further backwards rotation by a stop engagement with the battery mounting rails 34 of frame 12. Although any stop arrangement is within the scope of the present invention, in the depicted embodiment, the stop is the leading edge of the horizontal member of the swing assembly, which comes into stopping contact with the top of battery mounting rails 34 when the swing assembly 70 has been rotated to a position engaging the casters 72 with the ground.

The swing assembly 70 includes a forward extension 80 having a locking notch 84. When fully engaged with the wheel chair for driving it, the wheel chair drive apparatus 10 transfers forwards, backwards and turning drive force to the wheel chair through the close, fitted engagement of swing assembly horizontal bar 78 with the horizontal bar mounting brackets, which are fixedly attached to the wheel chair. Accordingly, it is important that swing assembly 70 be securely maintained in its upright, first position when the wheel chair drive assembly is in use. This secure maintenance of the first position is achieved in the depicted embodiment by a locking lever 86, best seen in FIG. 9. Locking lever 86 slides forwards and backwards and its rearward aspect is maintained in horizontal forward and back sliding engagement with battery mount 34 by sliding arm mount 88, which forstalls undesirable upwards and downwards movement of locking arm 86. The locking arm 86 is biased towards maintaining engagement with lock arm notch 84 by a spring 87. A locking arm release lever 90 is pivotedly attached to a frame 12 at pivot 92 and operated by a user with locking arm release lever handle 94.

Figure 6:
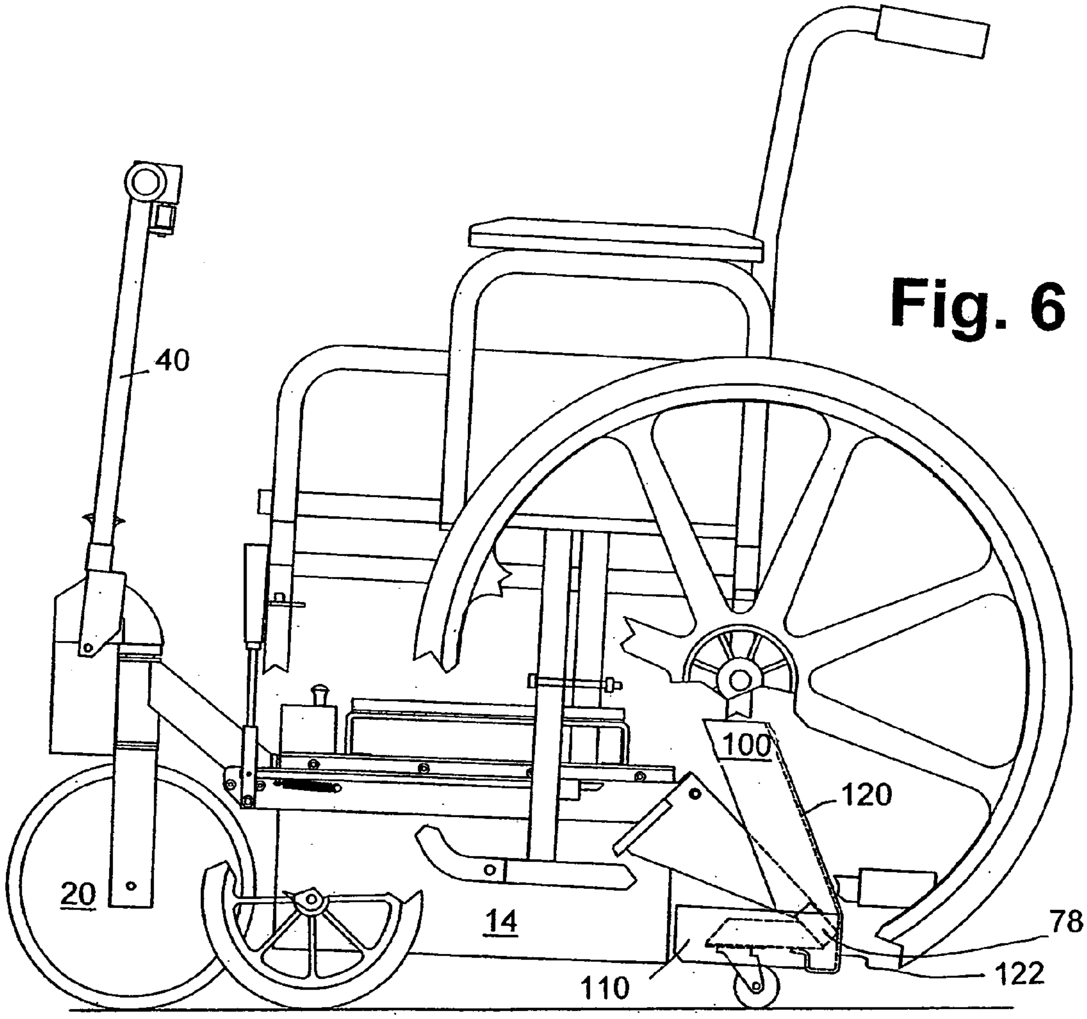
FIG. 6 is a side view with a cutaway depiction of the engagement of the swing arm assembly with the wheel chair mounting brackets in a first position.
Figure 7:
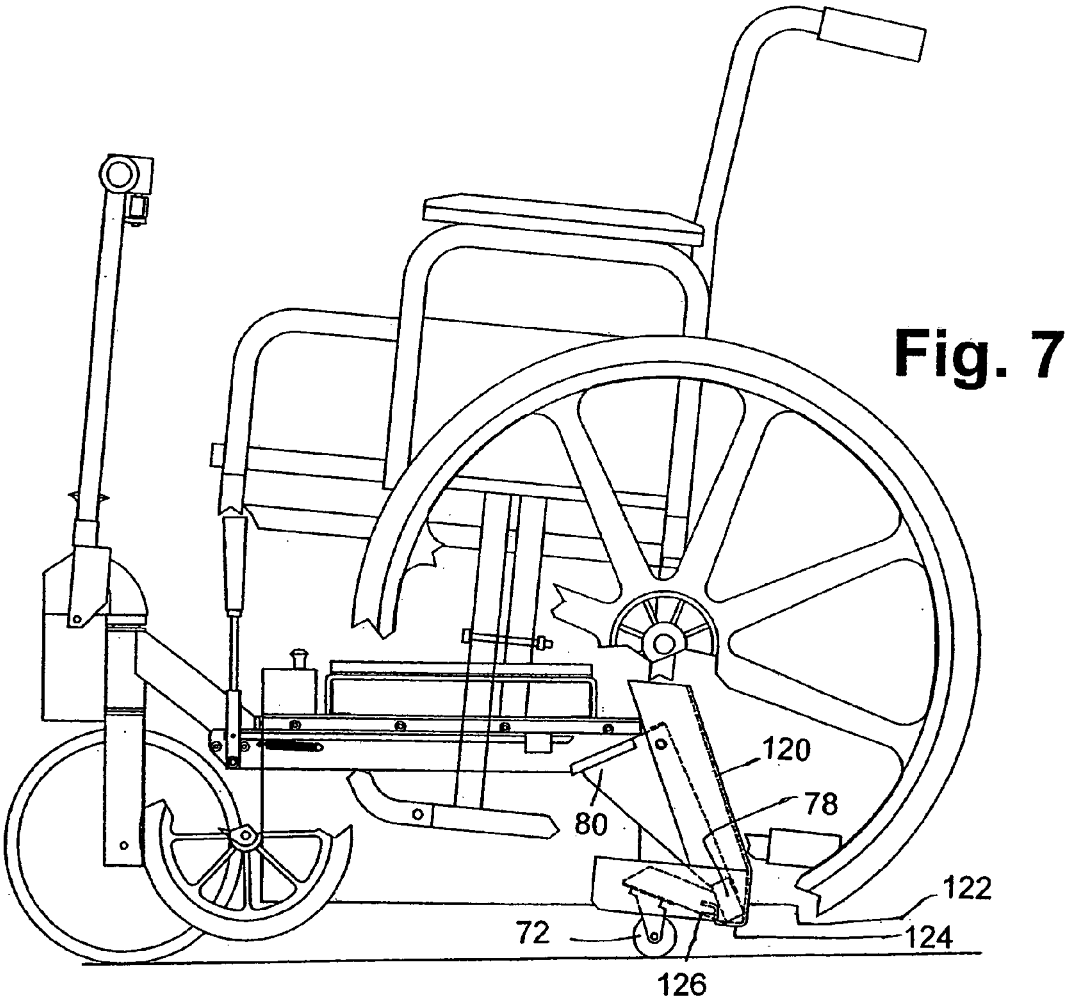
FIG. 7 is a side view with a cutaway depiction of the engagement of the swing arm assembly with the wheel chair mounting brackets in a continuing position.
Figure 8:
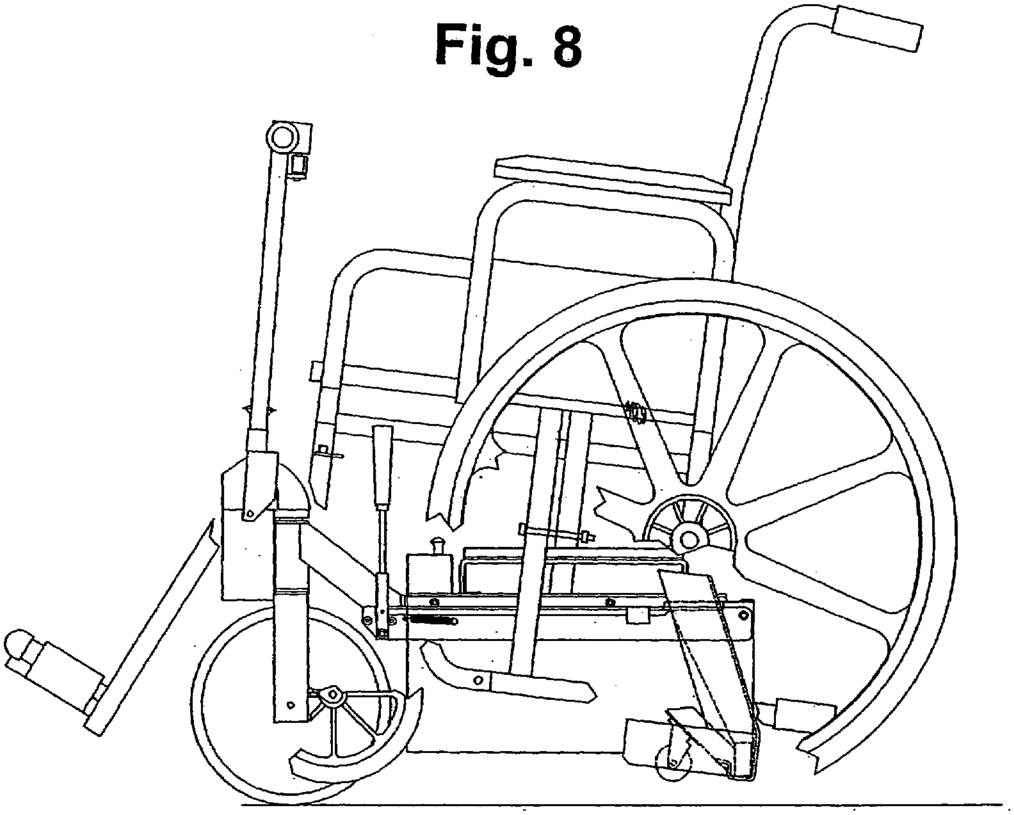
FIG. 8 is a side view with a cutaway depiction of the engagement of the swing arm assembly with the wheel chair mounting brackets in a final position.
Figure 16A:
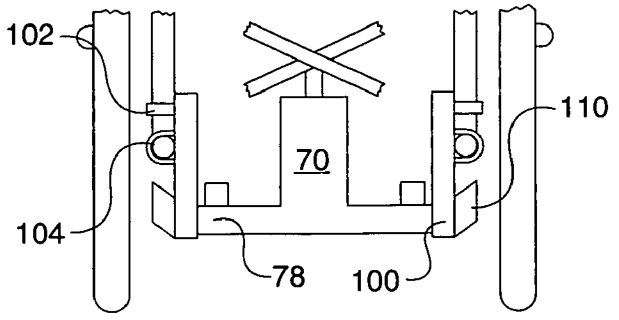
FIG. 16 is a close up view of a mounting bracket.
Figure 16B:
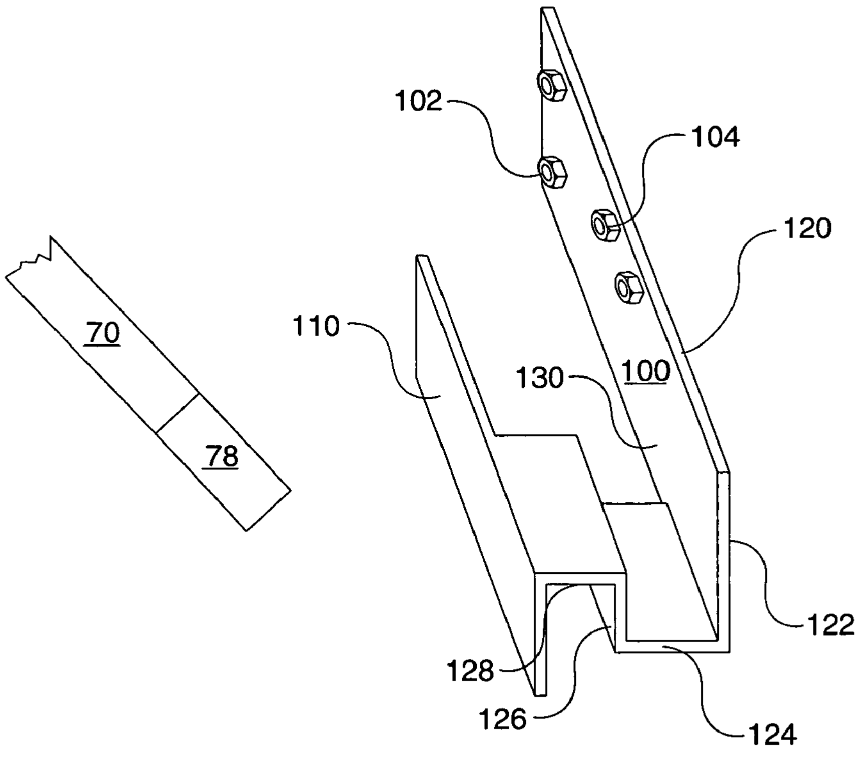
Figure 17:
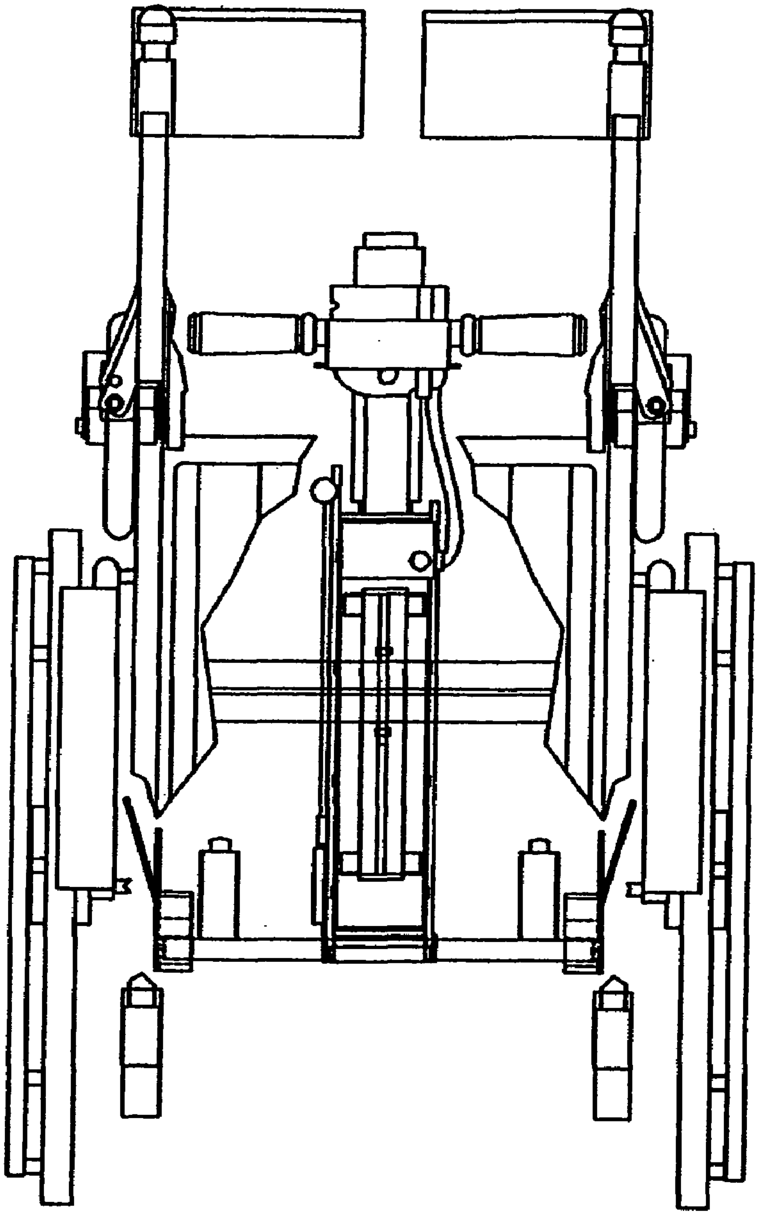
FIG. 17 is a top view of a wheel chair with a cut away.
Figure 18:
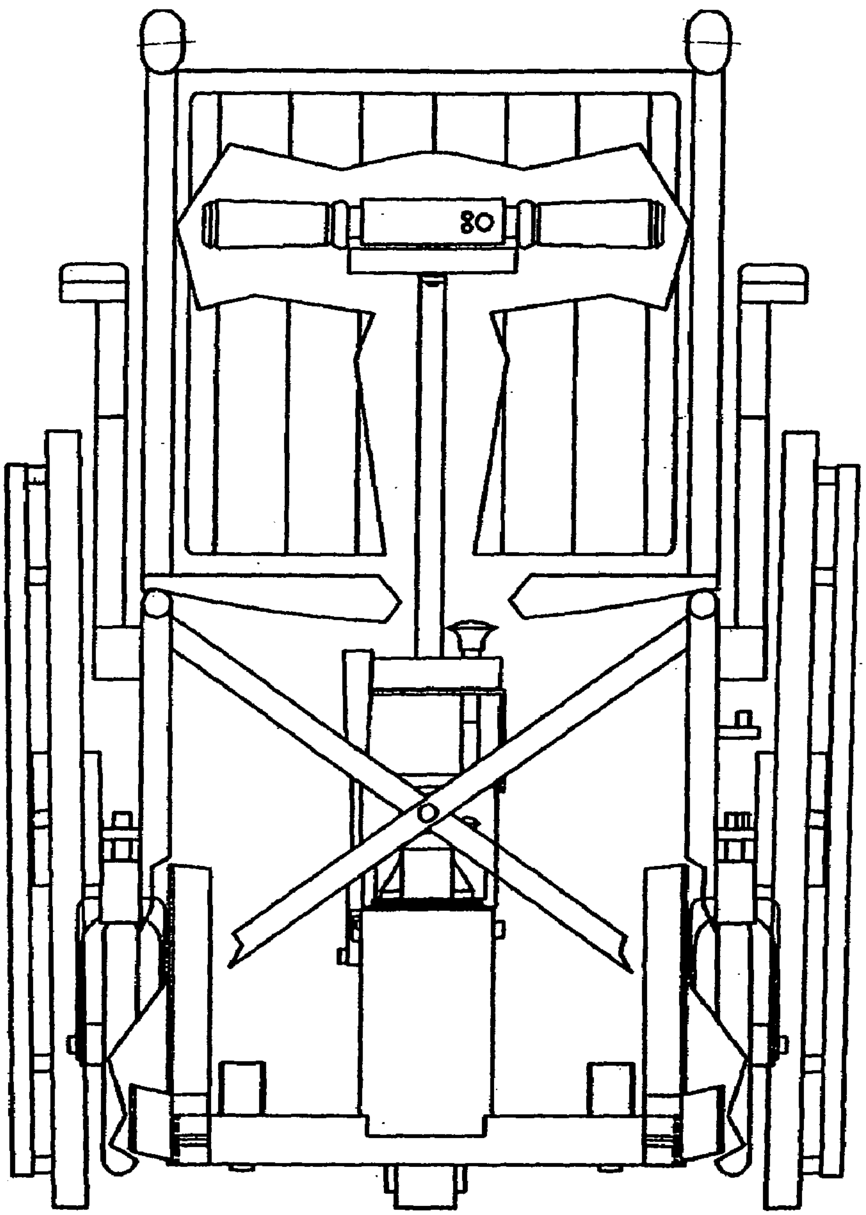
FIG. 18 is a rear view of a wheel chair with a cut away.

FIG. 16 depicts one swing assembly or caster lever mounting bracket 100. FIGS. 6, 7 and 8 depict the mounting brackets fixedly attached to wheel chair. Attachment devices, such as two U-bolts and their respective nuts are used to attach each mounting bracket 100 to the frame of the standard wheel chair. Alternative through holes (not shown) in mounting bracket 100 provide for the adaptability of mounting bracket 100 for attachment to a variety of standard wheel chair frames design.

The mounting bracket has a forward extension 110 which serves as a guide for assisting the engagement of the horizontal bar 78 of swing assembly with the mounting brackets. Because the guide flanges 110 are angled to be progressively wider at their forward aspect, the mounting bracket is able to receive the horizontal bar 78 from a range of directions. Accordingly, ease of engagement of the drive apparatus 10 with a wheel chair is achieved.

Mounting bracket 100 is designed with an engagement face 120 which is substantially at right angles to the side portion of mounting bracket 100 whereon the mounting U-bolts are attached. This engaging face 120 serves as a rearward stop for horizontal bar 78 during engagement. Towards the bottom of the mounting bracket 100 the engagement face 120 is configured with a rear stop engagement face 122, bottom support weight supporting face 124, forward locking face 126 and entry face 128. Together these components 122–126 comprise an engagement seat for horizontal bar 178. For a secure seat, the internal dimensions of faces 122, 124 and 126 are dimensioned to closely cooperate with the external faces of horizontal bar 78. Guide face 128 serves to guide horizontal bar 78 into seat 130 as it is being engaged with the wheel chair for operation.

Engagement operation is executed by setting up the wheel chair drive apparatus 10 on the ground, just in front of the wheel chair. With the wheel chair occupant in the wheel chair and the control shaft 40 in its upwards position, drive wheel 20 is held turned 90° to act as a brake. Swing assembly 70 is in its second “out” position with the casters engaged with the ground. In the second position of swing assembly 70 maintains the handle 18 of installed battery housing 14 at a first level. This first level is lower than the level of the wheel chair cross bars in a standard wheel chair. The wheel chair occupant manually moves his wheel chair forward until guide flanges 100 engage the rearwardly projecting horizontal bar 78 and guide it towards seat 130. When the horizontal bar 78 touches rear engaging face 122, continued forward motion of the wheel chair will cause swing assembly 70 to rotate in a clockwise direction as shown progressively in FIGS. 6, 7 and 8. The wheel chair drive of apparatus 10 is held against being pushed forward by the drive wheel, which is turned 90°. With further forward motion, horizontal bar 78 is pushed downwards so that the bottom of horizontal bar 78 progresses towards its seat against bottom engaging face 124. Swing assembly 70 continues to pivot clockwise direction until it rotates upwards into a substantially right angle to battery mounting rail 34. The locking notch 84 engages the lock slide 86 and pushes it forwards until lock slide spring 87 biases lock slide 86 into notch 84 and holds the swing assembly 70 in its right angle, first position. Simultaneously with this motion, the battery mounting brackets will be raised upwards. Along with the battery mounting rails being raised, battery 14 and its handle are raised. Handle 18 is dimensioned such that when the swing assembly 70 is in its first position, handle 18 engages the cross bar to the wheel chair frame and holds them in a weight supporting position. Also simultaneously with the rotation of swing assembly 70, casters 72 are rotated out of engagement with the ground.

Casters 72, being omni directional, operate with guide flanges 110 to facilitate an automatic mechanic adjustment of alignment as the swing assembly as the wheel chair and the mounting brackets are pushed into engagement with the swing assembly by the wheel chair operator.

Alternatively, the driver can be installed by setting the wheel chair brakes and backing the drive apparatus under the chair under power, which actuates the same mechanisms as described above.

Figure 12:
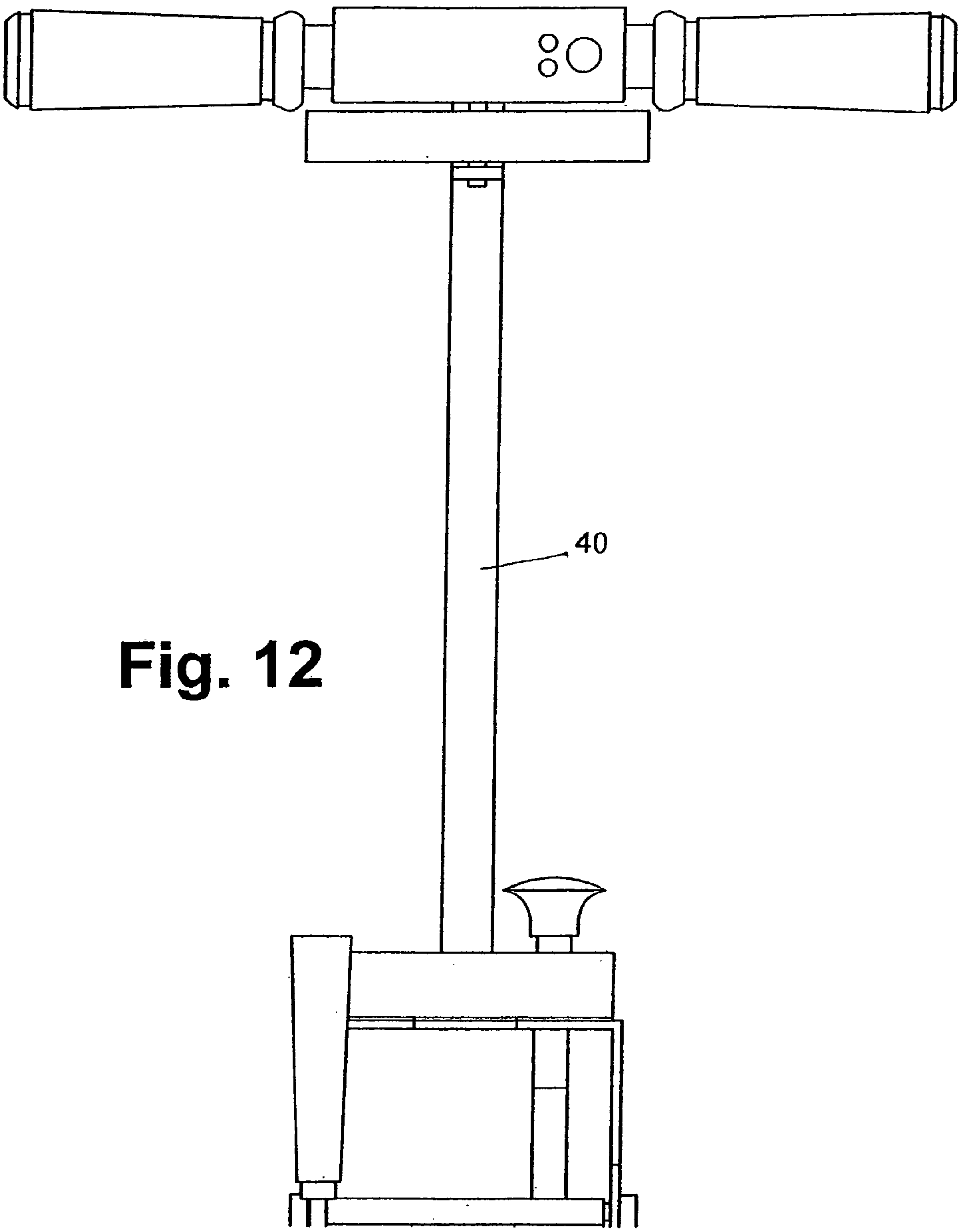
FIG. 12 is a close up of the control module.

Comparing FIG. 12 with FIG. 12A illustrates that when the swing assembly 70 is out and casters 72 deployed, the rear end of the drive apparatus 10 is lower than its front. Consequently, the rear end of the delrin slide 19 on top of handle 18 is also lower than the x-frame member of the wheel chair, which allows the handle to slide under the x-frame easily. In FIG. 12A, the swing assembly 70 is in, and also up, which raises the rear of the drive apparatus 10 and delrin slide 19 into lifting engagement with the wheel chair at the x-frame member.

The weight supporting function of battery handle 18 is through its engagement with the cross bars of the wheel chair frame. This engagement is forward of the wheel chair's main wheels axle and forward of the center of gravity of the wheel chair with its occupant. Accordingly, raising of the wheel chair drive apparatus 10 by engagement of swing assembly 70 concomitantly raises the front casters of the wheel chair off the ground. This prevents interference of these wheels with the progress of the wheel chair with its bar style or main wheels or bar style or drive wheel 20 over minor obstacles. The wheel chair casters are only raised a small vertical distance however. Accordingly, they serve as anti-tip safety wheels or out riggers in the event of a sharp turn or hill or ramp that may otherwise threaten to tip the wheel chair and drive apparatus over.

Motor/Wheel Combination

In the present invention, the motor is the wheel. The wheel incorporates an inverted rotor design with a stationary stator at the center of the motor and the rotor on the outside. A tire is molded directly onto the outside of the rotor housing.

Figure 19:
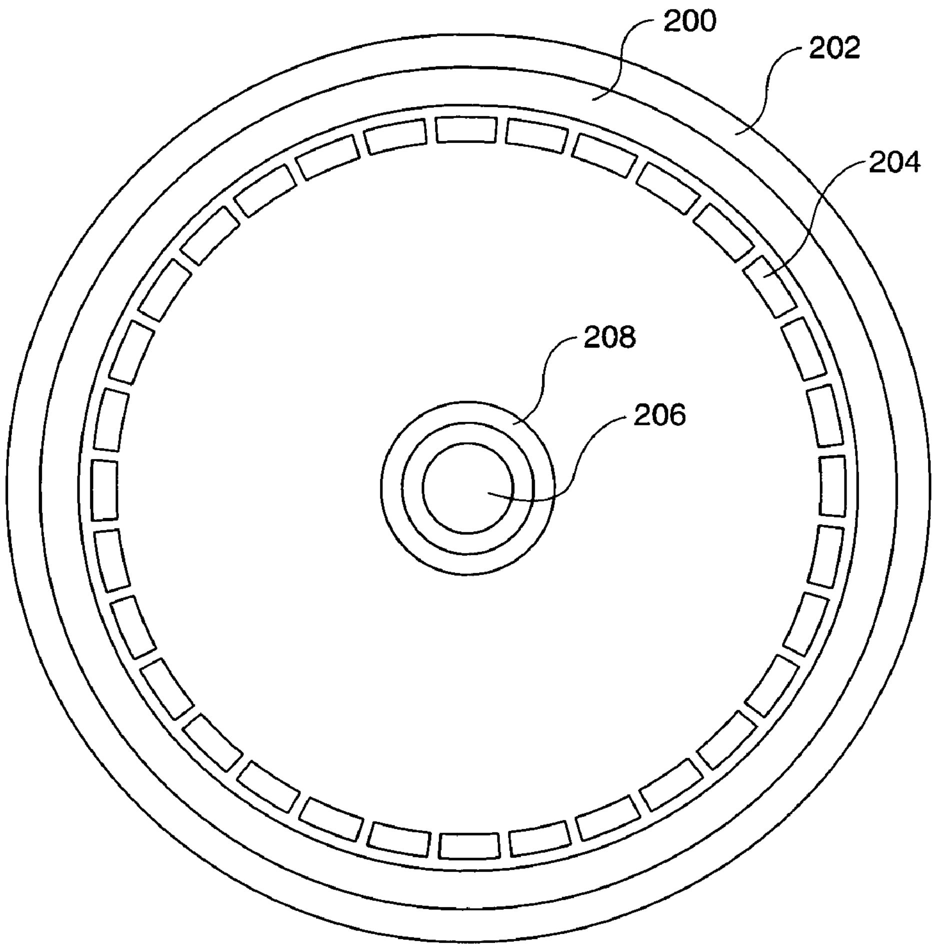
FIG. 19 depicts the outer shell and the internal magnets of the motor.
Figure 20:
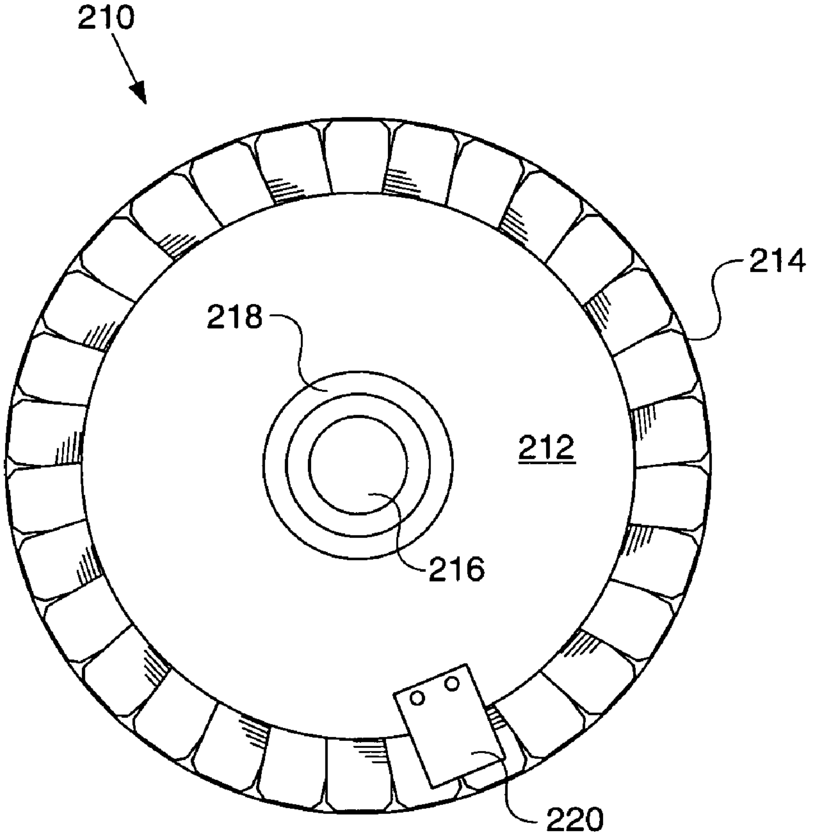
FIG. 20 depicts stator and windings of the motor.
Figure 21:
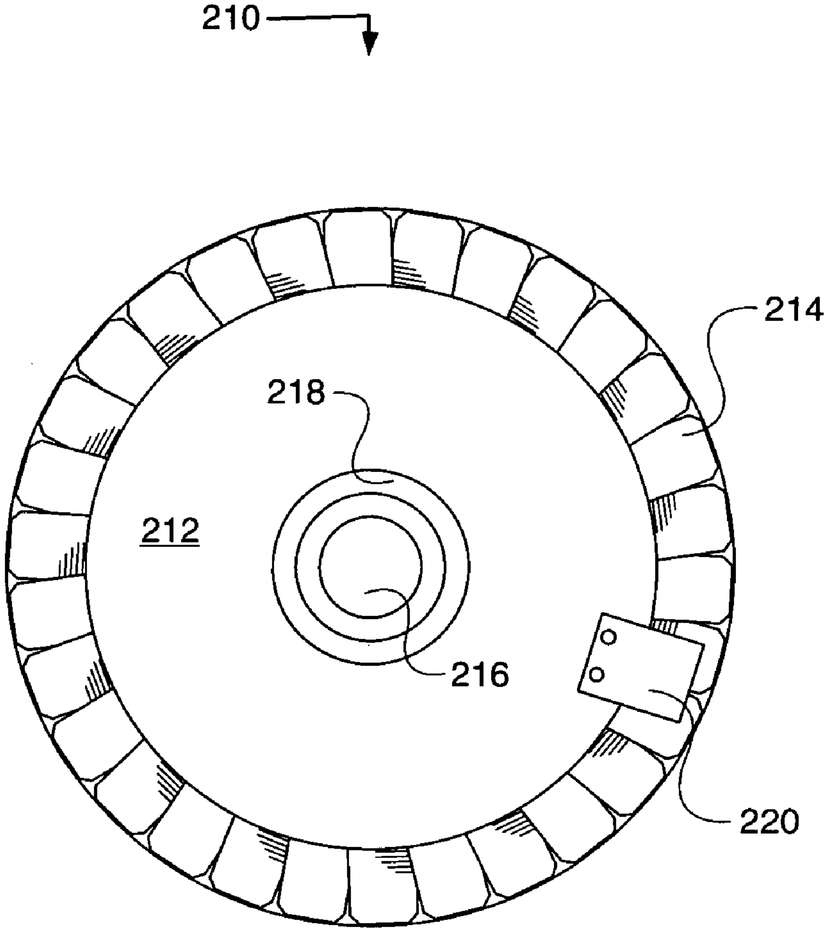
FIG. 21 depicts the stator and housing as assembled.

FIGS. 19, 20 and 21 depict the components of the wheel/motor assembly separately and in combination (FIG. 21). The wheel is a hollow housing 200 comprised of a steel tube 200 having width and two substantially flat housing covers 201 which bolt to the ends of the tube. FIG. 19 is a side view of the wheel with one housing cover removed. The tire 202 is molded directly onto the exterior of the wheel. On the inner surface of the wheel housing 200 are fixed the permanent magnets 204 of the motor. In the depicted embodiment, there are 32 magnets 204. They are attached to the inner face of the wheel housing through any appropriate means, as for example adhesive. The wheel housing 201 further has a through hole together with a recess 208 or a bushing seat. A spring washer, other type of washer or bearings may be installed.

FIG. 20 depicts the stator assembly 210. The stator assembly 210 is first comprised of a mounting block 212. In the depicted embodiment, the mounting block is steel or alternatively aluminum. On the circumference of the mounting block 212 is bolted a 45 slot winding lamination stack 214. At the center of the mounting block is an axle 216 surrounded by a bearing 218.

Also mounted on the mounting block 212 are three hall element position sensors (not shown) mounted on a printed circuit card 220.

FIG. 21 depicts the two elements assembled together, with the wheel housing backing plate still removed.

Figure 22:
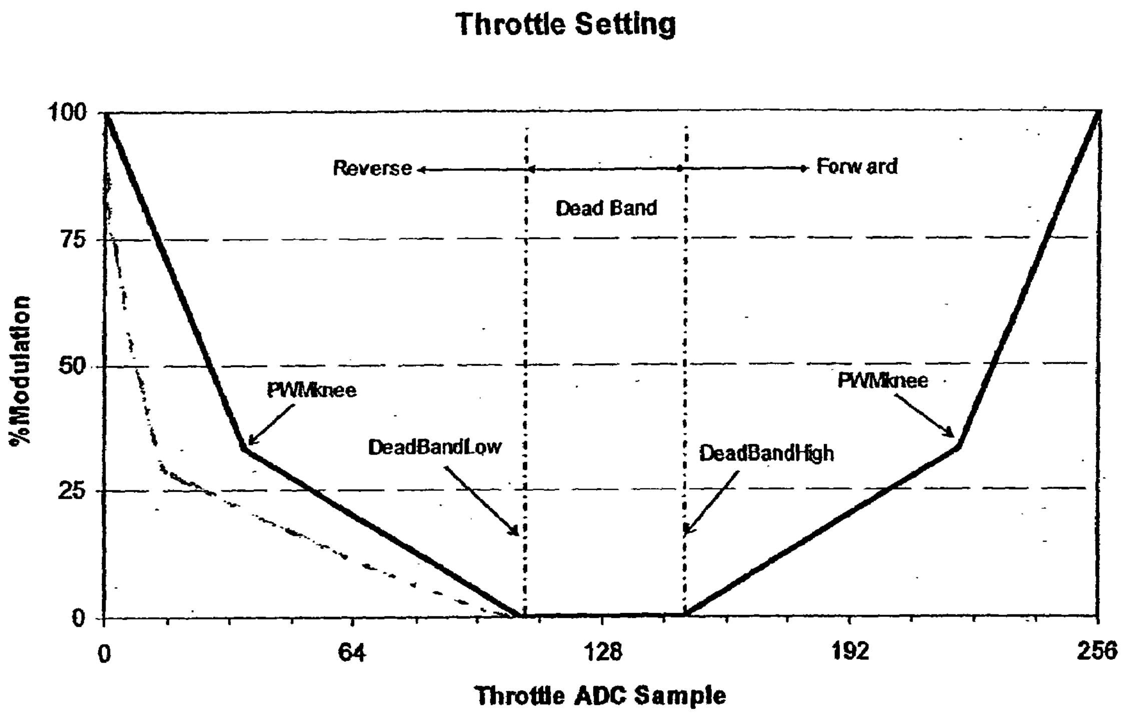
FIG. 22 is a draft of the throttle settings in the depicted embodiment.
Figure 83:
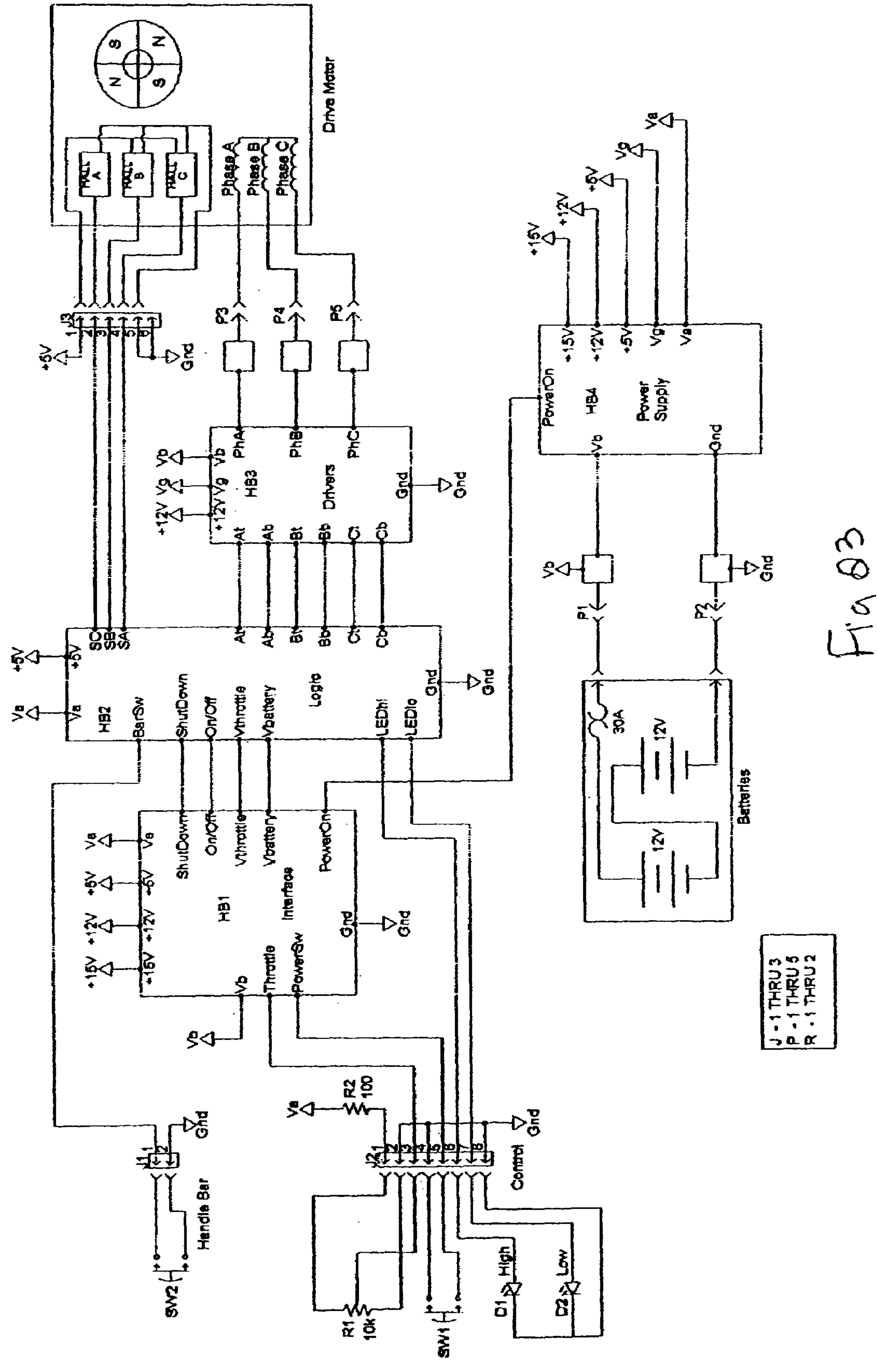

FIG. 22 plots a maximum throttle setting limit for the depicted embodiment. The X axis represents a digitized throttle position marker. The mechanical throttle lever is mechanically linked to a variable resistor potentiometer. The voltage present at the wiper of the potentiometer is digitized for input into the logic data structure of the present invention. Accordingly, the possible range of throttle positions is divided into 256 and each of the 256 positions are associated with a throttle limit.

Because faster speeds are executed by increasing the duty cycle of the pulse width modulated motor current, with a maximum possible speed executed by expanding the duty cycle to 100 percent, the Y axis of FIG. 22 represents a throttle setting limit as a percentage of this pulse width modulation. Accordingly, the data structure of the present invention establishes a maximum pulse width for each position of the throttle. It is within the scope of the present invention that any percentage modulation be associated with any throttle position in the data structure. However, it is obviously more advantageous to associate certain limits with certain positions.

Most throttle setting limit configurations will have a maximum at the extreme ends of the throttle actuation, consistent with the user's expectations. Accordingly, the far left and right hand sides, corresponding to the zero and 255 positions of the throttle, are set to 100 percent modulation. A central area at or surrounding the middle position of 128 will be a rest position. In the depicted embodiment, a broad rest position area or "dead band" is established. This dead band, which establishes an unresponsive area of throttle movement, prevents actuation of the motor in response to unintentional, accidental or otherwise idle movements of the users hand. Between the external boundaries of the dead band, in the vicinity of positions 110 and 142 in the depicted embodiment, respectively, the throttle setting limit graduates from zero to maximum.

More precise control at lower speeds is important for wheel chairs, as well as other applications of the present invention intended for operation in narrow and sometimes tortuous spaces, for example fork trucks and disabled carts for shoppers. Accordingly, a very high throttle setting at a throttle position corresponding to the user requesting an initial or slow move is disadvantageous. Therefore, when the user presses the throttle slightly, only a low percentage of modulation, corresponding to a low throttle setting limit will be actuated. This limit will in almost all circumstances increase with continued turning or depressing of the throttle by the user. Should the user desire to continue moving slowly, the throttle can be held in position and the low throttle setting limit, corresponding to a low speed will move the wheel chair. As the user depresses the throttle to a higher (or lower) position, a higher throttle setting limit, allowing a faster speed, is correlated by the data structure of the present invention. At some point, in most circumstances a user will feel that they are underway and clear of any obstacles and therefore desire to accelerate to something more closely associated with a cruising speed. Accordingly, the slope of the throttle setting limit increase with the throttle position may become steeper. In the presently depicted embodiment, there are two slopes divided by a "knee" located at approximately positions 220 for forward and 40 for reverse. The choice of slope, choice of different slopes separated by different "knees," choice that the correspondence between percentage of modulation and throttle position be by exponential function or other smooth curve are all considered to be within the scope of the present invention. A data structure having any such correlations between the throttle position and the percentage of modulation limit are within the scope of the present invention. Moreover, a distinction may be made between the reverse speed, which of course, requires a user to turn and look behind them, and a forward speed. In the depicted embodiment, an alternative throttle setting for reverse direction is depicted in phantom. It has a substantially similar shape to the previously described curve, however, all the throttle setting limits are lower for the reverse band than they are for forward band.

Circuit Description for Wheel Chair Attachment Control Board

FIG. 23 is the base schematic of the electronics used to control the permanent magnet brushless DC motor (PM-BLDC) wheel of the mechanism.

Connector J1 on the control board is wired to a normally open snap action switch that is closed only when the handle bars are locked in place.

Connector J2 on the control board is wired to the user controls using a flexible cable through the handle bar column. Potentiometer R1 is mechanically coupled to the throttle causing the voltage on the wiper to vary depending upon the position of the throttle lever. Power for the potentiometer is provided through resistor R2 which provides some protection for the control board power circuits in the event of a short in the cable. When assembled, the potentiometer is set so that when the throttle is pressed to the full forward position, the resistance between the wiper and the grounded side is approximately 1000 ohms. Switch SW1 is a normally open, momentary switch that is used to turn the unit on and off. LEDs D1 and D2 provide an indication of the battery voltage when the control board is on. The conditions of the LEDs are defined in the following table:

| Battery Voltage | “High” LED | “Low” LED |
|---|---|---|
| Above 25.5 | On | On |
| 24.5 to 25.5 | Flashing | On |
| 23.5 to 24.5 | Off | On |
| 22.5 to 23.5 | Off | Flashing |
| Below 22.5 | Off | Off |

Power for the system is provided by two 12 volt batteries connected in series, fused and connected to the control board to the plugs P1 and P2 with a cable. This provides the nominal 24 volt supply providing the supply voltage to the system.

Plugs P3, P4, and P5 connect the three phases of the motor to the control board. The three Hall position sensor signals from the motor are connected to the control board at connector J3. Power is also connected to the hall sensors with this connector.

Schematic block HB1 contains the circuitry that converts various signals to and from a form that is compatible with the logic circuitry contained in schematic block HB2. The circuitry to convert the commutation signals into the motor drive is contained in schematic block HB3. Block HB4 contains the circuits to generate the five system supply voltages from the battery voltage.

Figure 24:
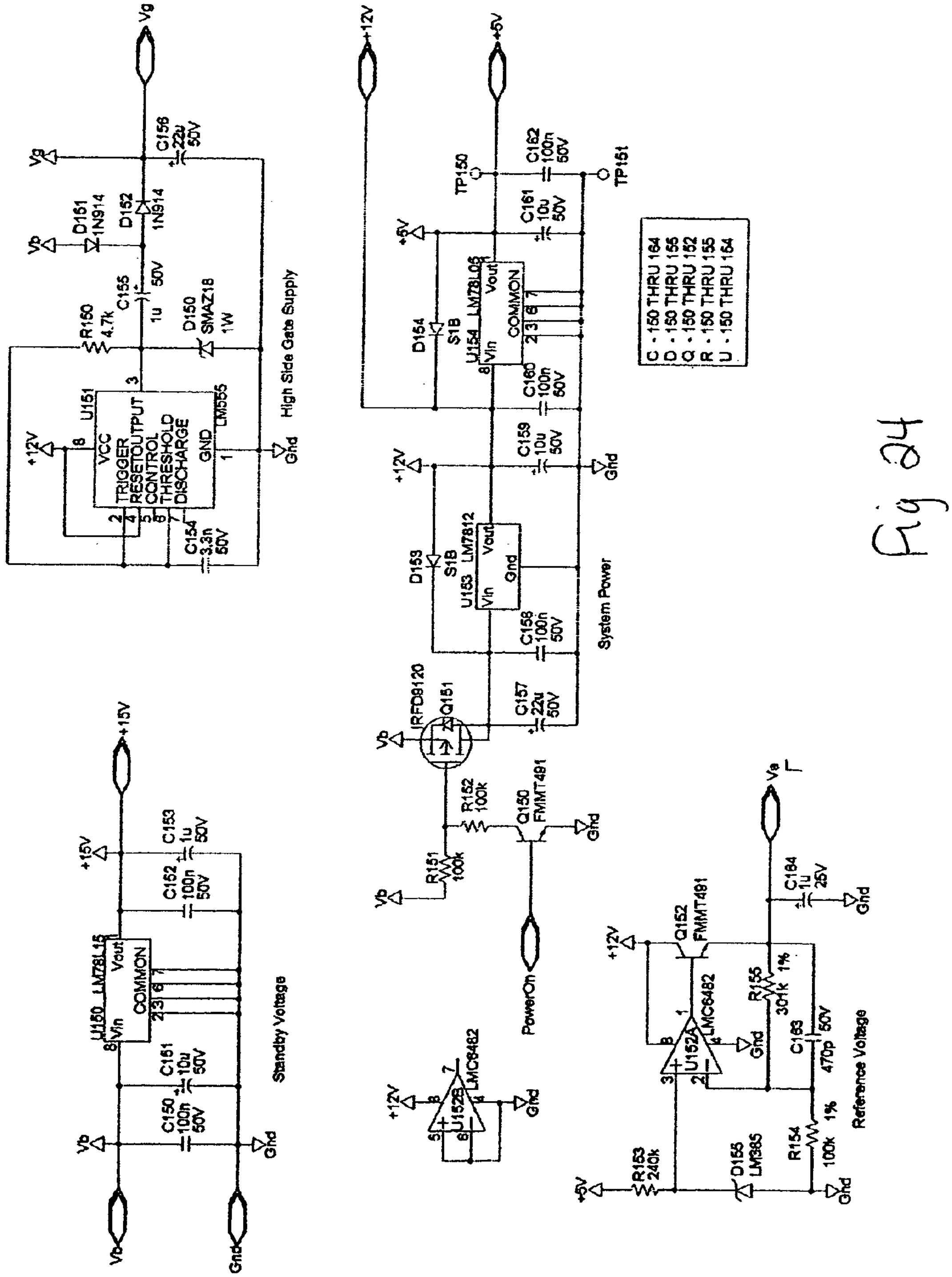
FIG. 24 is the power supply timing diagram.

FIG. 24 is the Power Supply schematic. A 15 volt power supply is generated by the voltage regulator U150 from the battery voltage, Vb. This voltage is always present and is used to operate the system power on and power off circuits. When the system is operating, the PowerOn signal will keep Q150 turned on which in turn keeps Q151 conducting current from the battery input to the 12 volt regulator U153. The regulated 12 volts is input to the 5 volt regulator U154 to generate the 5 volt logic supply. When the PowerOn signal keeps Q150 cut off, Q151 does not conduct and the 12 volt and 5 volt supplies remain off. Capacitors C157 through C162 filter noise from the power supply signal and prevent the regulator outputs from oscillating.

The timer IC U151 is configured as an oscillator with its output (pin 3) slightly below the 12 volts on the power pin or just greater then 0 volts. The frequency and duty cycle are set by the resistor R150, capacitor C154, and the internal characteristics of the device. The output is added to the battery voltage using capacitor C155 and diodes D151 and 152 creating a voltage that is approximately 10 volts greater then the battery voltage. This voltage is filtered with C156 and is used to turn on the high side drive MOSFET transistors of the motor drive.

The precision 1.24 volt reference diode D155 is amplified by U152A and Q152 to generate the 4.97 reference supply voltage Va. This supply is used with the analog interface circuits to the microprocessor.

$$Va = 1.24 \times \left[1 + \frac{R155}{R154}\right] = 1.24 \times \left[1 + \frac{301\text{k}}{100\text{k}}\right] = 4.97$$

Figure 25:
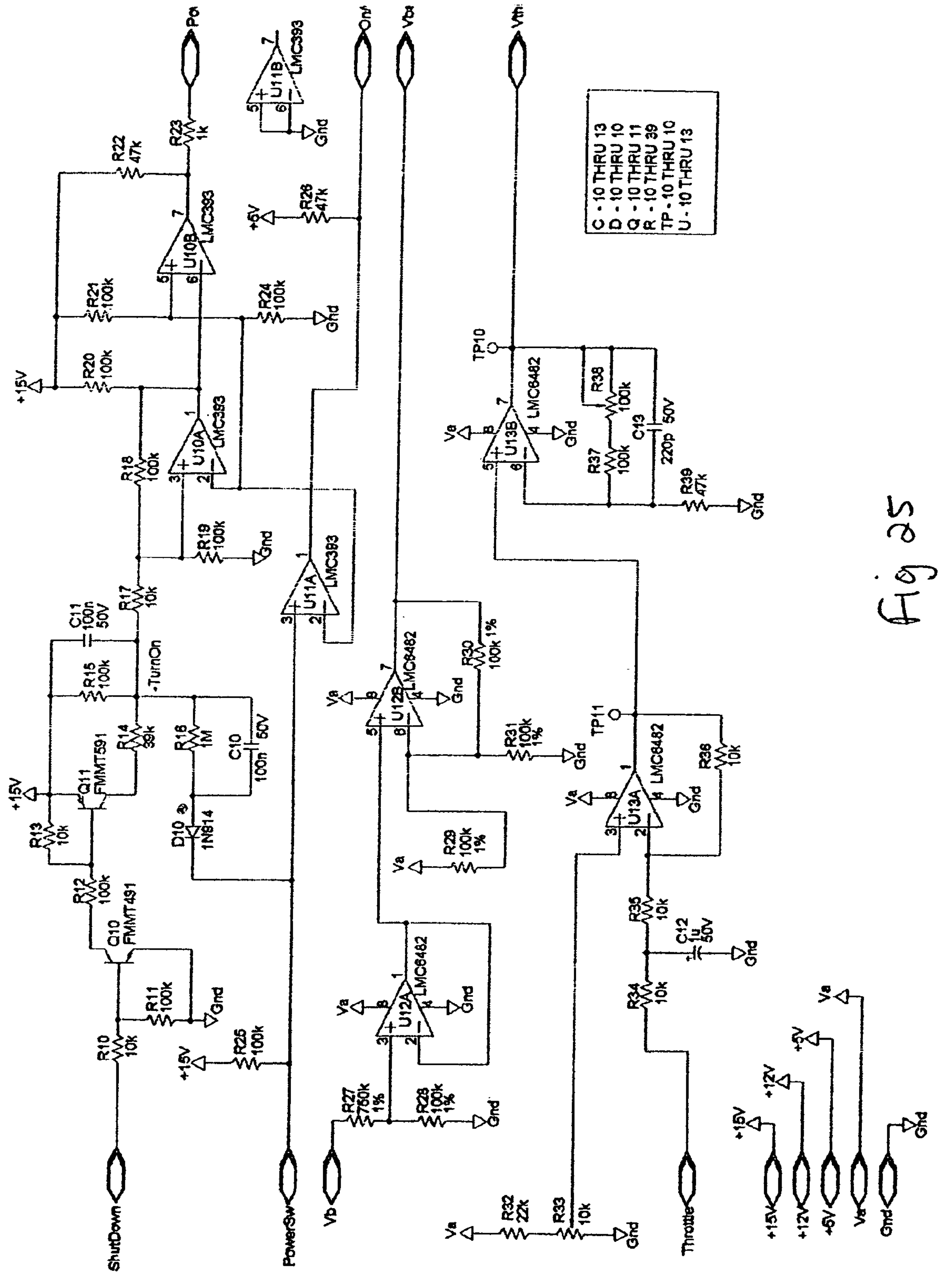
FIG. 25 is the interface circuit timing diagram.

FIG. 25 is the schematic for the Interface Circuits. The power up and power down control circuitry utilizes two signals to generate the PowerOn control signal previously described. This circuitry is powered by the +15 volt supply which is always present. When the system is powered off, the ShutDown signal from the Logic circuits can not source current into Q10, keeping Q10 from turning on. Normally the PowerSw signal (generated by SW1) is open, keeping the node labeled—TurnOn pulled to the +15 volt supply through resistor R15. In this state the output of comparator U10A is pulled to the +15 volt supply causing the output of comparator U10B, the PowerOn signal, to be near ground. This keeps the remaining power circuits from turning on as previously described. Capacitor C11 parallels R15 so that the comparators do not cause power to turn on when the circuit is first connected to the batteries.

The battery voltage is divided by 8.5 using resistors R27 and R28. This voltage is buffered by U12A and is amplified by three with the analog reference voltage, Va, subtracted from it by amplifier U12B to generate the Vbattery signal.

$$\begin{aligned} Vbattery &= 3 \times \left[\frac{R28}{R27 + R28}\right] \times \text{Battery} - Va \\ &= 3 \times \left[\frac{100\text{k}}{749\text{k}100\text{k}}\right] \times \text{Battery} - 4.97 \end{aligned}$$

The amplifier U12B will clip at its power supply voltages keeping the Vbattery signal in the range of 0 to 4.97 volts, corresponding to a battery terminal voltage range of 14.1 to 28.2 volts respectively.

The Throttle signal is the connection to the wiper of the potentiometer on the handle bars. The potentiometer is set so that the resistance between the wiper and the ground terminal is approximately 1000Ω when the throttle lever is pressed to the forward limit. The voltage increases as the throttle is released and then applied in the reverse direction. The total rotation of the lever is 140°, the potentiometer value is 10 kΩ with a full rotation of 330 degrees. The change is the throttle resistance is:

$$\Delta R_T = 10000\ \Omega \times \frac{140}{330} = 4250\ \Omega$$

Using a 1000Ω tolerance for the throttle, the minimum resistance when fully forward will be 1000–1000Ω giving a wiper voltage of:

$$Vf_{MIN} = Va \times \frac{1000 - 1000}{R1 + R2} = 4.97\text{ V} \times \frac{0}{10000 + 100} = 0\text{ V}$$

The maximum resistance when fully forward will be 1000+1000=20000 giving a wiper voltage of:

$$\begin{aligned} Vf_{MAX} &= Va \times \frac{1000 + 1000}{R1 + R2} \\ &= 4.97\text{ V} \times \frac{2000}{10000 + 100} \\ &= 0.984\text{ V} \\ &\approx 1.0\text{ V} \end{aligned}$$

The minimum resistance when fully reverse will be (1000–1000)+4250=4250Ω giving a wiper voltage of:

$$\begin{aligned} Vr_{MIN} &= Va \times \frac{4250}{R1 + R2} \\ &= 4.97\text{ V} \times \frac{4250}{10000 + 100} \\ &= 2.09\text{ V} \\ &\approx 2.0\text{ V} \end{aligned}$$

The maximum resistance when fully reverse will be (1000+1000)+4250=6250Ω giving a wiper voltage of $$\begin{aligned} Vr_{MAX} &= Va \times \frac{6250}{R1 + R2} \\ &= 4.97\text{ V} \times \frac{6250}{10000 + 100} \\ &= 3.08\text{ V} \\ &\approx 3.0\text{ V} \end{aligned}$$

To account for the variances in these voltages, the amplifiers that interface the throttle potentiometer to the analog input of the microprocessor need to be adjustable to take out the voltage offset and set the gain so that the full analog range, Va, is used in the conversion process. The output of the amplifier U13A is:

$$\begin{aligned} V_{U13A} &= V_{R33} - V_{THRTTL} \times \frac{R36}{R34 + R35} \\ &= V_{R33} - V_{THRTTL} \times \frac{10\text{k }\Omega}{10\text{k }\Omega + 10\text{k }\Omega} \end{aligned}$$

-continued $$V_{U13A} = V_{R33} - \frac{V_{THRTTL}}{2} \text{ or } V_{R33} = V_{U13A} + \frac{V_{THRTTL}}{2}$$

where $V_{R33}$ is the voltage on the wiper of the offset adjustment potentiometer R33 and $V_{THRTL}$ is the voltage on the wiper of the throttle potentiometer. $V_{R33}$ is adjusted using the potentiometer so that $V_{U13A}$ is close to OV when the throttle is fully reversed, setting the minimum $V_{R33}$ as:

$$V_{R33MIN} = 0 + \frac{Vr_{MIN}}{2} = 1.0\text{ V}$$

and the maximum as:

$$V_{R33MAX} = 0 + \frac{Vr_{MAX}}{2} = 1.5\text{ V}$$

The voltage adjustment range of the circuit is OV to $$\frac{Va \times R32}{R32 + R33} = \frac{4.97 \times 10k}{22K + 10k} = 1.55k$$

which covers the range required.

The output of amplifier U13B is:

$$V_{U13B} = V_{U13A} \times \left[1 + \frac{R37 + R38}{R39}\right]$$

The gain adjustment, R38, is set so that when the throttle is fully forward the $V_{13B}$ will he equal to Va in order to utilize the full range of the ADC. When the throttle is at $Vf_{MIN}$, $V_{U13A}$ will be at $VR_{33MIN}$ as a result of the R33 setting. The gain of V13B needs to be:

$$A_{U13BMAX} = 1 + \frac{R37 + R38}{R39} = \frac{Va}{V_{R33MIN}} = \frac{4.97}{1.0} = 4.97$$

When the throttle is at $V_{fMAX}$, $V_{U13A}$ will be at $V_{R33MAX}$ as a result of the R33 setting. The gain of U13B needs to be:

$$A_{U13BMIN} = \frac{Va}{V_{R33MAX}} = \frac{4.97}{1.5} = 3.31$$

The gain adjustment range of the circuit is:

$$A_{U13BMIN} = 1 + \frac{100k + 0k}{47k} = 3.13 \text{ through}$$

$$A_{U13BMAX} = 1 + \frac{100k + 100k}{47k} = 5.26$$

which covers the range required.

Figure 26:
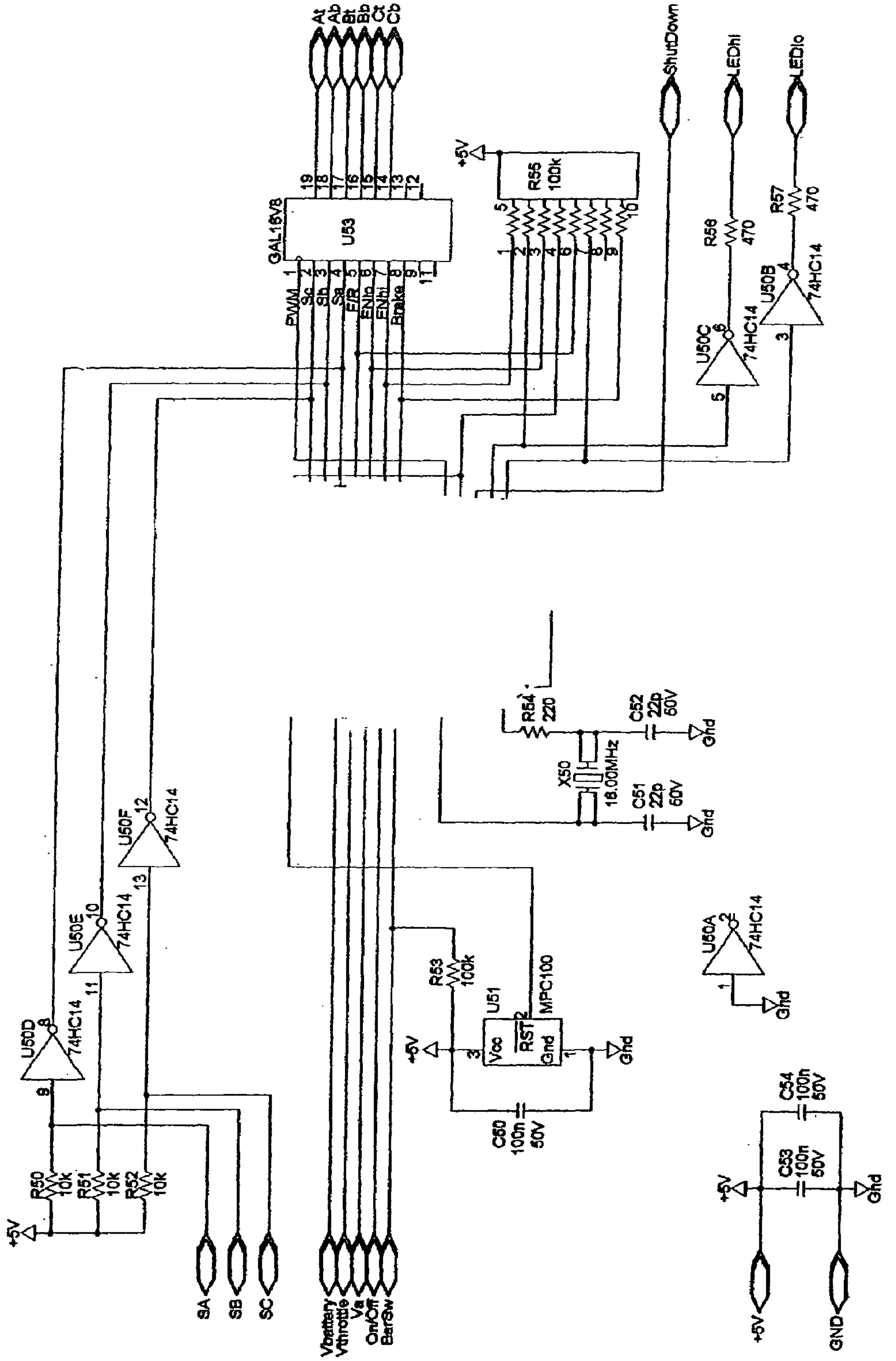
FIG. 26 is the logic schematic.

FIG. 26 is the schematic for the logic circuits. The hall element position sensors have "open-drain" outputs so pull up resistor R50, R51 and R52 are required in order to generate the logic high level. Inverters U50D, U50E, and U50F provide a buffer for signals to microprocessor, (μP) U52, and the programmable logic device, (PLD) U53. Inverters U50B and U50C provide a buffer to the LEDs on the control box from the μP. Resistors R47 and R48 limit the LED current to approximately:

$$I_{LED} \approx \frac{5.0 - 1.4}{470} = 7.7 \text{ mA}$$

assuming a 1.4 V drop across the LED.

U51 is a voltage detection device which keeps the output pin RST at a low level until the supply pin Vcc is above 4.7 volts. The pin will stay low for at least 350 mSec if the Vcc pin is ever below this voltage. This provides the power up reset signal for the μP.

The crystal X50 and components C51, C52, and R54 form the 16.000 MHz oscillator for the μP.

The resistor array, R55, forces output signals from the μP to be at logic high while the processor is held in reset and is initializing. During these times these pins are configured as high impedance inputs and their logic levels would be undefined without these resistors. The signals utilize active low logic, except Brake, in the design so the pull up action of the resistor keeps these signals inactive. The Brake signal is active high because the braking action is desired during this period of time.

U52 is a PIC16C73 type microprocessor from Microchip Technology Inc. The Vbattery signal from the Interface Circuits is connected to channel 1 of the internal analog to digital converter. The Vthrottle signal is connected to channel 2 of the internal analog to digital converter. The reference voltage, Va provides the voltage reference for analog to digital converter. The handle bar detection switch, BarSw, is connected to channel 4 of the internal analog to digital converter. This is a digital signal, either a logic 0 or 1, but it is converted through the ADC in the depicted embodiment. The control box power switch signal On/Off is connected as a logic input.

The μP is configured to create a tach signal following a change of a hall sensor signal. The pulses occur 96 times per revolution of the motor. Three pins are used to input the motor hall sensors. These pins are configured to generate a program interrupt if any of their logic states change. Another pin is configured to output the commutation direction control signal of the μP, F/R. Two other pins are output signals that enable the low and high side MOSFET drives, ENlo and ENhi. Another pin is the motor Brake output from the processor. Another pin is configured as the pulse width modulated output from the Timer 2 module. This signal controls the duty cycle of the motor low side MOSFET drive. Another pin is configured as an input that causes the value of the Timer 1 module to be latched as the timer's associated capture registers. It is driven by the tach signal. Another pin is the ShutDown signal from the processor. It is left in the high impedance input configuration until it is time to turn the power off when it becomes an active high output. RC4 and RC5 are the LED control signals from the μP.

U53 is a programmable logic device (PLD) that contains the circuitry for the motor six step commutation sequence. The outputs control the high and low side MOSFET drives, At, Bt and Ct for the high side and Ab Bb and Cb for the low side.

Figure 27:
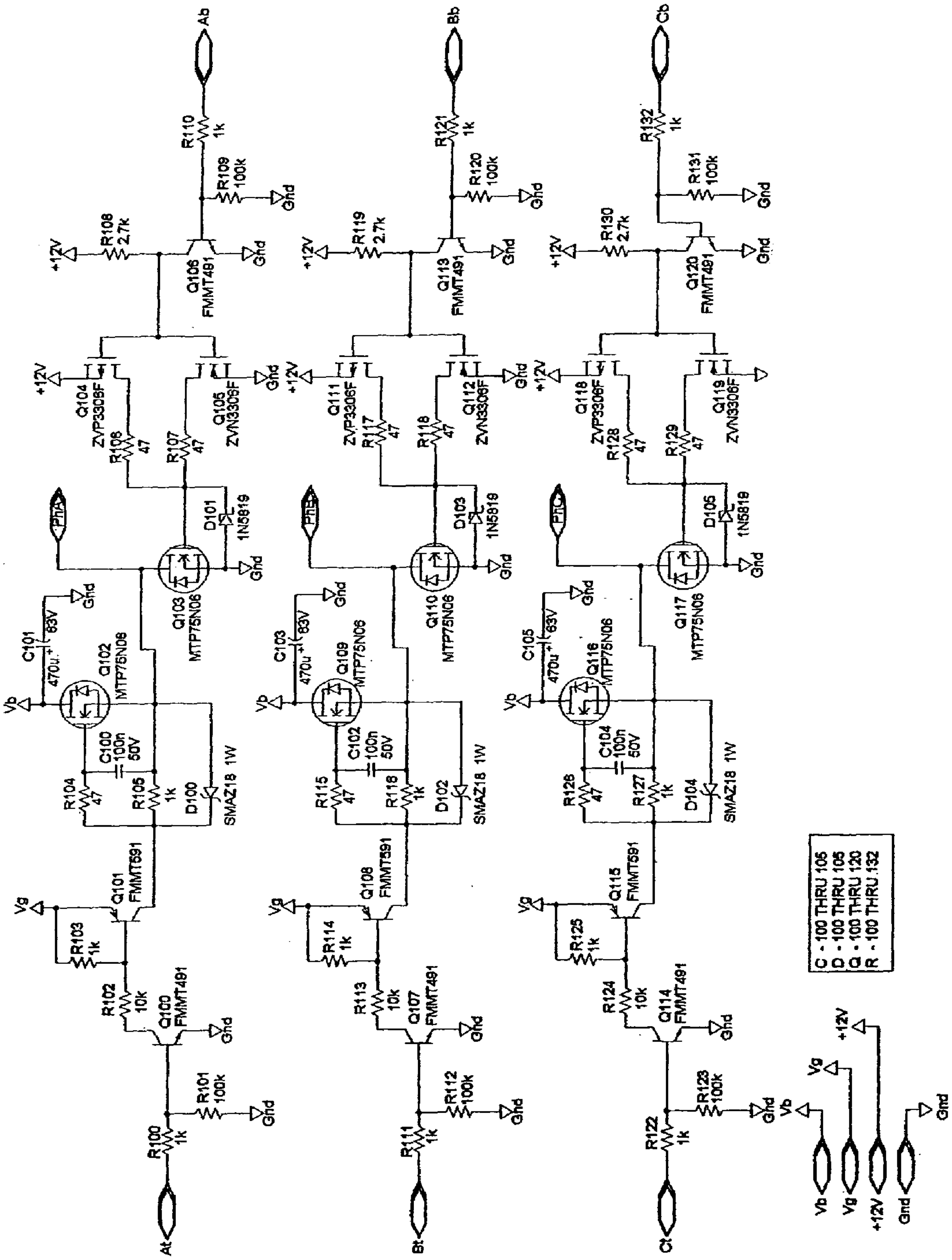
FIG. 27 is the phase driver schematic.

FIG. 27 is the schematic for the Phase Drivers. On the high side, A phase signal At, from the PLD turns the power MOSFET Q102 on when it is high and turns it off when it is low. When At is high, Q100 is on which keeps Q101 on. This pulls the gate of 102 to the Vg voltage (≈10 volts high than Q102's drain) through resistor R104, keeping Q102 on. When At is low, Q100 and Q102 are off causing the gate of Q102 to be pulled to is source through R105, holding Q102 off. The R104, C100, and gate capacitance of Q102 control the turn on time of the MOSFET while R104, R105, C100, and the gate capacitance control the turn off time. C100 also protects the MOSFET from rapid gate-source voltage changes that can destroy it. D100 is an 18 Volt zener diode that keeps the gate-source within a safe operating range and protects it from excessive negative gate-source voltage transients. The Bt and Ct signals control Q109 and Q116 respectively in the same fashion.

On the low side, A phase signal, Ab, from the PLD turns the power MOSFET Q103 on when it is high and turns it off when it is low. When Ab is high, Q106 is on which keeps Q104 on and Q105 off. This pulls the gate of Q103 to the +12V supply through R106. When Ab is low, Q106 is off keeping Q104 off and Q105 on due to its gate being pulled to +12V through R108, This holds the gate of Q103 at OV through R107. The turn on time is controlled by R107 and the gate capacitance of Q103 while the turn off time is controlled by R108 and the gate capacitance. The schottky diode, D101, protects the MOSFET from excessive negative gate-source voltage transients. The Bb and Cb signals control Q110 and Q117 respectively in the same fashion.

The high side drives have longer switching times than the low side drives mainly due to having to charge/discharge the protection capacitors C100, C102, and C103. The switching losses encountered when switching the high side is greater than the low side due to the increased time. Since the Pulse Width Modulation frequency is much greater than the maximum commutation frequency of the motor, the low side is modulated so that the switching losses are kept to a minimum.

PMBLDC Driver Firmware

The PMBLDC driver program sets the power and direction of the drive motor wheel in response to the user control throttle lever. It provides a current limit for the motor in order to maintain safe operation. It provides an indication of the battery condition. It prevents operation if the steering handle bars are not in a locked position. It also provides a timed automatic turn off if the unit is not being used.

The motor drive implementation utilizes pulse width modulated techniques and the firmware controls the duty cycle of the modulator. The program continuously monitors the throttle position, the speed of the motor, and the actual direction of rotation of the motor to set the duty cycle of the motor. The program utilizes three values in determining the duty cycle: the current setting, the desired setting, and the maximum setting. These values are labeled pwmValue, pwmGoal, and pwmLimit respectively in the program. The program executes a subroutine to update the duty cycle on a periodic basis. This routine compares the current setting to the target setting and alters the current setting by a fixed amount to get it closer to the target, the pwmValue "chases" the pwmgoal. The updating is performed on a periodic basis and in fixed amounts to avoid abrupt changes in the duty cycle which could cause rapid accelerations of the machine.

In the depicted embodiment, the updating period is 3.072 millseconds. The update routine also looks at the maximum setting and does not allow the duty cycle to exceed it even if the target setting does.

The target setting is set by the user throttle. When the user is not pressing the throttle, the duty cycle target is zero so no power would be delivered to the motor. When the throttle is fully engaged, either forward or reverse, the target is set for full modulation. In the range between the throttle not being pressed and it being ⅔ fully engaged, the duty cycle target will be set between 0% and 50% modulated in a linear relationship. From ⅔ to fully engaged the duty cycle target will be set between 50% and 100% in a linear relationship. This makes the machine less sensitive to the throttle in the low range which provides easier control of the machine at lower speeds as is typical of its use indoors. Details of these calculations are described in the Pulse Width Modulator Setting section.

The motor current is limited by the program by calculating the maximum duty cycle that can be allowed for the current motor speed and direction of rotation. This prevents damage to the motor and allows for safe operation when the motor is reversed. Additionally, it allows the user to apply power in the opposite direction of the motor rotation which makes control possible when the unit is running on a decline. The program uses the motor voltage constant and winding resistance to make this calculation which are fixed in the program. The program measures the motor speed and battery voltage to provide the rest of the parameters required for the calculation. Details of these calculations are described in the Pulse Width Modulator Setting section.

The battery voltage is also measured so that the voltage can be displayed using the two LEDs on the control panel. The action of these LEDs is described in the updtLEDs subroutine description.

A switch is located in the locking mechanism of the handle bars. The switch is monitored by the program so that the unit will not power up if the handle bars are not locked. If they become unlocked, the unit will turn off after making sure that the motor is off.

If the unit is not used for a period of 10 minutes, the unit will turn off automatically to help conserve battery power.

The firmware is implemented on a PIC 16C73 microprocessor manufactured by Microchip Technology, Inc.

Speed Detection

The speed of the motor is determined in the program by utilizing the interrupt on PORTB change and the 16-bit capture register in the Timer 1 module. The timer is configured as a free running up counter that is clocked by the output of a pre-scaler that is fed by instruction clock, $F_{OSC/4}$. The pre-scale value is programmed to be 8:1, setting the timer frequency as:

$$F_{TI} = \frac{F_{OSC}}{4\times 8} = \frac{16\text{ MHz}}{32} = 500\text{ KHz}$$

The timer "Tick" rate is the period:

$$\text{Tick} = \frac{1}{F_{TI}} = \frac{1}{500\times 100^3} = 2\mu S$$

The interrupts generated by changes on PORTB are caused by the level changes of the hall element position sensors in the motor. These three sensors are used to properly commutate the windings. There are 32 magnets in the motor. Using all three sensors, 96 interrupts are generated per revolution of the motor. The program latches the contents of Timer I in the associated capture register on each interrupt and also sets a flag, hadAtach, that the prcssTch subroutine uses to determine the motor speed. The prcssTch subroutine is called by the main loops of the program: idle, run, and stop.

The motor speed is calculated in the prcssTch subroutine by dividing the difference between consecutive Timer 1 capture readings into a constant value, $K_C$. The resolution of the speed value used is limited to eight bits with the maximum value corresponding to 300 RPM. At this speed, the interval between interrupts is:

$$T_{MIN} = \frac{60\text{ Sec/Min}}{300\text{ Rev/Min}} \times \frac{1\text{ Rev}}{96\ Int} \times \frac{1\text{ Tick}}{2\times 10^{-6}\text{ Sec}} = 1042\text{ Ticks}/Int$$

The program constant $K_C$ is:

$$K_C = 2^8 \times T_{MIN} = \frac{2^8 \times 60}{300\times 96\times 2\times 10^{-6}} = 266667$$

The counter, Timer 1, rolls over at 16-bits. To protect against a roll over, a register, tachTimeOut, is set to a value that the high order byte of the counter will match before it rolls over. This register is set in initialization and by the prcssTch subroutine. The value of 192 (0xC0) is added to the high order timer value to set this register. If the high order timer matches this value, the motor is considered to be off and the motorIsOn flag is cleared. The lowest speed resolved by the program is:

$$S_{MIN} = \frac{1\text{ Int}}{2\times 10^{-6}\text{ Sec}\times 49152\text{ Tick}} \times \frac{1\text{ Rev}}{96\text{ Int}} \times \frac{60\text{ Sec}}{1\text{ Min}} = 6.4\text{ RPM}$$

The hall position sensors in the motor produce a logic output that is "Low" when a magnetic south pole is present and a logic "High" in the presence of a north pole. The 32 magnets on the rotor of the motor are arranged with alternating magnetic polarity, generating 16 cycles of each sensor for one revolution of the motor. The sensors are positioned so that a 60° phase relationship is generated. The electrical angular displacement of 60° corresponds to a mechanical displacement of:

$$\Theta_M = \frac{\Theta_E}{N_M/2} = \frac{60}{32/2} = 3.75^O$$

Figure 29:
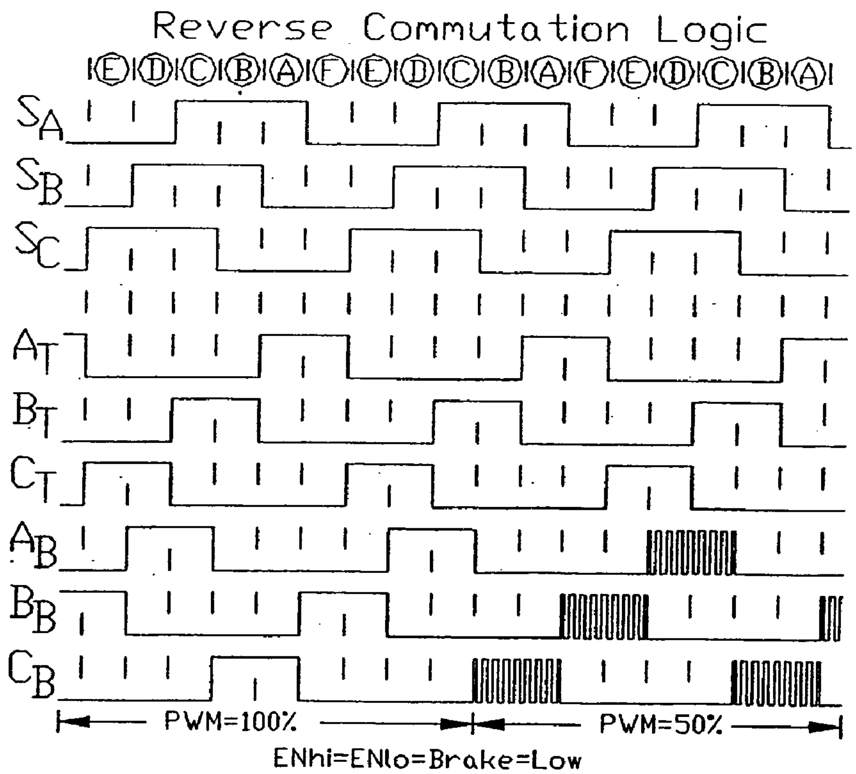
FIG. 29 is a schematic of the Reverse Commutation Logic.

The sensors detect a change in the magnetic field which occurs at a point between two magnets. The transition points nominally occurs every 360/32=11.25 degrees, However, this varies due to the individual magnet strengths and physical placement in the motor. The effect of these variances causes timing errors in the tach readings on certain tach interrupts. When the motor is rotating in the forward direction the $S_A$ sensor leads the $S_B$ and $S_C$ signals as shown in the timing diagram FIG. 28. The interrupts generated when $S_B$ goes high (A→B), $S_C$ goes high (B→C), $S_B$ goes low (D→E), and when $S_C$ goes low (E→F) are used because the sensor changes are a result of the same physical magnet pair as the interrupt previous to it. The contribution of the magnetization and placement error is the same and is removed when the time difference calculation is taken. The interrupts that occur when $S_A$ goes to (C→D) and when $S_A$ goes high (F→A) are not used for the speed calculations because they occur due to a different magnet pair than the previous interrupt. In the reverse direction shown in FIG. 29, the interrupts generated when the $S_A$ goes high (D→C), $S_B$ goes high (E→D), $S_A$ goes low (A→F), and when $S_B$ goes low (B→A) are used and those generated when $S_C$ goes high (F→E) and when $S_C$ goes low (C→B) are not.

Pulse Width Modulator Setting

The 16-bit Timer 2 module is used to generate the PWM drive signal for the motor. The timer is configured as a free running up counter that is clocked by the output of a pre-sealer that is fed by instruction clock $F_{OSC}/4$ The pre-scale value is set at 1:1, setting the timer frequency as:

$$F_{T2} = \frac{F_{OSC}}{4\times 1} = \frac{16\text{ MHz}}{4} = 4.00\text{ MHz}$$

The period of the pulse width modulator is set by the Timer 2 frequency and the setting of the processor register PR2. In the depicted embodiment, this register is set to 159 in the initialization routine. As a result the PWM period is:

$$T_{PWM} = \frac{(TR2+1)}{F_{T2}} = \frac{159+1}{4\times 10^6} = 40\ \mu\text{Sec}$$

The frequency is:

$$F_{PWM} = \frac{1}{T_{PWM}} = \frac{1}{40\times 10^{-6}} = 25\text{ KHz}$$

The frequency is above the audible range and low enough that the switching times of the drive electronics do significantly effect the PWM resolution or create significant electrical losses (heat). The duty cycle of the modulator is set with a 10-bit register. This value sets the number of processor clock cycles, Fosc at which the PWM output pin will be active high. Thus the maximum useful value that this register can be is:

$$PWM_{\text{MAX}} = \frac{F_{OSC}}{F_{PWM}} = \frac{16\times 10^6}{25\times 10^3} = 640$$

The value is less then $2^{10}-1$ so the entire period of the modulator can be used. The output of the modulator is "active high" while the PMBLDC control is "active low" so a value of 640 keeps the modulator off and a value of zero sets it for 100% modulation.

The voltage at the terminals of a motor, ignoring the motor inductance, is expressed as:

$$V_M = R\times I_M + \omega\times K_E$$

where R is the winding resistance, $I_M$ is the motor current, ω is the motor speed, and $K_E$ is the motor voltage constant. In this pulse width modulated control the voltage is set by the battery voltage, setting a peak motor current of:

$$I_{PK} = \frac{V_B - \omega\times K_E}{R}$$

This current is switched by the modulator so the effective motor current, $I_m$, is this peak current integrated over time which is:

$$I_M = \alpha\times I_{PK}$$

where α is the ratio of the modulator on time to the modulator period. Combining and solving for α gives:

$$\alpha = \frac{R\times I_M}{V_B - \varpi\times K_E}$$

The program limits the motor current using this relationship. A maximum duty cycle, $\alpha_{max}$, is computed based on a maximum effective motor current $I_{LIMIT}$.

$$\alpha_{\text{MAX}} = \frac{R\times I_{LIMIT}}{V_B - \varpi\times K_E} = \frac{\frac{R\times I_{LIMIT}}{K_E}}{\frac{V_B}{K_E} - \varpi}$$

The terms $R\times I_{LIMIT}/K_E$ and $K_E$ are program constants based on the motor characteristics and the desired current limit value. The battery voltage, $V_B$ is measured using an ADC input and the speed, w, is calculated as described in the speed Detection section.

Control Definitions

PWMrange

This value, 640, is the maximum useful value that is used in setting the pulse width modulator duty cycle. The range of values that can be used is 0 to PWMrange.

PWMknee

This 16-hit value determines the breakpoint in the throttle pot voltage to PWM value relationship described above.

PWMknee2

This 16-bit value is ½ of the PWMknee value.

KSO, KSI and KS2

These define a 24-bit value (KSO is the MSB) that when divided by the tach intenal (lastTachTime) results in an 8-bit value representing the motor speed.

KDN and KNM

These values are not used in the program but are included because they are used to calculate the PWMstall definition.

PWMstall

This value corresponds to the maximum value that the PWM duty cycle can be when the motor is stalled to keep the current within the safe range. It is calculated as:

$$PWMstall = PWMrange - PWMrange \times \frac{KNM}{KDN}$$

CNMO, CNMI, and CNM2

These define a 24-bit value (CNMO is the MSB) that is the numerator in the current limit calculations. The constant defines the parameter $R \times I_L / K_E$.

KVI

This is the constant that the battery voltage reading is multiplied by to convert it to a form usable is the current limit calculations,

KVO

This is the constant that is added to the battery voltage reading after it is multiplied by KVI to convert it to a form usable is the current limit calculations. The result is the term $V_B/K_E$.

Volt255

The battery voltage, Battery, is conditioned by the electronics to generate the ADC input signal, Vbattery, according to relationship:

$$Vbattery = 0.353 \times Battery - 4.97$$

The 8-bit sampled value is:

$$N_{BAT} = int\left[\frac{Vbattery}{Va}\right] = int\left[\frac{0.353 \times \text{Battery} - 4.97}{4.97}\right]$$

Volt255 value is defined as 207 in the depicted embodiment and is the sampled value of the battery voltage ADC input that corresponds to an actual battery voltage of 25.5 volts.

Another value is defined as 189 and is the sampled value which corresponds to an actual battery voltage of 24.5 volts. A third value is defined as 171 and is the sampled value of that corresponds to an actual battery voltage of 23.5 volts. Another value is defined as 153 and is the sampled value of that corresponds to an actual battery voltage of 22.5 volts. Another value is defined as 135 and is the sampled value of the battery voltage ADC input that corresponds to an actual battery voltage of 21.5 volts. A final value is defined as 117 and is the sampled value of the battery voltage ADC input that corresponds to an actual battery voltage of 20.5 volts.

Time Base Control Definitions

The following definitions are based upon a 1.02400 mS overflow rate of the Timer 0, the timer that is used to control the program flow. An ADC interval value is set to −10. It is used as the seed for the 8-bit adcTimer register. This sets an ADC sample period.

A second interval value is set to −977 and is used to seed the 16-bit secondTimer register. This sets the actual 1 second interval.

A third value is set to −60 and is used to seed the 8-bit minuteTimer register. This sets the actual 1 minute. A shut down time out interval is set to −10 and is used to seed the 8-bit shutOfftimer register.

The interval that the program uses to update the pulse width modulator is set to −3 and is used to seed the pwmTimer register.

A LED flashing toggle interval is set to −250 and is used to seed the flashTimer register.

A Dead Band Range value, 21, sets the values of the throttle voltage that the program uses to determine which way the user is pressing the throttle. The throttle voltage is sampled using an 8-bit conversion setting a middle value of 128. The purpose of this range is to compensate for mechanical and electronic inaccuracies in the throttle assembly. The throttle is considered off when the value is in the "deadband" range:

$$(128 - DBrange) < deadband < (128 + DBrange)$$

A reverse multiplier value is set to 6 and is used in the calculations that determine the pwmGoal value from the throttle signal.

A forward multiplier value is set to 6 and is used in the calculations that determine the pwmGoal value from the throttle signal.

Program Description

Figure 30:
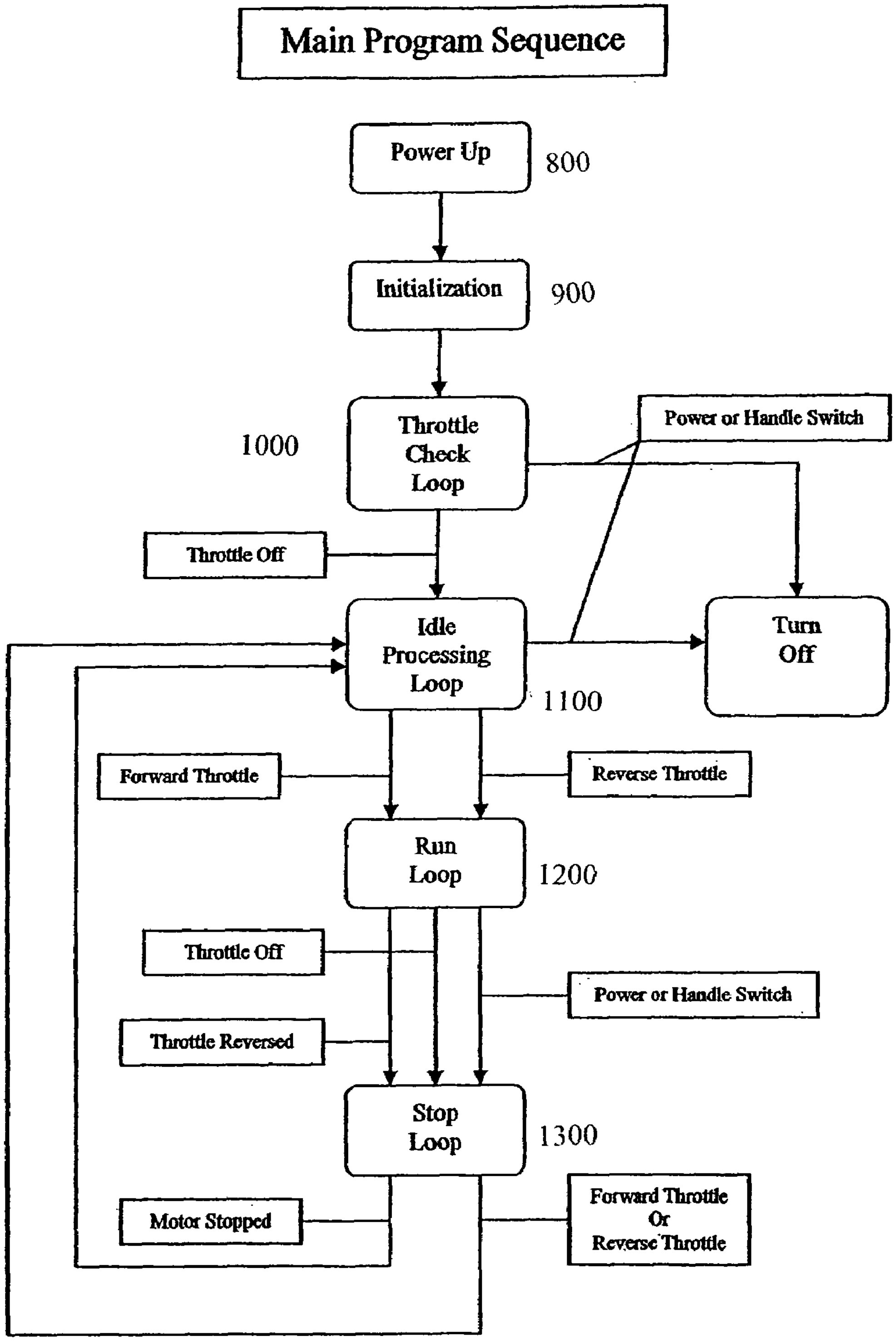
FIG. 30 is a flow chart of the main program sequence.

FIG. 30 depicts a program overview. All interrupts cause the program execution to execute at a preconfigured program address. This unit only uses one interrupt type available, in response to a change of the hall element position sensors of the motor. This interrupt synthesizes the motor tachometer. The routine saves the processor working and status registers (W and STATUS), then resets the TachOut pin "low". This action causes the value of the 16-bit Timer 1 to be captured in the CCPR1 registers internal to the processor. The flag hadAtach is set to notify the main program loops that a "tach" event has occurred and the TachOut signal is returned "high". The "new" value of the position sensors are read and stored in currentHall and the internal flag, RBIF, that caused the interrupt is cleared. Finally the status and working registers are restored to the saved values and the interrupt routine is ended with the RETI instruction. Program execution then continues at the point where the interrupt occurred.

Program Initialization

In operation, as depicted in FIG. 30, the main program sequence includes power up 800, initialization 900, a throttle loop 1000, and idle loop 1100, a run loop 1200, and a stop loop 1300. The sequence of the start up routine 900 is:

Set the input/output directions of PORTA, PORTB, and PORTC by initializing processor registers TRISA, TRISB, and TRISC respectively.

Configure the ADC module so that four inputs are analog inputs and one is the ADC reference voltage.

The 8-bit Timer 0 module is set with a pre-scaler of 16. The overflow of Timer 0 is used to control the program flow (loop timer). The overflow interval of this timer is:

$$T0OF = \frac{4}{Fosc} \times Pscl \times 2^8 = \frac{4}{16 \times 10^6} \times 16 \times 256 = 1.024 \times 10^{-3}$$

Two 8-bit registers are located in register bank 0 and in bank 1. These registers are used to save the W register at the start of the interrupt service routine and restore the W register prior to exiting the interrupt service routine. wSaveReg and wSaveRegl must be at the same offset address in the respective banks since it is not known which register bank is active when the interrupt service routine is executed.

Two other 8-bit registers are located in register bank 0 and in bank 1. These registers are used to save the STATUS register at the start of the interrupt service routine and restore the STATUS register prior to exiting the interrupt service routine. sSaveReg and sSaveRegl must be at the same offset address in the respective banks since it is not known which register hank is active when the interrupt service routine is executed.

All circuits connected to the I/O pins are designed so that a device reset (which causes all the I/O pins to be place in a high impedance input state) keeps the output pins in a valid, inactive state (i.e.: LEDs are off, the motor is off, and the shut down pin is inactive). The setting of the output pin levels in the start up routine are the same as the levels set by the processor reset action.

All interrupts are disabled. The usable registers in Bank0 are initialized to 0x00. The 16-bit registers pwmValue and pwrnGoal are initialized to the PWMOff value which corresponds to 100% modulation (motor drive off). The processor register is initialized to set the pulse width modulation frequency associated with the Timer 2 module. The processor register that holds the PWM value are set and the modulator is turned on.

With the timer prescaler set to I and a 16 MHz main oscillator, the resulting PWM frequency is:

$$Fpwm = \frac{Fosc}{4} \times \frac{1}{(PR2+1)} = \frac{16\text{ MHz}}{4} \times \frac{1}{160} = 25\text{ KHz}$$

The tach routines are initialized by: setting the is FirstTach flag so the first tach interrupt is not used to determine speed, and setting the Timer 1 module to run at 500 kHz.

The capture registers for Timer 1 are configured to latch on the falling edge of the CCPI pin. The routine setTchTo is called to seed the tachOverflow register from the Timer 1 value. TachOverflow is a flag that is set when a position interrupt has not occurred for a specified length of time (see prcssTch description).

The interrupt on PORTB bit changes is enabled. The hall position sensors are read and the register lastHall is seeded with this value. This 8-bit register is used to save the previous reading of the motor position (hall) sensors so that the actual direction of the motor can be determined. The previous tach time register, lastTachTime, is seeded with a large number so that the tach time calculations do not fail on the first pass. This 16-bit register contains the difference between the Timer 1 capture registers on sequential PORTB bit changes interrupts resulting in the time period between the changes. This value is used in the calculation of the motor speed.

The analog o digital conversion routines and results are initialized by executing one full cycle through the readADC subroutine. This process waits for the loop timer (Timer 0) then sets the ADC to convert the signal for the throttle. The register ADCvector is set so that the throttle value is saved on the next execution of the readADC subroutine. The procedure then waits for the loop timer before executing the readADC subroutine which saves the throttle value, sets the ADC to convert the signal from the batter, and set the ADCvector so that the battery signal is saved on the next execution of the readADC subroutine. The procedure then waits for the loop timer before executing the readADC subroutine which saves the battery value, sets the ADC to convert the signal form the handle bar switch, and set the ADCvector so that the handle bar switch signal is saved on the next execution of the readADC subroutine. The procedure waits for the loop timer and executes the readADC subroutine. This last call saves the handle bar switch value, sets the ADC to convert the signal from the throttle, and set the ADCvector so that the throttle signal is saved on the next execution of the readADC subroutine.

The switch detection routines are initialized by reading the current values of the power switch and combining it with the handle bar switch state (determined by the value saved by the readADC subroutine) in the registers newSwitch, oldSwitch, and currentSwitch. The timer register, switchTimer, is preset to the seed value DebounceTime. The SwitchTimer register is an 8-bit counter that is updated when two successive switch readings, maintained in the newSwitch register, are the same (no change in the handle bar switch or the power switch). If there is a change in the successive readings, switchTimer is reset to the DebounceTime value which is set to −50 and corresponds to the number of consecutive readings of the switch values that must be the same before the program accepts that state of the switches.

$$DebounceTime = 1.02400\text{ mS} \times 50 = 51.200\text{ mS}$$

The currentSwitch, 8-bit register keeps the de-bounced value of the power and handle bar switches.

Throttle Check Loop

Figure 31:
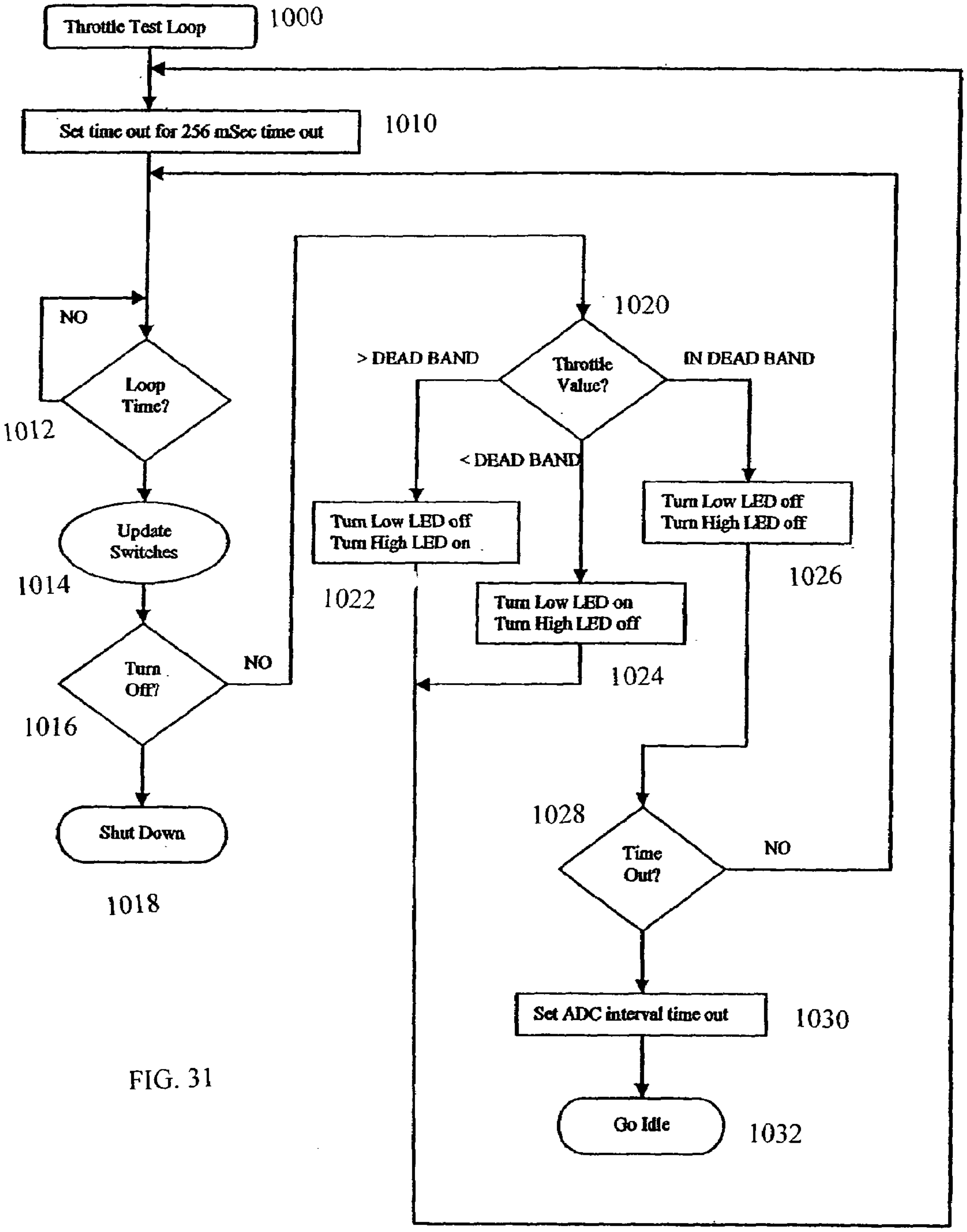
FIG. 31 is a flow chart of the throttle test loop.

As depicted in FIG. 31, immediately following the initialization sequence the program runs a loop 1000 testing the value of the throttle pot voltage. The loop "spins" until the voltage readings are within the defined dead band area for a predetermined period of time. Accordingly, a time out is set 1010. The time period is set by the program constant ThrttlTO:

This value is set to −250 and is used to determine the time that the throttle voltage must be in the "dead band" before the program will allow moving the motor. The time out is:

$$TimeOut = ThrrtlTO \times T0OF = 250 \times 1.024 \times 10^{-3} = 0.256\text{ sec}$$

The dead band is determined by the program constants DeadBandHigh and DeadBandLow.

DeadBandLow value is set to 128−DBrange (128−21=107) and is the value in which the sampled throttle signal must be less then in order for the program to attempt to set motor in the reverse direction.

DeadBandHigh value is set to 128+DBrange (128+21=149) and is the value in which the sampled throttle signal must he greater then or equal to in order for the program to attempt to set motor in the forward direction.

This loop prevents the unit from running away if the user is holding the throttle while turning the unit on or if the wiring between the controls and the PMBLDC Motor Drive is defective. During this loop, the High LED 1022 will be on if the throttle is pressed forward and the Low LED 1024 will be on if it is pressed reverse. Also, the loop monitors the power switch state and handle bar switch states by calling an updtSwtch routine and jumping to the shutDown routine in the idle processing loop 1124 if it is to turn off. The loop "spins" 1012 waiting for the loop timer overflow, Timer 0, to control the timing.

If the throttle loop timer expires, the ADC timer interval is reset, the notReady flag is cleared, and the program jumps to the label Go Idle 1032 to begin operation.

Idle Processing Loop

Figure 32:
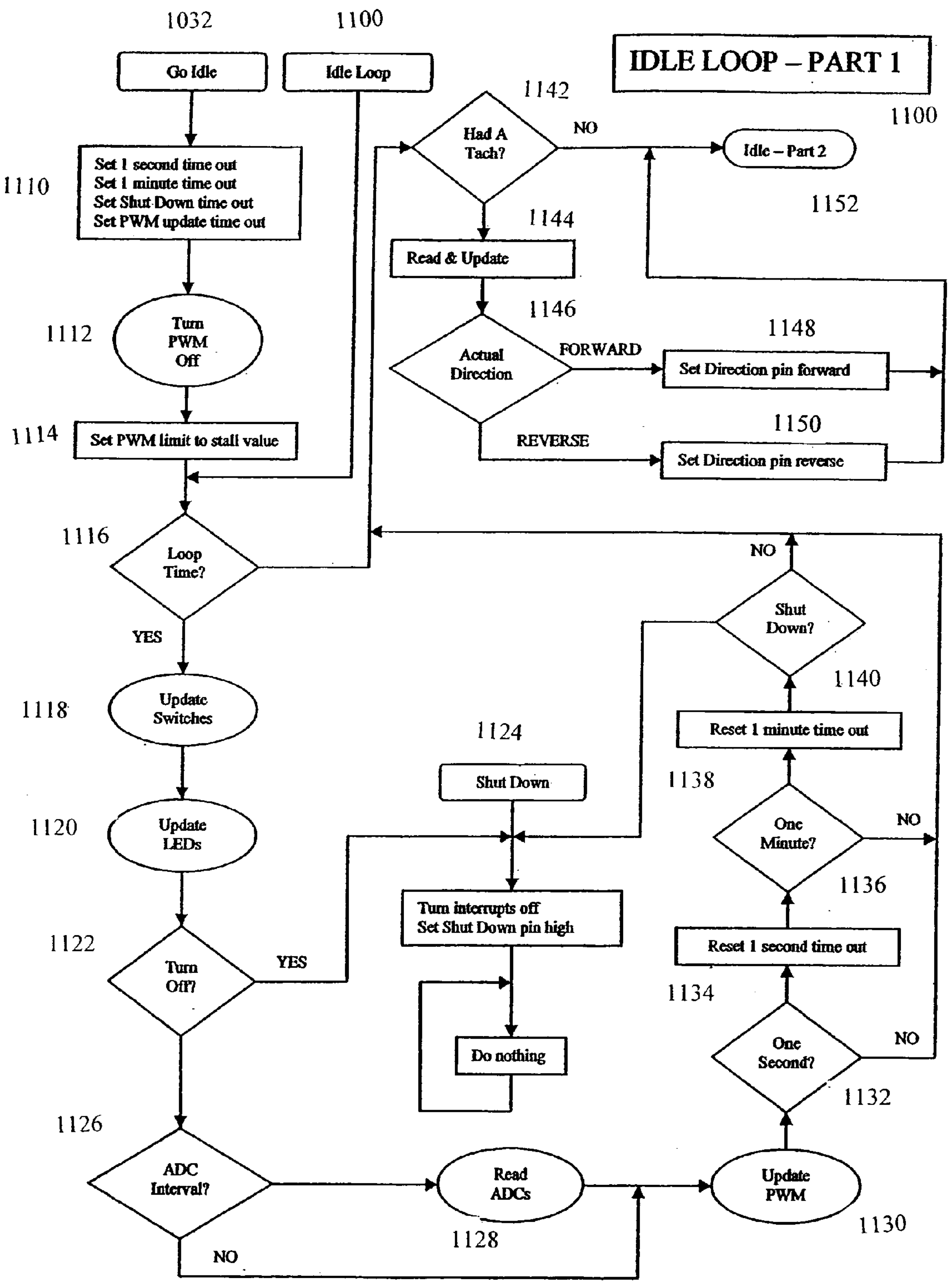
FIG. 32 is a flow chart of the Idle Loop, part 1.
Figure 33:
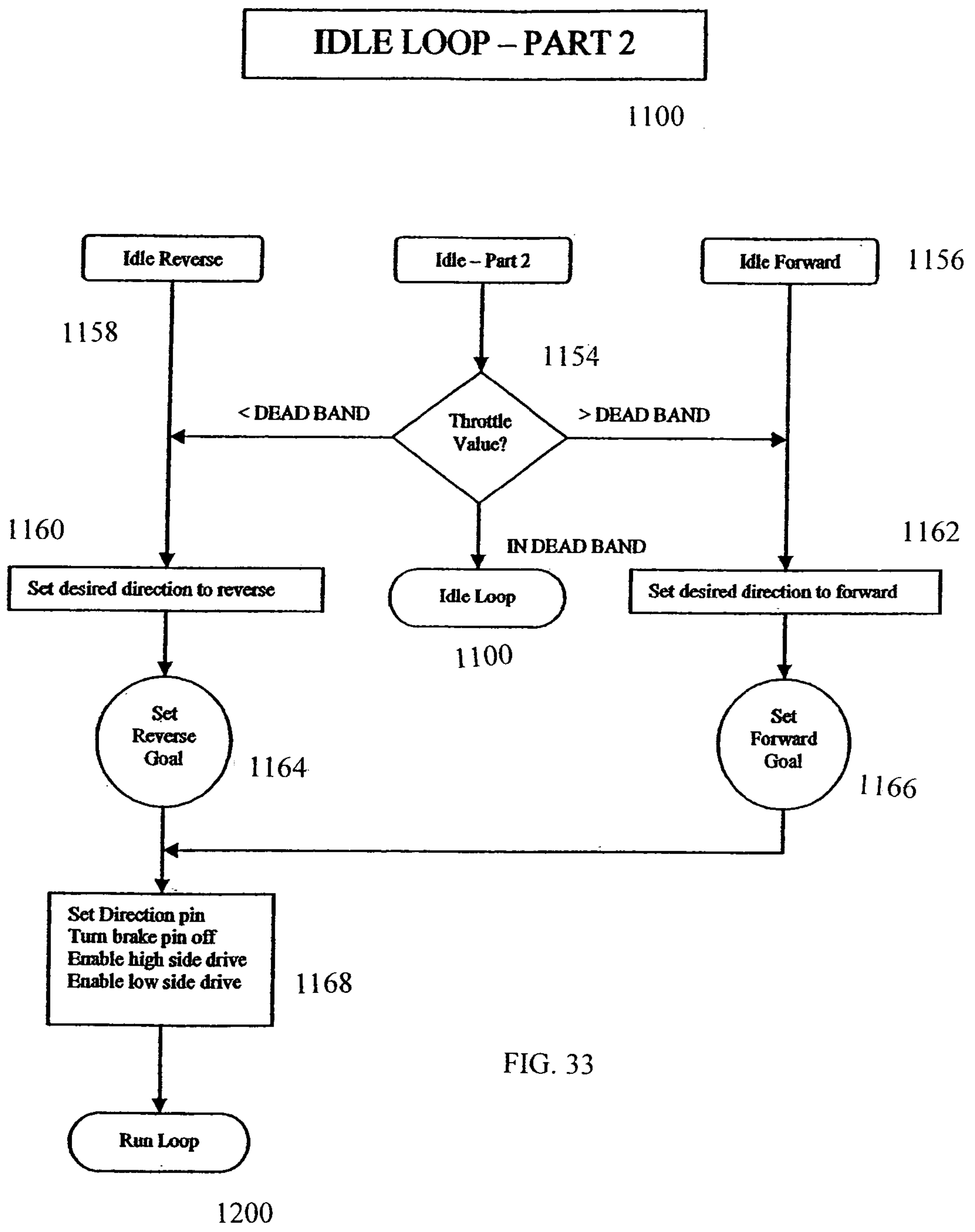
FIG. 33 is a flow chart of the Idle Loop, part 2.

As depicted in FIGS. 32 and 33, the entry point to the idle processing loop is at the label Go Idle 1032. The second, minute, and shutdown time out counters are initialized 1110 and the pulse width modulator is "turned off" 1112 using the turnPWMoff subroutine. The PWMoff value is defined as PWMrange and corresponds to a 100% modulated output. Setting the processor modulator to this value causes the output pin to always be at a "high" level, keeping the motor drive off.

The duty cycle limit is set to the maximum allowed at stall and then the idle loop begins at the label idleLoop 1100.

The loop timer (overflow of the Timer 0) is tested and if the timer has not overflowed execution jumps to idleLoop1. If the overflow has occurred, the switch 1118 and LED update 1120 routines are run and the program jumps to the label shutDown 1124 if it should turn off 1122. Next the ADC update routine, readADC 1128, is executed if the adcTimer expires and the pulse width modulator update routine, updtPWM 1130, is run. Following these, the seconds interval timer is updated 1134. If it does not overflow execution jumps to idle Loop1 1142. If it does overflow the minutes timer is updated 1138 and if it does not overflow execution jumps to idleLoop1 1142. If the minutes timer overflows then the shut down time out is updated. If the shut down does not overflow execution jumps to idleLoop1 1142. If it does overflow execution continues at the label shutdown 1124.

The shut down sequence of instructions turns power off to the board. Interrupts are disabled followed by setting the ShutDown pin high (see ShutDown above). The program then spins on a jump instruction to itself. Since interrupts are disabled and the processor watch dog module has never been enabled, no other instructions execute until the next power on reset occurs.

shutItDown is a flag set by the switch de-bounce routines. It is used by the main program loops to turn the unit's power off. This flag is never reset.

idleLoop1

The hadAtach flag is tested 1142 and if it is not set the program moves to idleLoop2 1152. If it has been set, an indication that the motor has turned enough to cause a position sensor change, the new sensor value is read 1144, the tach time out detection is reset using the setTchTO subroutine 1580 and the direction of rotation is determined 1146. If the motion is detected in the forward direction 1148, the commutation direction is set to the forward direction by clearing the FIR pin. If the rotation is in the reverse direction the commutation is set to the reverse direction 1150 by setting the FIR pin. This action provides a greater resistance to the motor's motion than if the FIR pin was set in the opposite state.

idleLoop2

The last throttle voltage value is tested 1154 and if it is greater than or equal to the DeadBandHigh constant, as a result of the user pressing the throttle lever forward, execution jumps to idleF 1156. If the value is greater than or equal to the DeadBandLow constant the user is not pressing the throttle and the program jumps back to the beginning of the idle process, idleLoop 1100. The program will continue at the label idleR 1158 as a result of the user pressing the throttle lever reverse causing the throttle voltage to be less than DeadBandLow.

idleR

The desired direction is set to reverse by clearing the desiredDrctn flag 1160. The pwmGoal register is set with the setRvrsGoal 1164 subroutine and execution jumps to the common motor startup routine at the label idleGo.

desiredDrctn is a flag that is set 1168 when the throttle pot value is greater than the dead band range in response to the user depressing the forward arm of the control paddle. The flag is reset when the throttle pot valve is less than the dead band range in response to the user depressing the reverse arm of the control paddle. The value is the compliment of the FIR pin setting.

The desired direction is set to forward 1162 by setting the desiredDrctn flag. The pwmGoal register is set with the setFrwdGoal 1166 subroutine and the execution continues at the label idleGo.

The motor FIR pin is set to the complement of the desireDrctn flag previously set. Next the Brake control is turned off 1168 and the high and low side MOSFET drives are enabled 1168. The program then jumps intothe run processing loop at the label runLp4 (which simply jumps to the start of the run loop at 1200).

Run Processing Loop

Figure 34:
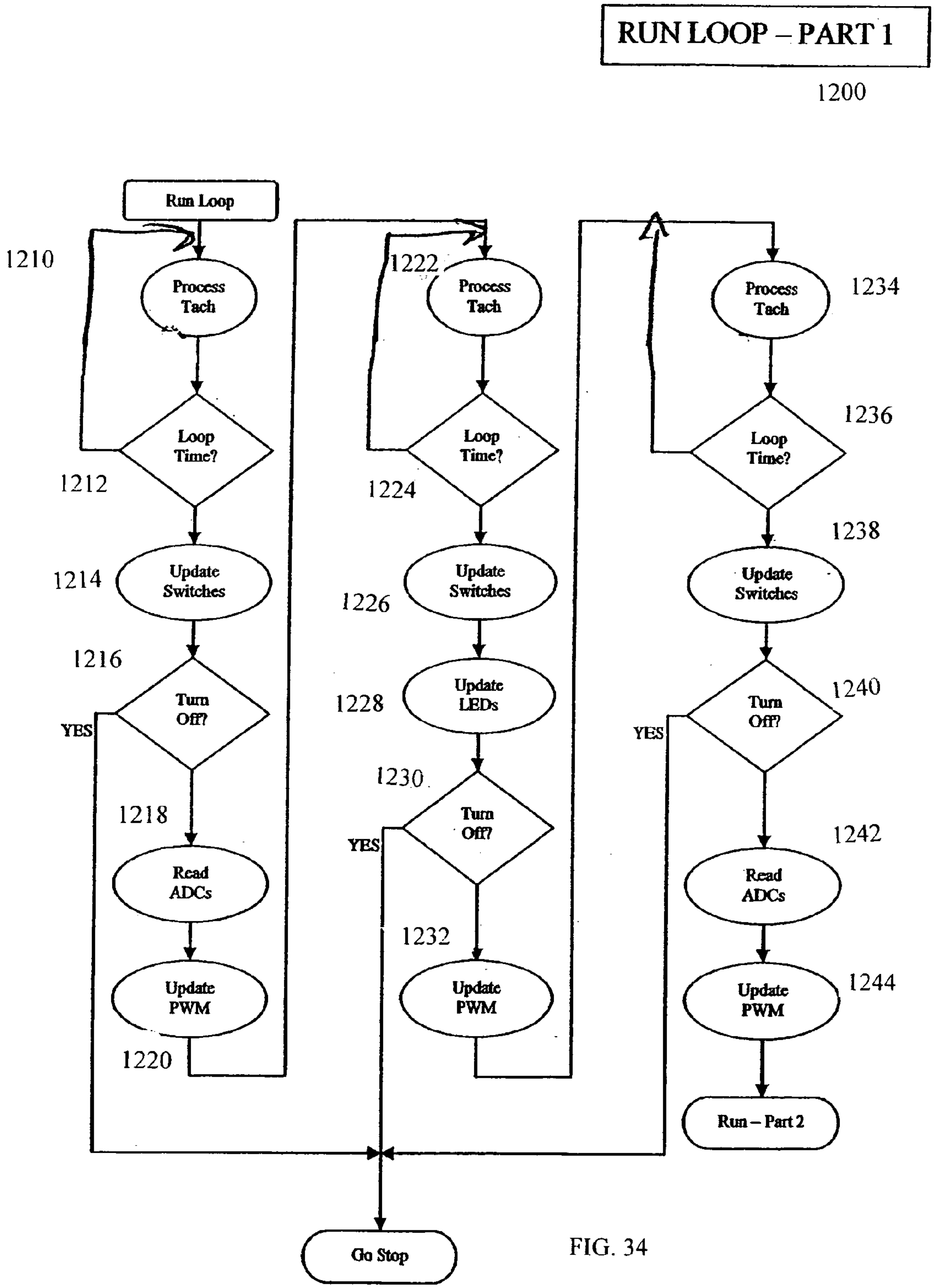
FIG. 34 is a flow chart of the Run Loop, part 1.
Figure 35:
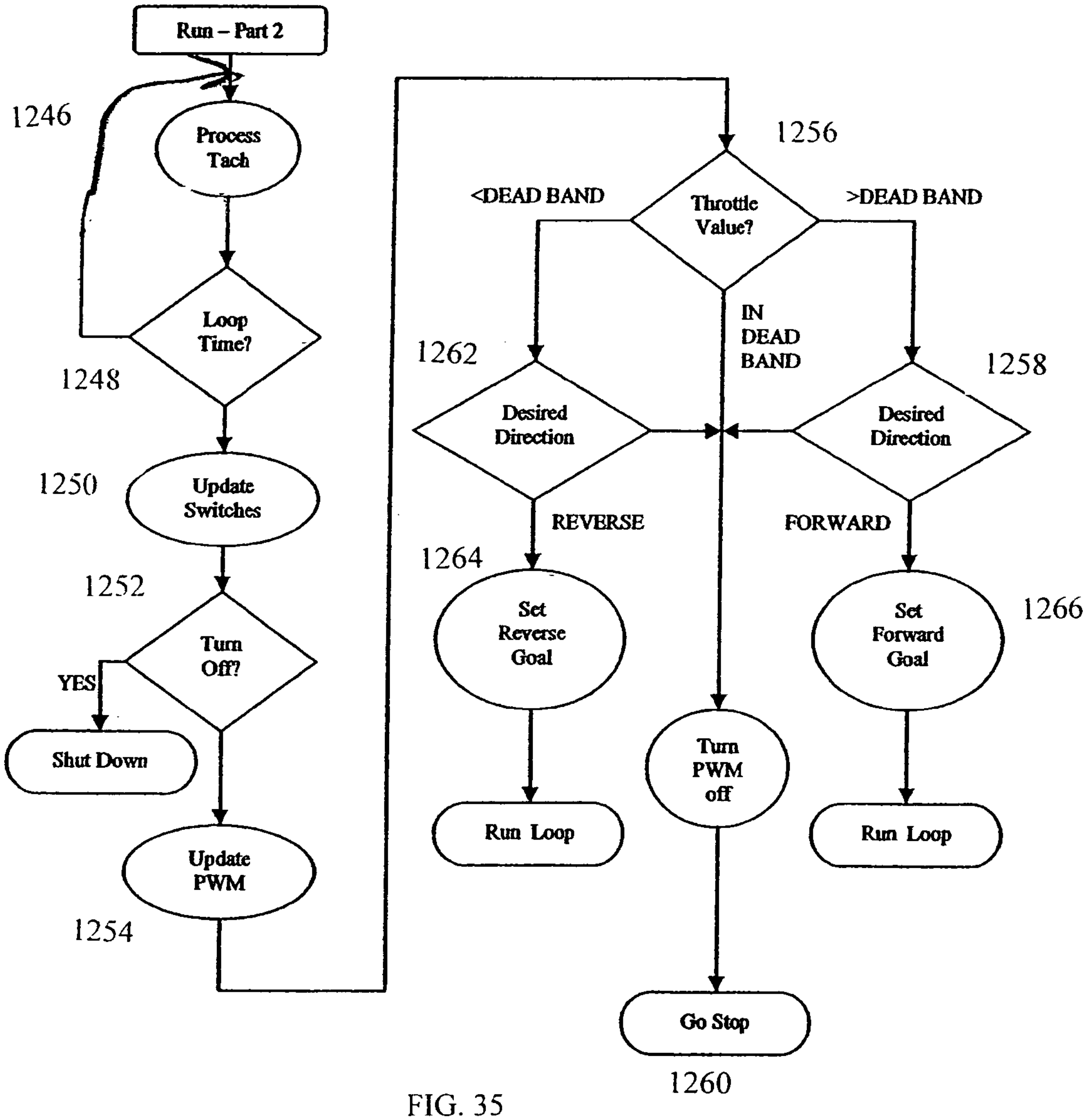
FIG. 35 is the flow chart of the Run Loop, part 2.

As depicted in FIG. 34, this loop is divided into four sequences which are controlled by the loop timer (overflow of Timer 0).

Sequence I

This sequence "spins" at the runLoop label calling the prcssTch subroutine 1210 waiting for the loop timer to overflow 1212. The prcssTch subroutine monitors the motor speed and sets several parameters if necessary. This routine is described in detail later. When the loop timer has overflowed, the switches are updated 1214 and the programs jumps to the stop routine 1216 if the unit is to turn off. The value for the throttle, battery, and handle bar switch are updated using the readADC subroutine 1218. Next the pulse width modulator setting is updated 1220 using the updtPWM subroutine before a second sequence is executed.

Sequence II

This sequence "spins" at the runLpl label calling the prcssTch subroutine 1222 waiting for the loop timer to overflow 1224. When the loop timer has overflowed, the switches are updated 1226, the LEDs are updated 1228, and the programs jump to the stop routine if the unit is to turn off 1230. The pulse width modulator setting is updated 1232 using the updtPWM subroutine before third sequence is executed.

Sequence III

This sequence is the same as the first sequence except that it spins at the label runLp3.

Sequence IV

This sequence "spins" at the runLp3 label calling the prcssTch subroutine 1246 waiting for the loop timer to overflow. When the loop timer has overflowed 1248, the switches are updated 1250 and the program jumps to the stop routine 1252 if the unit is to turn off. Next the pulse width modulator setting is updated 1254 using the updtPWM subroutine before the value of the throttle voltage is tested 1256. If this voltage is greater than the DeadBandHigh value (control is pressed forward) the program branches to the label runF 1258. If the value is in between DeadBandLow and DeadBandHigh (control is not pressed) the program jumps to the stop routine at the label goStop 1260. Execution continues as a result of the user pressing reverse 1262. If this represents a change in direction (desired direction, flag set to forward) then the program jumps to the stop routine, otherwise the pwmGoal value is updated 1264 using the setRvrsGoal subroutine and the run loop is restarted. When execution continues from runF, and this represents a change in direction and the program jumps to the stop routine. Otherwise the pwrmGoal value is updated 1266 using the setFrwdOoal subroutine and the run loop is restarted.

The run loop only terminates by jumping to the stop routine when the throttle is released, when it is reversed or when power is to turn off due to the handle bar switch or the switch on the control box. A reversal is handled by one pass through the stop loop and then reversing the motor in the idle loop entry points into the run loop, idleF and idleR. Four loops are used to slow the rates at which the various subroutines are executed.

Stop Processing Loop

Figure 36:
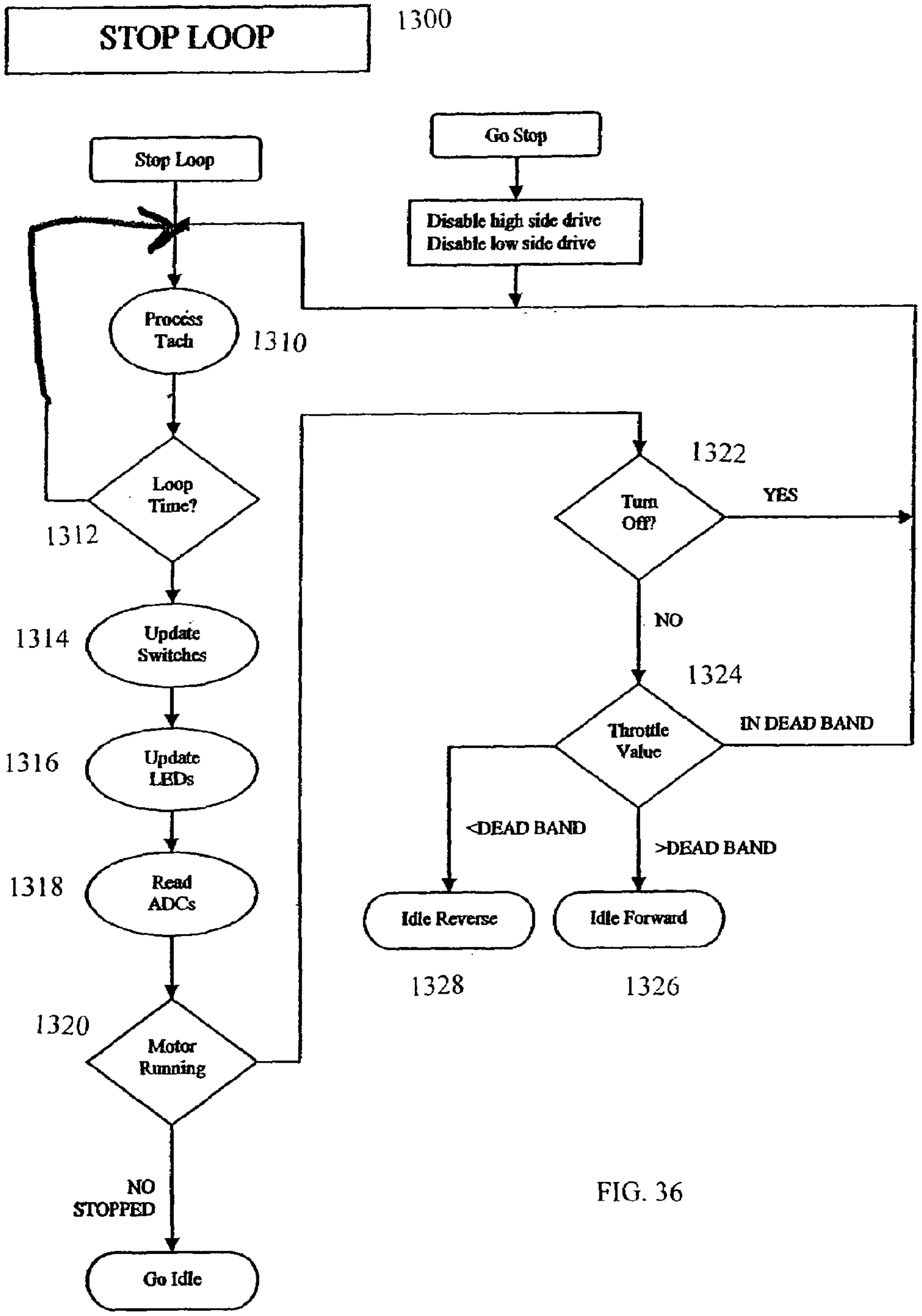
FIG. 36 is a flow chart of the Stop Loop.

As depicted in FIG. 36, the stop loop is always started at the goStop label which turns the modulator off using the turnPWMoff subroutine and then turns the low and high side MOSFET drives off, The loop is then started at the stopLp label which "spins" calling the pressTch subroutine 1310 waiting for the loop timer to overflow 1312. After spinning, the loop updates the switches 1314 and LEDs 1316. It then makes sure the Brake signal is active and updates the ADC readings 1318. The program executes from the goStop label shortly after a loop timer overflow so close to 1 m Sec. elapses before the stop loop stops spinning. This guarantees that the modulator will he off (one PWM period, 40 μSec, maximum from the turnPWMoff) and the high side drives will be off before the Brake signal is activated.

The stop loop then "spins" at stopLp2 calling the pressTch subroutine 1310 waiting for the loop timer to overflow 1312. After the overflow the program updates the switches 1314, LEDs 1316, and ADC voltage readings 1318. Next, motorIsOn flag is checked and if it is reset indicating that the motor has stopped the program jumps to the idle routine entry point at goldle. The shutltd own flag is then tested and if set indicating that the machine should turn off 1322, the program jumps back to the beginning of the stop label stopLp1 loop. This prevents the machine from turning power off until the motor has stopped. If the motor is still running and the unit is not turning off, the throttle voltage value is tested 1324. If the value is in the DeadBandLow to DeadBandHigh range the stop loop continues by jumping back to stopLp1. If the throttle value is greater then the DeadBandHigh value execution jumps to the run loop entry point at the end of the idle loop, idleF 1326. If the throttle value is less then the DeadBandLow value execution jumps to the run loop entry point at the end of the idle loop, idler 1328.

Program Subroutines

An "Is reverse?" subroutine is called with a valid position sensor value in the working register W. The subroutine returns the valid position sensor value that would have occurred previously if the motor was rotating in the reverse direction.

An "Is forward?" subroutine is called with a valid position sensor value in the working register W. The subroutine returns the valid position sensor value that would have occurred previously if the motor was rotating in the forward direction.

A "Read next analog-digital conversion channel" subroutine jumps to one of the routines to read an ADC value. These routines are readThrttl, readBttry, and readHandle described below. This routine advances adcVector register prior to executing the jump. The value of adcVector determines which routine is executed. It is the responsibility of the last sampling routine in the sequence (in this case readhandle) to reset the adcVector value prior to exiting.

A "Read throttle voltage" routine is a target of a readADC jump. It waits for the ADC module to complete the conversion process, reads the converted value, and stores it in the throttle register before returning to the caller of the readADC subroutine. Only the 8 of the available 10 bits of the conversion are used.

A "Read battery voltage" routine is a target of the readADCjump. It waits for the ADC module to complete the conversion process, reads the converted value, and stores it in the battery register before returning to the caller of the readADC subroutine. Only the upper 8 of the available 10 bits of the conversion are used.

Figure 37:
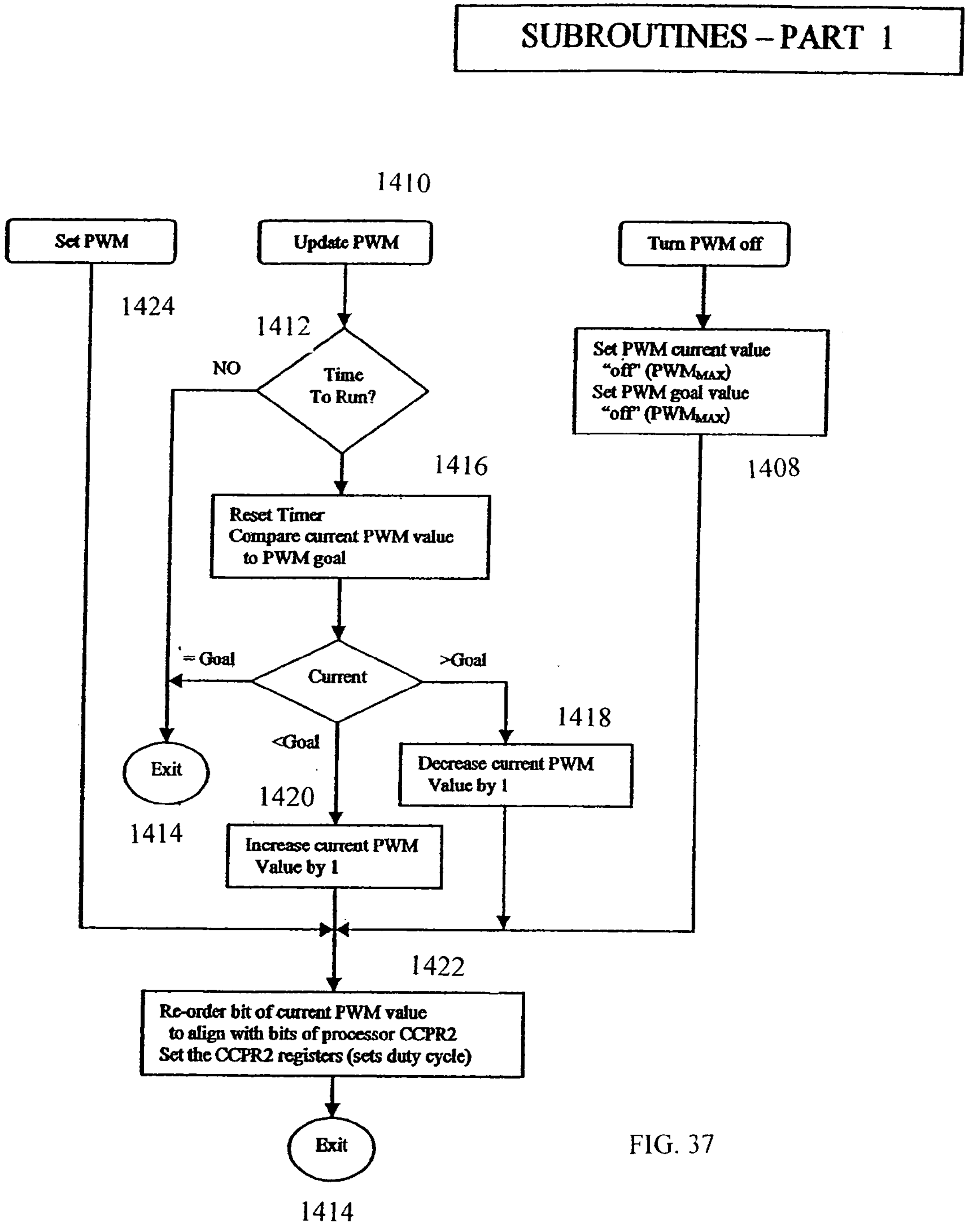
FIG. 37 is a flow chart of the Subroutines, part 1.

A Turn "PWM off" subroutine is depicted in FIG. 37. This subroutine sets both the pwm Value and the pwmGoal values to the PWMoff value 1408 in order to turn the modulator off. The routines exits through the setPWM2 routine which actually sets the processor duty cycle register.

An "Update PWM" 1410 subroutine is also depicted in FIG. 37. This subroutine updates the pwmTimer value 1412 and exits 1414 if it does not overflow. Otherwise the routine continues by resetting the timer and the comparing the pwmValue to the pwrnGoaL 1416. At step 1417, if pwmGoal>pwm Value the pwmValue is incremented 1418 and the routine jumps to the setPWM2 routine to set the modulator 1422 and exit 1414. If pwmGoal<pwmValue the pwmValue is decremented, 1420 and the routine goes to the setPWM2 routine to set the modulator 1422 and exit 1414. If the pwmGoal=pwmValue the routine exits 1414.

A "Set PWM" subroutine 1424 manipulates set processor registers to the value represented by the pwmValue register which sets the duty cycle of the modulator.

A "Read handle bar switch" routine is a target of the readADC jump. It waits for the ADC module to complete the conversion process then stores the high order bit of the result in the handleVolt flag (1-bit conversion) before returning to the caller of the readADC subroutine. The flag is set high when the handlebar switch is opened and reset low when the switch is closed. The adcVector value is reset because this routine is the last routine in the readADC jump sequence.

Figure 38:
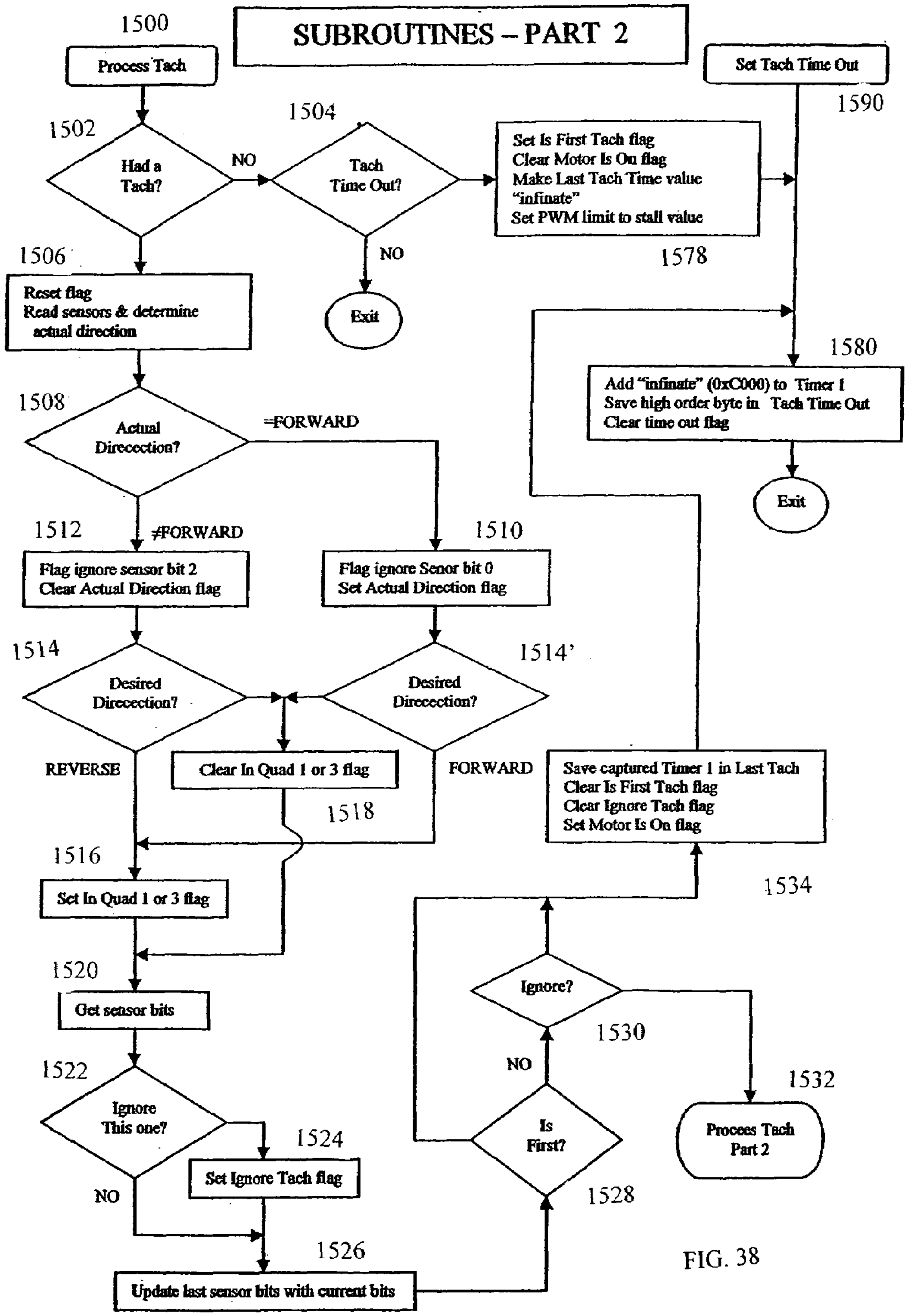
FIG. 38 is a flow chart of the Subroutines, part 2.
Figure 39:
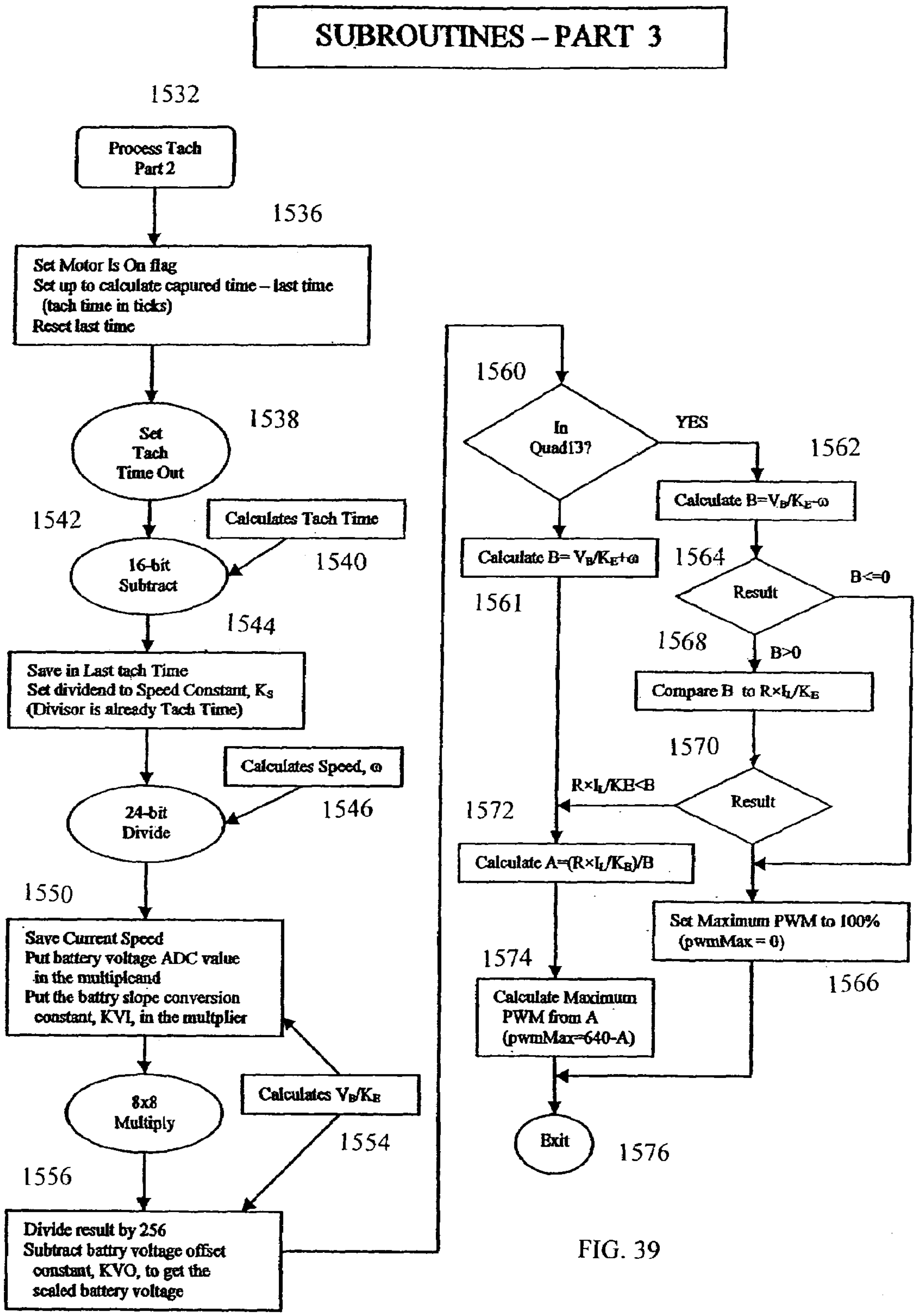
FIG. 39 is a flow chart of the Subroutines, part 3.

A "Process Tach" routine is depicted in FIG. 38. This routine is called repeatedly by the main program loops to determine whether the motor is rotating and to set the limit for the modulator, pwmLimit. On entry 1500 the hadAtach flag is tested 1502 to determine if a tach interrupt had occurred since the last time this routine was executed. If the flag is cleared, the program jumps to the label prcssT1 1504. If the flag is set, it is cleared and the actual direction of the motor rotation is determined 1506. The flag actualDrctn is set if the rotation is forward 1510 and a temporary register is set to correspond to the position sensor SA. The flag is cleared at gngRvrs 1512 if the direction is reverse and the temporary register is set to correspond to the position sensor Sc. The desiredDrctn is then tested 1514, and if it is the same as the actualDrctn the in Quad13 1516 flag is set at gngQ13 1516, and if the flags differ, the in Quad13 flag is cleared at gngQ24 1518. The program continues at the label prcssTch1 where the position sensor registers are updated 1520 and the ignoreTach flag is set 1524 if the sensor change will generate unusable time information 1522 (see Speed Detection). The sensor bits are updated 1526. The is FirstTach flag is checked 1528 and the program jumps to prcss1st if it is set. The ignoreTach flag is then checked 1530 and the program jumps to prss1st 1532 if it is set.

This jumps to prcss1st 1534 bypass the speed and current limit calculations. If the program does not jump to prcss1st, the motorisOn flag is set 1536, the time interval of the tach is calculated into lastTachTime, the tach overflow time is reset and a Tach Time register is updated 1540. The speed is then calculated 1546 by dividing Tach Time into the 24-bit constant formed by KSO:KS1:KS2. The result is saved in the register currentSpeed 1550. The value of the battery voltage, battery, is multiplied by constant KVI and then added to the constant KVO 1550 to generate the $V_B/K_E$ 1554 term for the current limit calculations.

The flag in Quad13 is then tested 1560 and the program jumps to calcQ24 if it is reset, indicating that the motor rotation is in the opposite direction of what the user desires (the speed term in the equation is negative). If the rotation is in the same direction as what is desired, the difference between $V_B/K_E$ and the currentSpeed value is calculated 1562 and if currentSpeed is greater than or equal to $V_B/K_E$ 1564 the duty cycle can be 100% and the program jumps to allwMax 1566. The test jumps as a result of the generated voltage of the motor being equal to or greater than the battery, the motor is charging the battery. The difference is then compared to the program constant KNM 1568 and if the difference 1570 is less than KNM a jump to allwMav 1566 is made because the calculation of the duty cycle will be greater then 100%. If the program does not jump, the difference is placed in the dedicated registers 1572 in preparation of calculating the maximum duty cycle and the routine jumps to calcMax 1574.

If the jump is made to calc24, the sum of $V_B/K_E$ and currentSpeed 1561 is made and placed in the registers in preparation of calculating the maximum duty cycle 1574. The program continues at the label calcMax where the calculation for the maximum duty cycle is completed by dividing the value stored in the registers into the CNMO:CNMI:CNM2 constant which corresponds to $R \times I_1/K_E$ 1572. The result is adjusted to match the PWM range values and placed in the pwmLimit register for use by the updtPWM subroutine and prcssTch exits 1576.

If the jump to allwMax is made, the pwmLimit is set to zero (100% modulation) the routine exits.

If the jump to prcss1st is made, the captured Timer 1 value is saved 1534 in the Tach Time register. The is FirstTach flag is cleared, the ignoreTach flag is cleared, the is MotorOn flag is set and the program exits.

If the jump is made to prcssT1 1504 (a tach event has not occurred) the Timer 1 value is compared to the tach timeout value. If the values differ the routine simply exits. If they match, the is FirstTach flag is set, the motorIsOn flag is cleared 1578, the tach inverval is set to a long time, the pwmLimit is set for the motor stalled value and the program exits through the setTachTO routine 1580.

A "Set Tach Time Out" subroutine (see FIG. 38, 1590) adds a "long time" value to the Timer 1 value and saves it in the tach Overflow register. The "long time" is described in the Speed Detection description.

Figure 40:
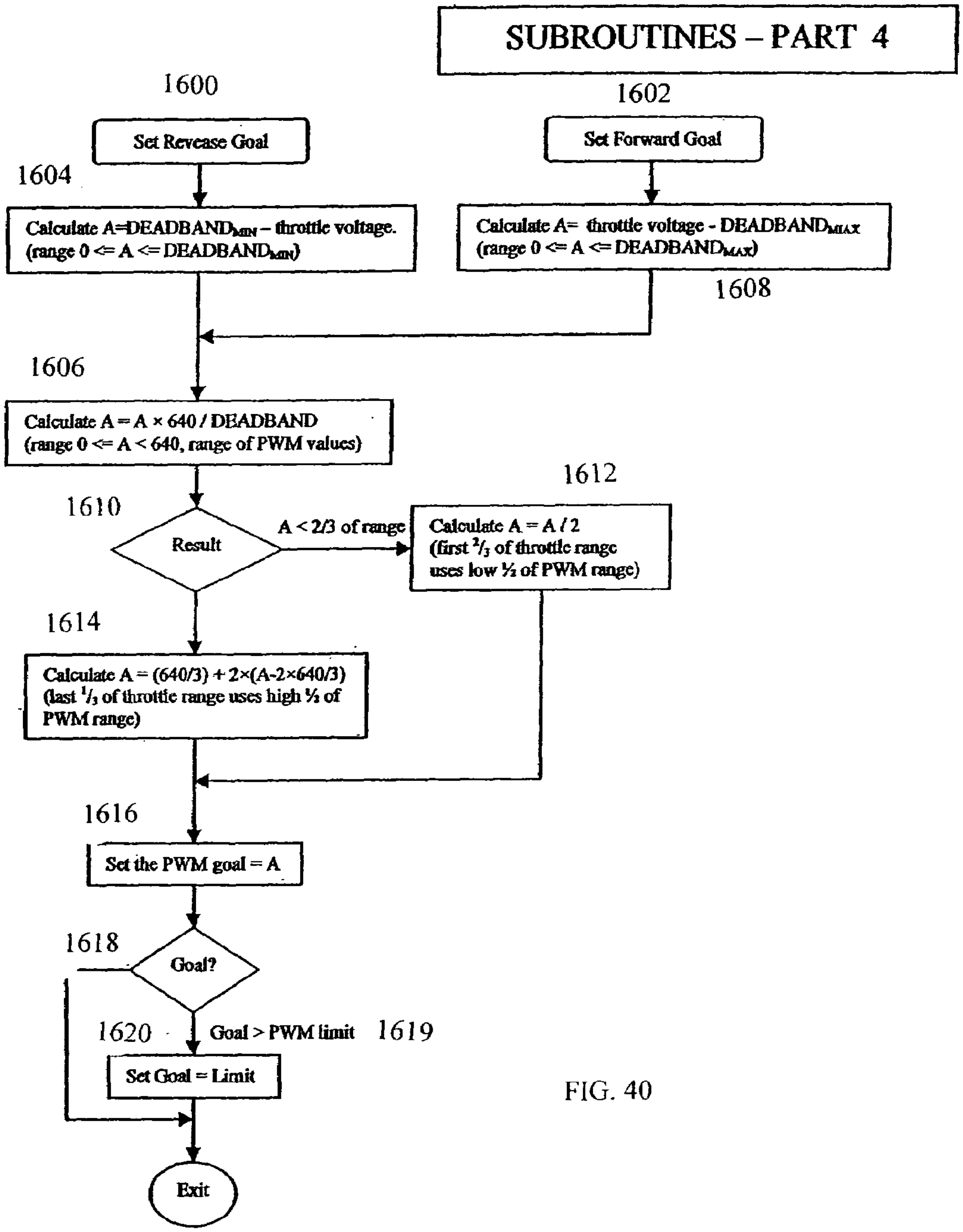
FIG. 40 is a flow chart of the Subroutines, part 4.

A "Set Reverse Goal & Set Forward Goal" routine is depicted in FIG. 40. These subroutines convert the throttle voltage read by the readThrttl routine to the target duty cycle value, pwmGoal that the updtPWM subroutine will use to set the modulator. The setRvrsGoal 1600 is used when the throttle is reversed. This routine converts 1604 the throttle value which will be in the range of DeadBandLow to zero corresponding to a duty goal of 0% to 100% to an 8-bit value in the range of 0 to DeadBandLow. This value is placed in a dedicated register so it can he processed by the common routine setGoalFR. The setFrwdGoal is used when the throttle in forward. This routine converts 1606 the throttle value which will he in the range of DeadBandHigh to 255 corresponding to a duty goal of 0% to 100% to an 8-bit value in the range of 0 to DeadBandLow. This value is placed in the register and the routine continues at the common routine setGoalFR.

The setGoalFR routine 1602 multiplies the value set up by setRvrsGoal and setFrwdGoal by ForwardGain using the 8 by 8 bit multiply routine, 1608. This operation converts the value in the range of zero to DeadBandLow to zero to PWM range. The value for the multiplier is:

$$\text{Forward Gain} = int\left[\frac{PWM\ \text{range}}{DeadBandLow}\right] = int\left[\frac{640}{107}\right] = 6$$

The result is compared to the value of PWMknee which is:

$$PWMknee = \left[\frac{2}{3} \times PWMrange\right] = int\left[\frac{2}{3} \times 640\right] = 427$$

If the result is less PWMknee the result is divided by 2 and the common routine setFrwdGo is jumped to. If 1610 the result is greater than or equal to PWMknee 1612, the PWMknee offset is subtracted off, the result mutilplied by 2 and ½ of the PWMknee is added back in 1614 and the program continues. The effect of these operations is to generate the target pulse width to throttle relationship described in the Overview.

At setFrwdGoal 1616 the result from the previous operations is subtracted from the P WMrange to convert it for the active low modulator output. The value is checked 1618 for the limits zero to PWMrange and clipped if necessary before it is stored in the pwmGoal register. The clipping may be necessary due to the integer math used in the routine. Finally, the pwmGoal value is compared 1619 to the pwmLimit value and if it is less, it is set to the pwmLimit value (smaller values correspond to larger duty cycles) to implement the current limit 1620.

Figure 41:
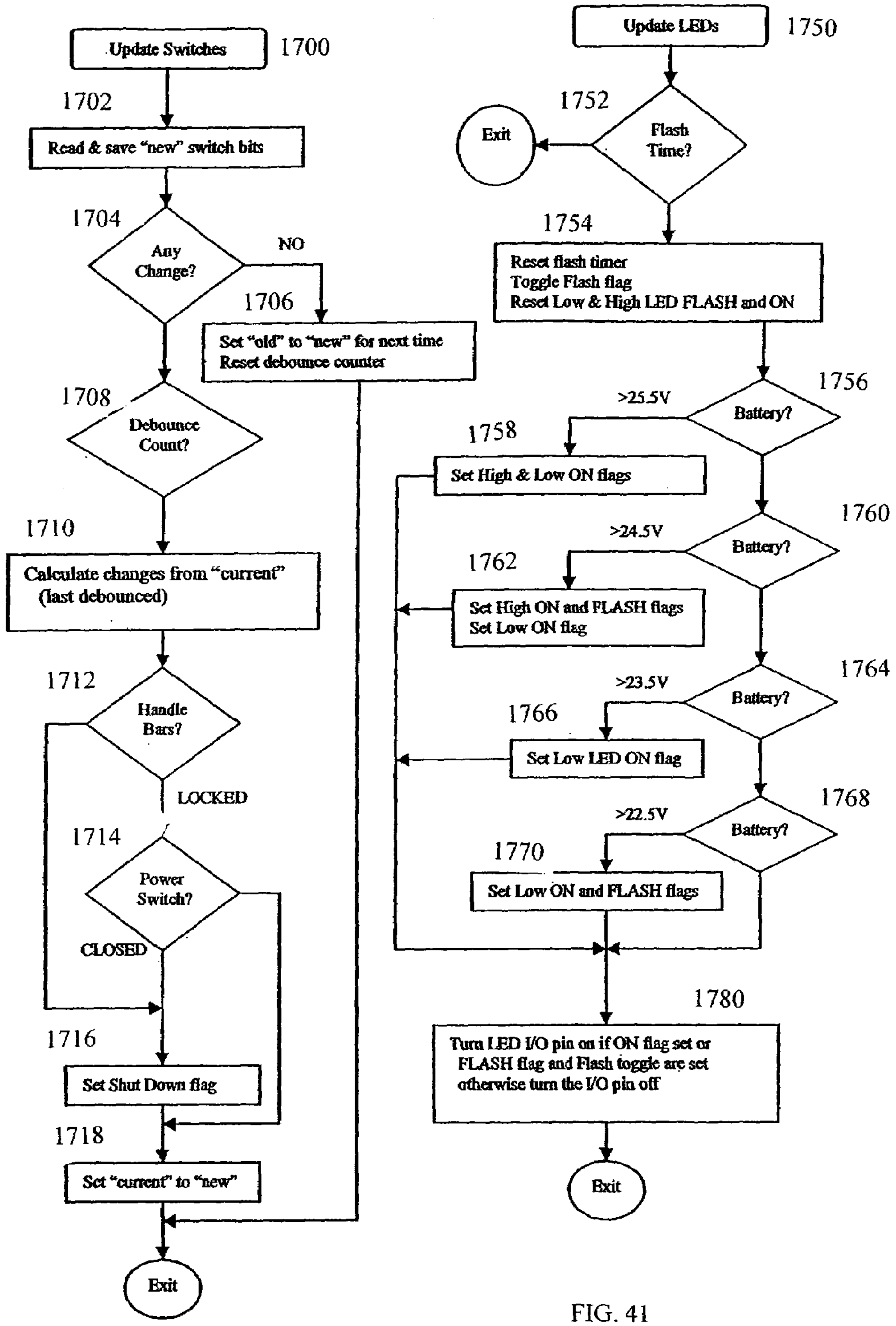
FIG. 41 is a flow chart of the Subroutines, part 5.

An "Update Switches" routine 1700 is depicted in FIG. 41. This subroutine reads the On/Off switch bit 1702 into newSwitch and then combines it with the handle Volt bit. The result is compared with oldSwitch and if they differ the oldSwitch 1704 value is updated to the newSwitch value 1718, the de-bounce timer is reset 1710, and the subroutine exits. If the values are the same 1706 the de-bounce timer is advanced and the subroutine exits if the timer does not overflow. If the timer overflows, the routine will set the shutDown flag 1716 if the handle bar switch has opened 1712 or if the power switch bit has closed 1714. The currentSwitch which has the last "debounced" switch value is updated to the newSwitch value and the subroutine exits.

An "Update LEDs" routine is also depicted in FIG. 41. The flash timer is updated 1750 and if it does not overflow the subroutine exits at the *uypdtLEDsX* label. When it overflows the timer value is reset 1754 and the flashToggle bit is complimented. The LED flags are set so that they are "off" (lowLEDon and highLEDon flags reset) and "not flashing" (lowLEDflash and highLEDflash reset). The last battery voltage reading, battery, is compared 1756 to values corresponding to 25.5, 24.5, 23.5, and 22.5 volts. If battery 25.5 execution jumps to allLEDSon which sets both LED flag to "on" and "not flashing" 1758. Execution then continues at doLEDs. If 25.5>battery>24.5 1760 execution jumps to flshHiLED which sets Low LED flag to "on", "not flashing" and the High LED to "on", "flashing" 1762. Execution then continues at doLEDs. If 24.5>battery>23.5 1764 execution jumps to loOnlyOn which sets Low LED flag to "on", "not flashing" and leaves the High LED as "off", "not flashing" 1766. Execution then continues at doLEDs. If 23.5>battery>22.5 1768 execution jumps toflshLowLED which sets Low LED flag to "on", "flashing" and leaves the High LED as "off", "not flashing" 1770. Execution then continues at doLEDs. If 22.5>battery execution jumps to doLEDs with both LEDs being left as "off" and "not flashing".

At doLEDs the lowLEDon and the lowLED flash flags are tested 1780. The program jumps to IrnLoLEDoff which turns the LowLEI) off (see LowLED above) if:

the lowLEDon flag is reset the lowLEDon flag is set, lowLEDflash is set, and flash Toggle is set.

Otherwise the program jumps to trnLoLEDon which turns the LowLED on (see LowLED above).

The program then continues at doHiLED where the highLEDon and the highLED flash flags are tested. The program jumps to trnHiLEDoff which turns the HighLED off (see HighLED above) if:

the highLEDon flag is reset the highLEDon flag is set, highLEDflash is set, and flash Toggle is set.

otherwise the program jumps to trnHiLEDon which turns the HighLED on (see HighLED above). The subroutine the exits at the label updtLEDsX.

The Drive Unit Actuator

Figure 42:
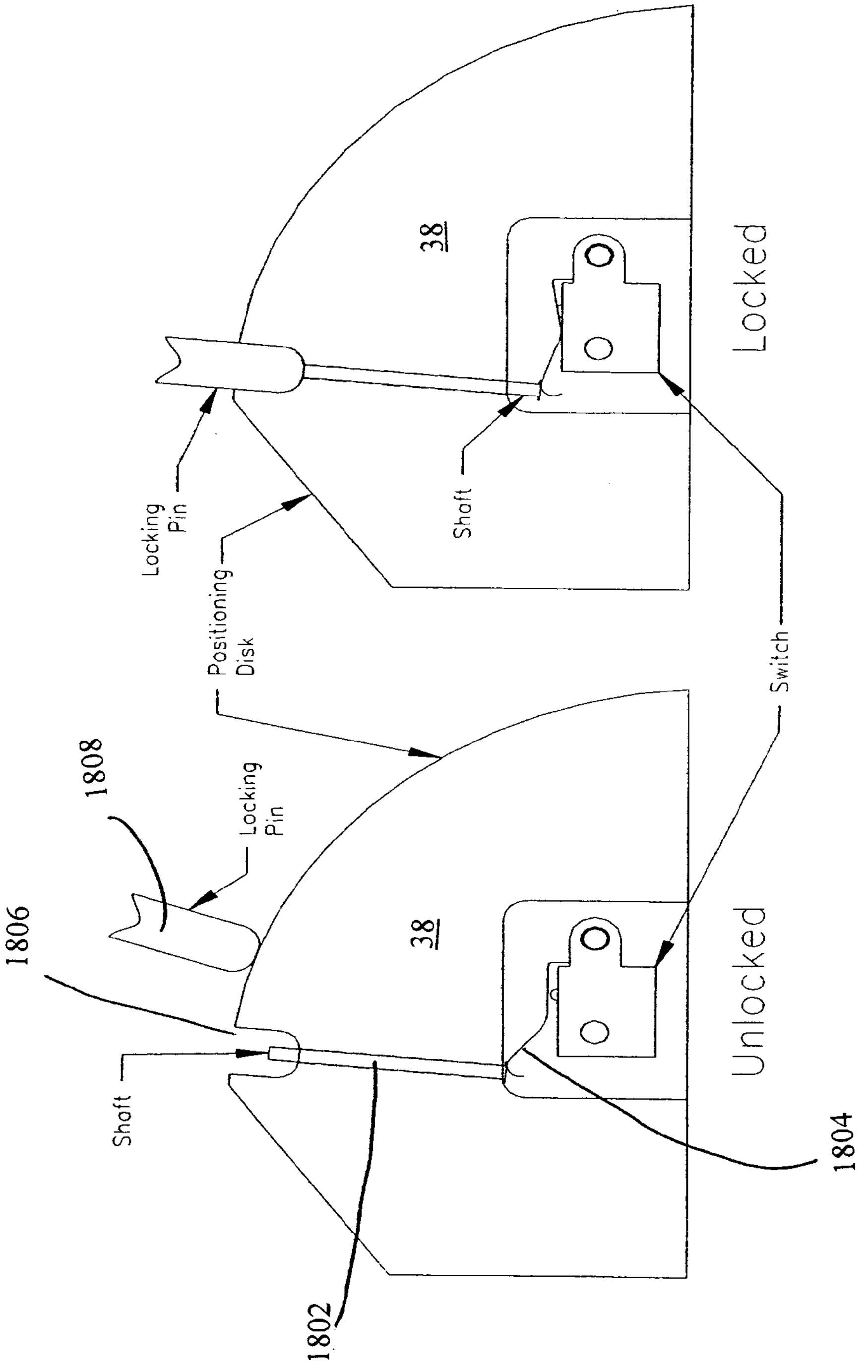
FIG. 42 is a first embodiment of a drive unit actuator.

The drive unit controller detects whether the steering column is in the locked position using a snap action switch mounted inside the positioning disk 38. As depicted in FIG. 42, a small hole is drilled in this disk and a shaft 1802 is inserted with the head resting on the switch activation lever arm 1804. The other end of the shaft extends into the detent 1806 that the locking pin 1808 drops into. The shaft is long enough to activate the switch when the locking pin is seated in the detent. The spring force of the switch lever arm forces the shaft up into the detent causing the switch to deactivate when the pin is not in place.

Figure 43:
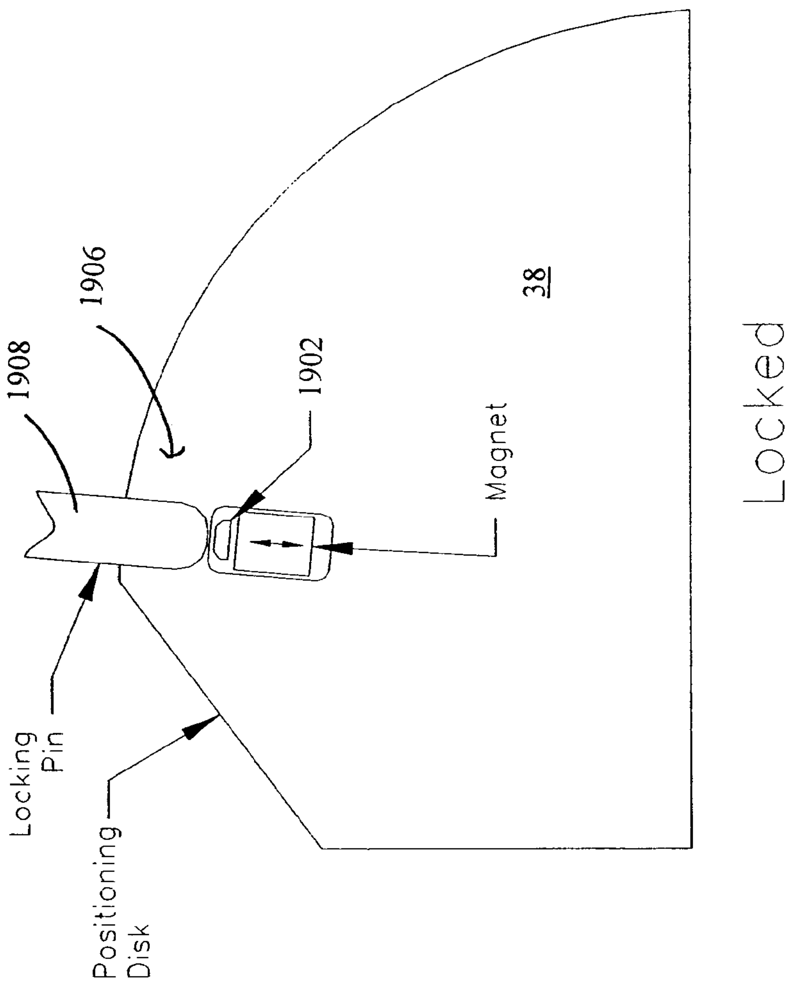
FIG. 43 is a second embodiment of a drive unit actuator.

FIG. 43 depicts an alternative embodiment of the steering column lock. This design utilizes the same linear hall effect sensor and magnet as is being used in the throttle design. The sensor 1902 and magnet 1904 will be fixed (glued) into a pocket in the positioning disk 38 as shown in FIG. 43. The output voltage of the sensor will change proportionally to the position of the steel locking pin 1908 in the detent 1906. The voltage will be sampled by the controller's micro processor to determine if the pin is in the detent. As is the case with the throttle it will not matter what the magnet orientation is because signed math (2's complement) will be used.

Throttle Control

Figure 44:
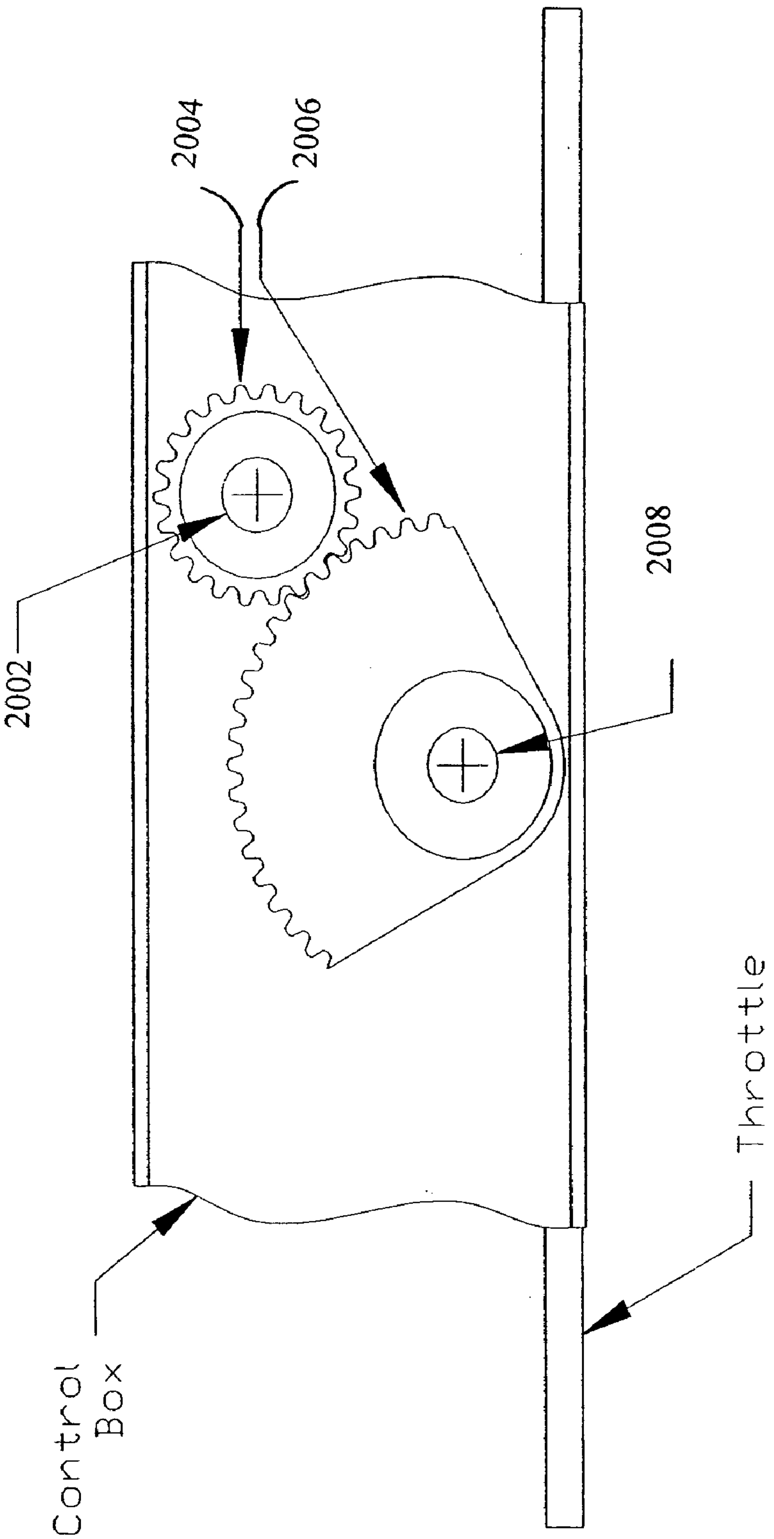
FIG. 44 is a first embodiment of a throttle control.

As depicted in FIG. 44, the electronic control for the drive unit's throttle lever utilizes a single turn (330° actual) potentiometer (obscured) which has a shaft 2002 that is mechanically coupled through two sprockets 2004, 2006 to the shaft 2008 that the throttle lever rotates on. The use of sprockets is done to increase the rotation of the potentiometer to about 140° from the 60° rotation of the throttle and to provide mechanical isolation of the potentiometer shaft from the user's throttle. Alternative embodiments may have the potentiometer shaft directly coupled to the throttle lever. The increased rotation provides an increased voltage change over the throttle rotation making the conditioning amplifiers which interface the potentiometer to the micro processor easier to implement and improves the signal to noise ratio of this voltage.

Most of the unused portion of the sprocket on the throttle is cut away so that the depth of the control box is as small as possible. The potentiometer used in this implementation has a typical life of about 10,000 cycles due to the mechanical contact between the potentiometer wiper and the resistive element. This can easily translate into less then 200 hours of use.

Figure 45:
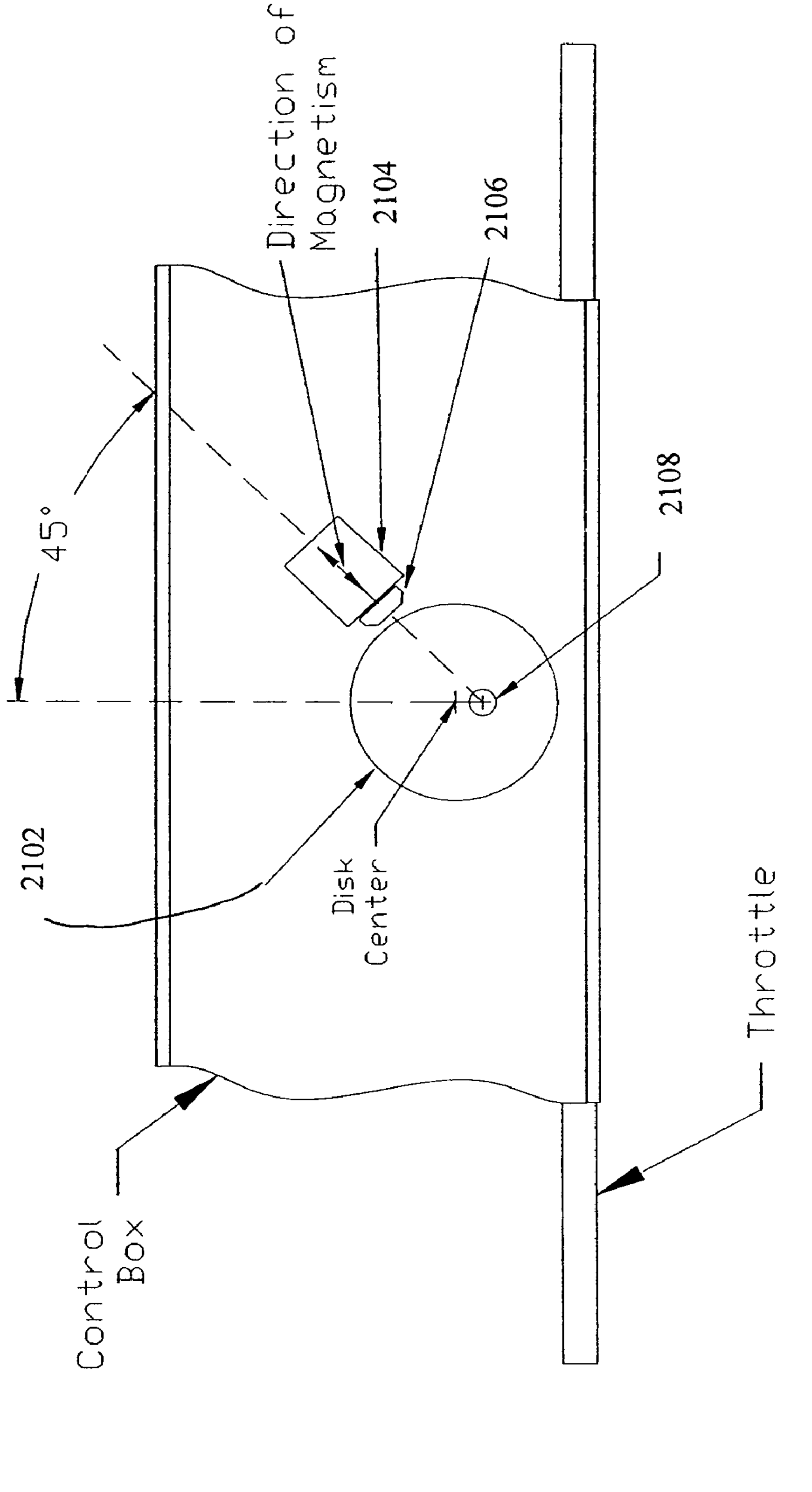
FIG. 45 is a second embodiment of a throttle control.

An alternative embodiment is depicted in FIG. 45. It uses a steel disk 2102, a magnet 2104, and a linear output hall effect sensor 2106 to convert the angular displacement of the throttle to a voltage that can be used by the control system of the unit. The steel disk 2102 is ¾ inch in diameter and is mounted directly to the end of the throttle shaft 2108. The disk is mounted so that there exists a 0.10 inch offset in the direction indicated in FIG. 45 between the centers of the shaft and the disk. The hall sensor in mounted on a printed circuit board at a 45° angle with respect to the offset in the disk and aligned so that the sensor face is perpendicular to a line through the center of the throttle shaft. A magnet 2104 is fixed behind the hall element with the direction of magnetization also oriented to the center of the throttle shaft (perpendicular to the hall sensor).

In this configuration, the spacing (gap) between the hall sensor and the disk changes as the throttle rotates. The throttle rotates 30° in each direction causing the gap to be a minimum when the throttle is 30° clockwise and a maximum when the throttle is 30° anti-clockwise. The amount of flux from the magnet that couples to the disk is dependent upon this gap with greater coupling occurring at the smaller gap. The hall sensor generates a voltage that is proportional to the flux passing through it so the output voltage is therefore proportional to the rotation of the throttle shaft.

The output voltage of the hall sensor is not linear with respect to the throttle rotation as it is with the potentiometer implementation. This is caused because of several factors including: the flux coupling is inversely proportional to the square of the gap; the surface of the disk that couples the flux is curved; and the hall sensor output is not only proportional to the flux but also the cosine of the angle of the flux passing through it. The development of a mathematical relationship between the angle of the throttle and the hall sensors voltage or empirical data may be used to calibrate the throttle control.

Figure 46:
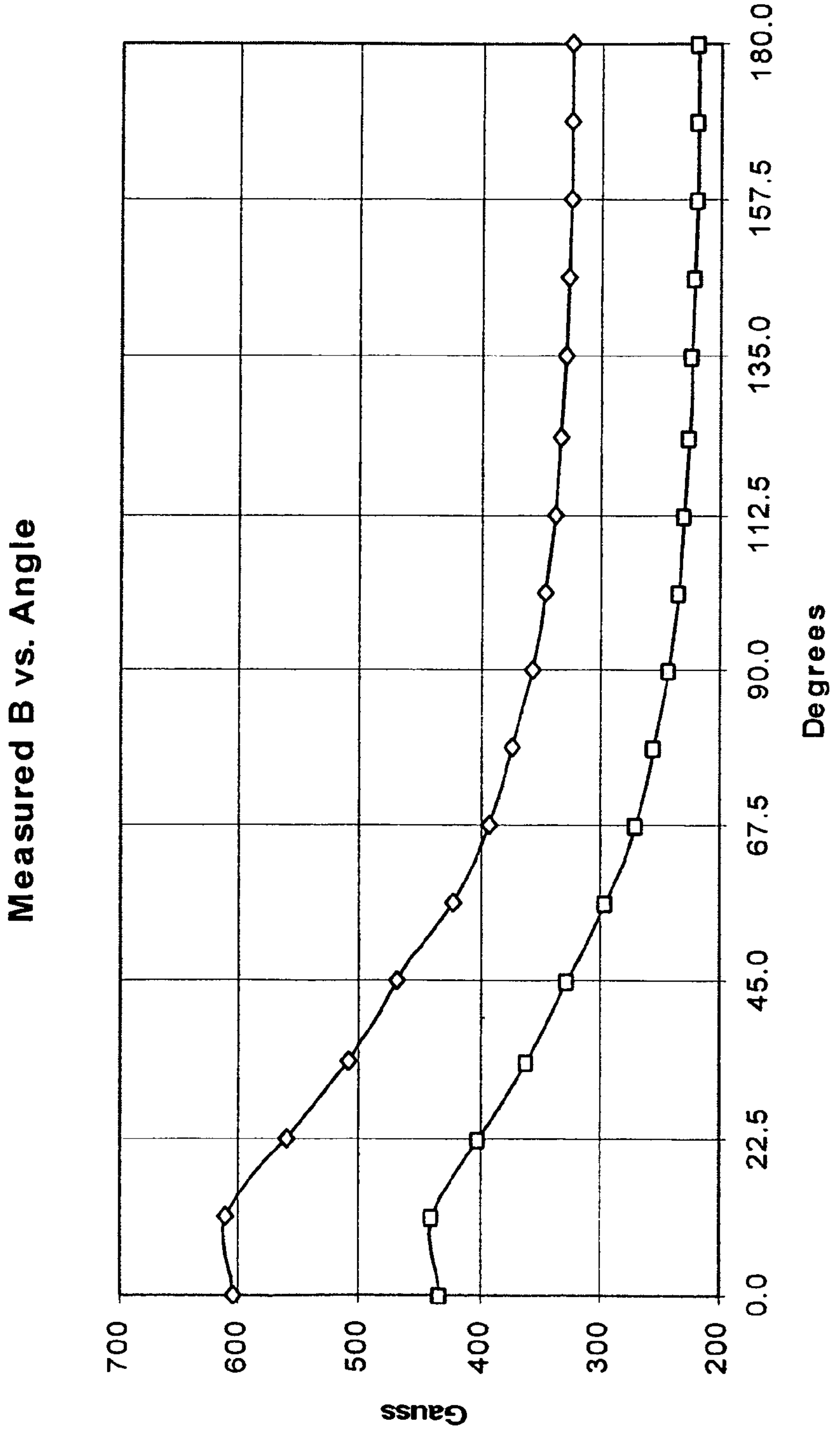
FIG. 46 is a chart of magnetic field versus throttle position.

Experiments using low cost barrel magnets of approximately ¼ inch diameter and a length of ⅜ inch, a steel disk of ¾ inch diameter and ¼ inch thickness, and a linear hall sensor with a 2½ mV/G (millivolt/Gauss) output reveal the curves shown in the "Measured B vs. Angle" chart shown below in FIG. 46. The angle scale of the chart is referenced to the sensor being placed along the line of the shaft and disk offset. The top curve is for the magnetically strongest magnet of the sample set of twelve magnets. The bottom curve is for the weakest magnet of the set. The centered throttle position for the sensor is chosen at 45° based upon these curves as it allows for the +/−30° rotation while maintaining a positive slope on the curve and maximizing this slope over the range. The difference in the magnet strength effects both the slope (gain) and offset of the curve but does not change the curve's fundamental characteristic and therefore can be compensated for in adjustments in the interface circuits to the micro processor. Alternatively the compensation can be implemented in the micro processor.

The hall sensor throttle control uses a micro processor located in the control box located in the handle bars. This processor will communicate with the current processor located on the PC card located in the box on the frame using a master/slave communications protocol implemented on each IC. The processor on the handle bar control is the slave unit. The processor samples the voltage signal from the linear hall effect sensor directly, without conditioning amplifiers, converts the sampled hall signal to a digital value suitable for use as a throttle signal, communicates this throttle value to the master IC in response to the request for it, controls the two LEDs in response to information provided by the master processor, and allows certain parameters of the unit to be programmed by the manufacturer and by the user. The parameters will be maintained in non-volatile, re-programmable memory implemented on the IC.

A ratiometric type linear output hall effect sensor is used in the design with the sensor supply voltage being the same as the processor supply voltage, 5 volts. The output voltage is proportional to the supply voltage of the device. The output will be ½ of the supply voltage when the flux is zero. The voltage increases or decreases in a linear relationship to the amount of flux and the direction passing through it. The depicted device has a 5 volt supply and has a gain of +2½ mV/G when exposed to a north field.

Figure 47:
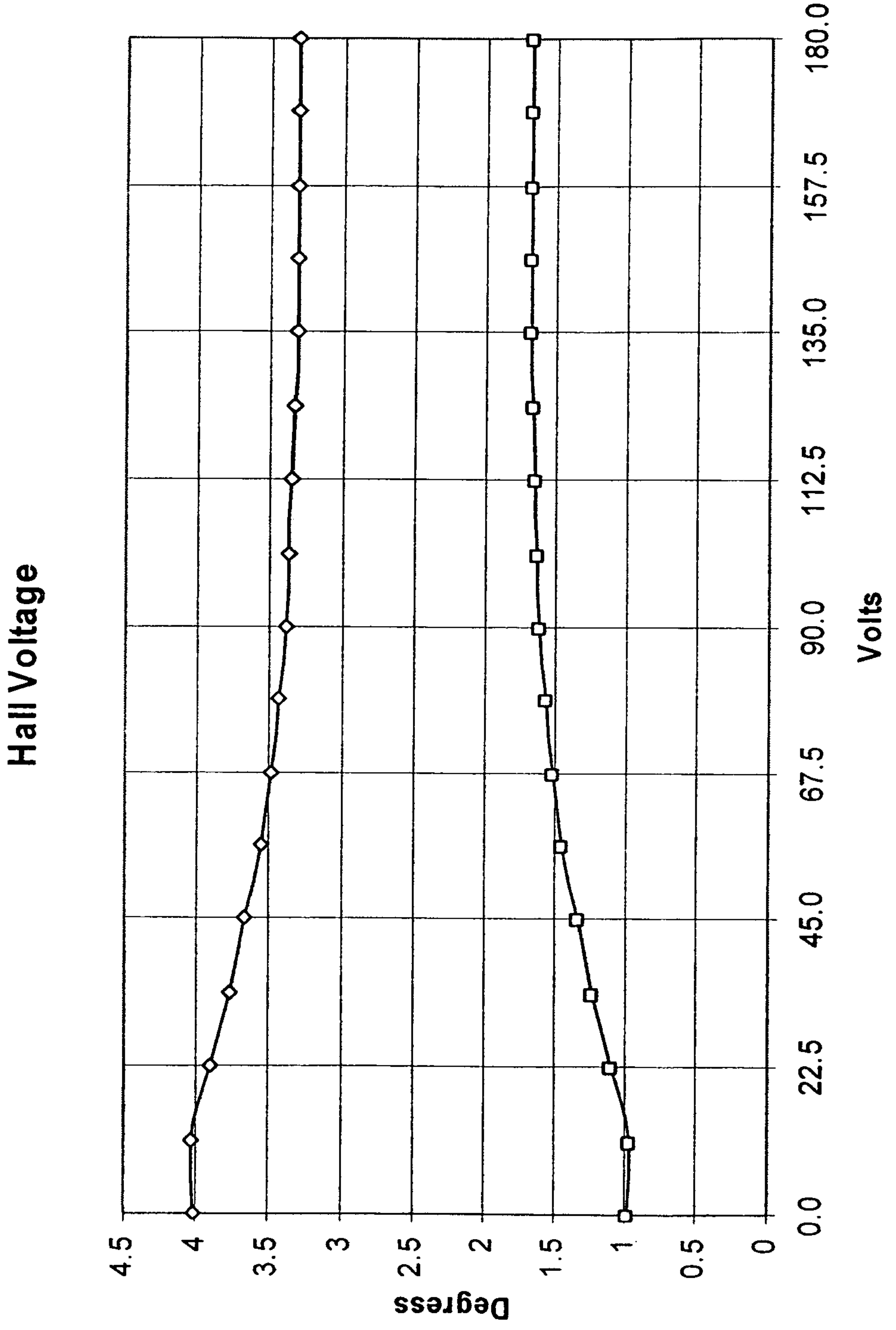
FIG. 47 is a chart of the Hall sensor voltage versus throttle position.

The two curves in the chart depicted in FIG. 47 show the hall sensor voltage versus the rotation angle. One curve is for a north field and the other for a south field. The 2.5 volt output of the sensor corresponds to zero gauss (no magnet) and the curves are symmetrical about this value as expected. Since the supply voltage is the same, the 2.5 volt signal results in a digitized value at ½ the full range, ie: 128 on a 8 bit system or 512 on a 10 bit system. Using signed math and taking the absolute value (2's compliment if the high order bit is set) of the digitized value makes both curves the same in the digital representation. Therefore, the polarity of the magnet is not important as it can be accounted for in the processor program.

The slave processor includes programmable parameters. These include programmability of throttle hall sensor gain and offset settings; setting for the maximum speed governor in the master processor; and selection of one of two throttle response characteristics. One as currently used in the potentiometer design and the other expanding the low end operating range to provide a less responsive system.

To program the unit a switch and LED are located inside the control box on the printed circuit board. Holding the switch closed, turning the machine on in the normal fashion, waiting for the LED to begin flashing and releasing the switch will put the unit in a state to be programmed. While the unit is in the programming state, the motor will not run. To return the unit to normal operation it must be turned off and then turned on again without holding the programming switch.

The programming sequence begins with initialization. The initial programming state is indicated by flashing the LED in a ¼ second on, ¼ second off sequence. The user then releases the switch and closes it again. If the switch remains closed for more then one second the sequence proceeds at Step II otherwise it proceeds at Step III.

The throttle is programmed. The programming of the throttle off position state is indicated by flashing the LED twice as fast, ⅛ second on followed by ⅛ second off. Again the user releases the switch and closes it again. During this time, the processor samples the voltage from the hall sensor, averages it over several samples, and saves the result. When the switch is closed, the sampling quits and the last averaged value for the hall sensor output voltage is saved for the off position. The user must not be pressing on the throttle when the switch is closed to properly program the off position. The low battery LED is turned on to indicate programming the reverse throttle position state. The user releases the switch, presses the throttle fully in on the side the users wants to be reverse (it can be either side), and the closes the switch. During this time, the processor samples the voltage from the hall sensor, averages it over several samples, and saves the result. When the switch is closed, the sampling quits and the last averaged value for the hall sensor output voltage is saved for the reverse position. The low battery LED is turned off and the high battery LED is turned on to indicate programming the forward throttle position. The user releases the switch, presses the throttle in the full forward position (should be the opposite side from the reverse), and the closes the switch. During this time, the processor samples the voltage from the hall sensor, averages it over several samples, and saves the result. When the switch is closed, the sampling quits and the last averaged value for the hall sensor output voltage is saved for the forward position. The high battery LED is turned off to indicate that this programming sequence has completed. The user releases the throttle and the switch and the sequence then proceeds to Step III.

The maximum speed is programmed. The programming of the maximum speed state is indicated by flashing the LED in a ¼ second on, ¼ second off, ¼ second on, ½ second off sequence. The setting for the maximum speed is continuously displayed as: Low battery LED only—3 MPH, High battery LED only—4 MPH and Both LEDs—5 MPH. To increase the speed by one setting the user presses the throttle fully forward and releases it. There will be no change if the setting is at the maximum (5 MPH). To decrease the speed by one setting the uses presses the throttle fully reverse and releases it. There will be no change if the setting is at the minimum (3 MPH). This programming state is maintained until the user presses and releases the switch. The sequence then proceeds to Step 4.

The response curve is programmed. The programming of the response state is indicated by flashing the LED in a ¼ second on, ¼ second off, ¼ second on, ¼ second off, ¼ second on, ½ second off sequence. The setting for the response curve is continuously displayed as: Low battery LED only—slower response, High battery LED only—faster response. To increase the response by one setting the uses presses the throttle fully forward and releases it. There will be no change if the setting is at the fastest. To decrease the response by one setting the uses presses the throttle fully reverse and releases it. There will be no change if the setting is at the slowest. This programming state is maintained until the user presses and releases the switch. The unit shuts off automatically.

The implementation of a programmable throttle (Step I above) provides: There are no electronic adjustments required that compensate for differences from unit to unit or following service. No equipment (scopes, volt meters, etc) is required to set up the unit so it can be done by the user. The potentiometer implementation requires at least a voltmeter to perform the adjustments. Additionally, the motor can operate while the adjustments are being made. Thus a fixture to hold the wheel up is required. The user can set which side of the throttle is used for forward and reverse. This is especially helpful to one handed users. There is no provision for this in the potentiometer implementation. It does not matter which way the magnet is oriented when it is fixed to the printed circuit board at the time of manufacture. The magnets are not marked and can be installed in either polarity.

The implementation of programmable maximum speed and response provides the ability to configure the unit for how it will be used. For example; units that are operated mainly indoors should not travel at 5 MPH because it can be dangerous to both the user and people, pets, and objects in the user path. New users can start out with the slower speeds and response settings and change them as they become more skilled in operating the unit.

The programming as described indicates three maximum speeds and two response settings. The number and values of these setting are not limitations of the design and can be changed as needed based upon user needs.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A power drive controller for a wheel chair comprising:

a frame, said frame being adapted to be attachable to a wheel chair such that driving said frame drives said wheel chair;

a motor, said motor comprising a wheel with an outer surface of said motor contacting the ground, said wheel being drivingly mounted on said frame and said wheel being brakeless;

a battery in operative communication with said motor to provide power to said motor;

a control lever being mounted on a handle adapted to cooperate with said wheel chair and said control lever being disposed to be operated by a wheel chair occupant and said control lever being mounted on said frame; and a processor in operative communication with said motor, said battery and said control lever, said processor being configured to selectively modulate current from said battery to said motor according to a position of said control lever.

2. The controller of claim 1 wherein said selective modulation of current to said motor is by varying a pulse width in a pulse width signal from said processor to a power supply circuit communicating between said battery and said motor.

3. The controller of claim 1 wherein said selective modulation of said current also varies according to a current speed of said motor.

4. The controller of claim 3 further comprising a hail sensor in operative communication with said motor, said hall sensor providing a speed signal to said processor, said speed signal corresponding to said current speed of said motor.

5. The controller of claim 4 wherein said speed signal is converted to a digital value.

6. The controller of claim 1 wherein said selective modulation is signaled by said processor via a digital value.

7. The controller of claim 1 wherein said motor is a brushless motor.

8. The controller of claim 1 wherein said motor is a brushless motor having an inner stator and an outer rotor.

9. The controller of claim 3 further comprising a maximum speed limit, said maximum speed limit varying with a current speed of said motor; and said processor signaling said maximum speed according to said current speed when said control lever signals a desired speed in excess of said maximum speed.

10. The controller of claim 9 wherein each of said maximum speeds has a digital value.

11. The controller of claim 10 wherein said processor signals a current level based upon a stored motor voltage constant and a stored winding resistance value.

12. The controller of claim 1 further comprising a deadband, said deadband corresponding to a range of positions of said control lever, and said deadband comprising said range of positions of said control lever generating no signal from said processor to provide current from said battery to said motor.

13. The controller of claim 1 wherein said control lever comprises a mechanical linkage to a variable resistance potentiometer, said potentiometer being in operative communication with said processor.

14. The controller of claim 1 wherein said control lever is comprised of a steel disk having an eccentric axis and a hall sensor, said hall sensor being in operative communication with said processor, and said hall sensor being responsive to a proximity of said steel disk, said control lever being linked to one of said steel disk or said hall sensor such that said control lever may vary said proximity of said steel disk relative to said hall sensor.

15. The controller of claim 1 wherein said processor is programmable by a user.

16. The controller of claim 15 wherein said processor may be programmed to be establish a maximum speed.

17. The controller of claim 1 further comprising at least one LED, said LED indicating a voltage level of said battery.

18. The controller of claim 1 further comprising a steering handle shaft circuit, said circuit being completed when said steering handle shaft is locked in run position, said processor being configured to signal a current from battery to said motor only when said steering handle shaft circuit indicates that said steering handle shaft is in said locked position.

19. The controller of claim 1 wherein said current signal to be sent from said battery to said motor by said processor varies according to a position of said control lever at a first current/position ratio when said control lever is within a first range of positions and varies according to at least one other current/position ratio when said control lever is in at least one other range of positions.

20. The controller of claim 1 wherein said first ratio remains constant within said first range and said at least one other ratio remains constant within said second range.

21. The controller of claim 20 wherein a current/position ratio changes continuously with each position of said control lever.

22. The controller of claim 20 further comprising a range of controller positions wherein said current/position ratio remains zero.

23. The controller of claim 1 wherein a profile of said current/position ratios is different or positions of said control lever corresponding to reverse than a second profile of said current/position ratio for positions of said control lever corresponding to a forward direction of travel.

24. The controller of claim 1 further comprising a removable housing for said battery.

25. The controller of claim 24 wherein said battery is sealed in said housing.

26. The controller of claim 24 wherein said battery and said housing have a combined weight between zero and thirty pounds.

27. The controller of claim 1 wherein said motor is gearless.

28. The controller of claim 1 wherein said motor is clutchless.

29. A power drive controller for a wheel chair comprising:

a motor, said motor comprising a wheel with an outer surface of said motor contacting the ground, said wheel being in operative communication with said power drive for a wheel chair;

a battery in operative communication with said motor to provide power to said motor;

a control lever being mounted on a handle adapted to cooperate with said wheel chair and said control lever being disposed to be operated by a wheel chair occupant; and a processor in operative communication with said motor, said battery and said control lever, said processor being configured to selectively modulate current from said battery to said motor according to a position of said control lever;

wherein said selective modulation of said current also varies according to a current speed of said motor;

a maximum speed limit, said maximum speed limit varying with said current speed of said motor;

said processor signaling said maximum speed according to said current speed when said control lever signals a desired speed in excess of said maximum speed;

each of said maximum speeds having a digital value; and wherein said processor signals a current level based upon a stored motor voltage constant and a stored winding resistance value.

30. The power drive controller for a wheel chair comprising:

a motor, said motor comprising a wheel with an outer surface of said motor contacting the ground, said wheel being in operative communication with said power drive for a wheel chair;

a battery in operative communication with said motor to provide power to said motor;

a control lever being mounted on a handle adapted to cooperate with said wheel chair and said control lever being disposed to be operated by a wheel chair occupant;

a processor in operative communication with said motor, said battery and said control lever, said processor being configured to selectively modulate current from said battery to said motor according to a position of said control lever; and a deadband, said deadband corresponding to a range of positions of said control lever, and said deadband comprising said range of positions of said control lever generating no signal from said processor to provide current from said battery to said motor.

31. A power drive controller for a wheel chair comprising:

a motor, said motor comprising a wheel with an outer surface of said motor contacting the ground, said wheel being in operative communication with said power drive for a wheel chair;

a battery in operative communication with said motor to provide power to said motor;

a control lever being mounted on a handle adapted to cooperate with said wheel chair and said control lever being disposed to be operated by a wheel chair occupant;

a processor in operative communication with said motor, said battery and said control lever, said processor being configured to selectively modulate current from said battery to said motor according to a position of said control lever; and said control lever being comprised of a steel disk having an eccentric axis and a hall sensor, said hall sensor being in operative communication with said processor, and said hail sensor being responsive to a proximity of said steel disk, said control lever being linked to one of said steel disk or said hall sensor such that said control lever may vary said proximity of said steel disk relative to said hall sensor.

32. A power drive controller for a wheel chair comprising:

a motor, said motor comprising a wheel with an outer surface of said motor contacting the ground, said wheel being in operative communication with said power drive for a wheel chair;

a battery in operative communication with said motor to provide power to said motor;

a control lever being mounted on a handle adapted to cooperate with said wheel chair and said control lever being disposed to be operated by a wheel chair occupant;

a processor in operative communication with said motor, said battery and said control lever, said processor being configured to selectively modulate current from said battery to said motor according to a position of said control lever; and said current to be sent from said battery to said motor by said processor varies according to a position of said control lever at a first current/position ratio when said control lever is within a first range of positions and varies according to at least one other current/position ratio when said control lever is in at least one other range of positions.

33. The controller of claim 32 wherein said first ratio remains constant within said first range and said at least one other ratio remains constant within said second range.

34. The controller of claim 32 wherein a current/position ratio changes continuously with each position of said control lever.

35. The controller of claim 32 further comprising a range of controller positions wherein said current/position ratio remains zero.

36. The controller of claim 32 further comprising a reverse profile current/position ratio, said reverse profile being different than said current/position ratio for positions of said control lever corresponding to a forward direction of travel.

* * * * *